US007258610B2

(12) United States Patent
Seelig et al.

(10) Patent No.: US 7,258,610 B2
(45) Date of Patent: Aug. 21, 2007

(54) GAMING DEVICE WITH TRANSPORT DEVICE AND METHOD OF USE

(75) Inventors: Jerald C. Seelig, Absecon, NJ (US); Lawrence M. Henshaw, Hammonton, NJ (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 334 days.

(21) Appl. No.: 10/883,489

(22) Filed: Jun. 30, 2004

(65) Prior Publication Data

US 2005/0014555 A1 Jan. 20, 2005

Related U.S. Application Data

(63) Continuation-in-part of application No. 10/245,532, filed on Sep. 16, 2002, now Pat. No. 6,860,809.

(60) Provisional application No. 60/503,205, filed on Sep. 15, 2003, provisional application No. 60/496,604, filed on Aug. 19, 2003, provisional application No. 60/484,853, filed on Jul. 3, 2003.

(51) Int. Cl.
*A63F 13/00* (2006.01)
*G07F 17/34* (2006.01)

(52) U.S. Cl. ............................ 463/20; 463/22; 463/25; 463/46; 463/17; 273/143 R; 273/138.2; 273/144 R; 273/144 A; 273/144 B

(58) Field of Classification Search ............ 273/143 R, 273/138.2, 144 B, 138.1, 145 R, 144 R, 273/145 A, 145 B, 145 C, 145 CA, 145 D, 273/144 A; 463/20, 22, 25, 46, 16–19, 26–28
See application file for complete search history.

(56) References Cited

U.S. PATENT DOCUMENTS

| | | | | |
|---|---|---|---|---|
| 4,871,171 A * | 10/1989 | Rivero | ........................ | 463/20 |
| 4,909,513 A | 3/1990 | Kiyono | | |
| 5,031,913 A * | 7/1991 | Hirosumi et al. | ....... | 273/145 C |
| 6,152,447 A * | 11/2000 | Stanley | .................... | 273/138.1 |

FOREIGN PATENT DOCUMENTS

GB 2273384 A * 6/1994

* cited by examiner

*Primary Examiner*—Benjamin Layno
(74) *Attorney, Agent, or Firm*—Ian F. Burns & Associates, P.C.; Ian F. Burns

(57) ABSTRACT

A gaming device having a container, at least one movable object situated within the container and a transport device configured to transport the movable object, is disclosed. The transport device further may include a transport component for receiving the movable object and the container may simulate a popcorn popper. A method of use, including a gaming method, and a method for moving one or more movable objects in a gaming device which includes providing a gaming device having a container with at least one movable object and a transport device configured to transport the movable object, are also disclosed.

47 Claims, 38 Drawing Sheets

FIG. 38E
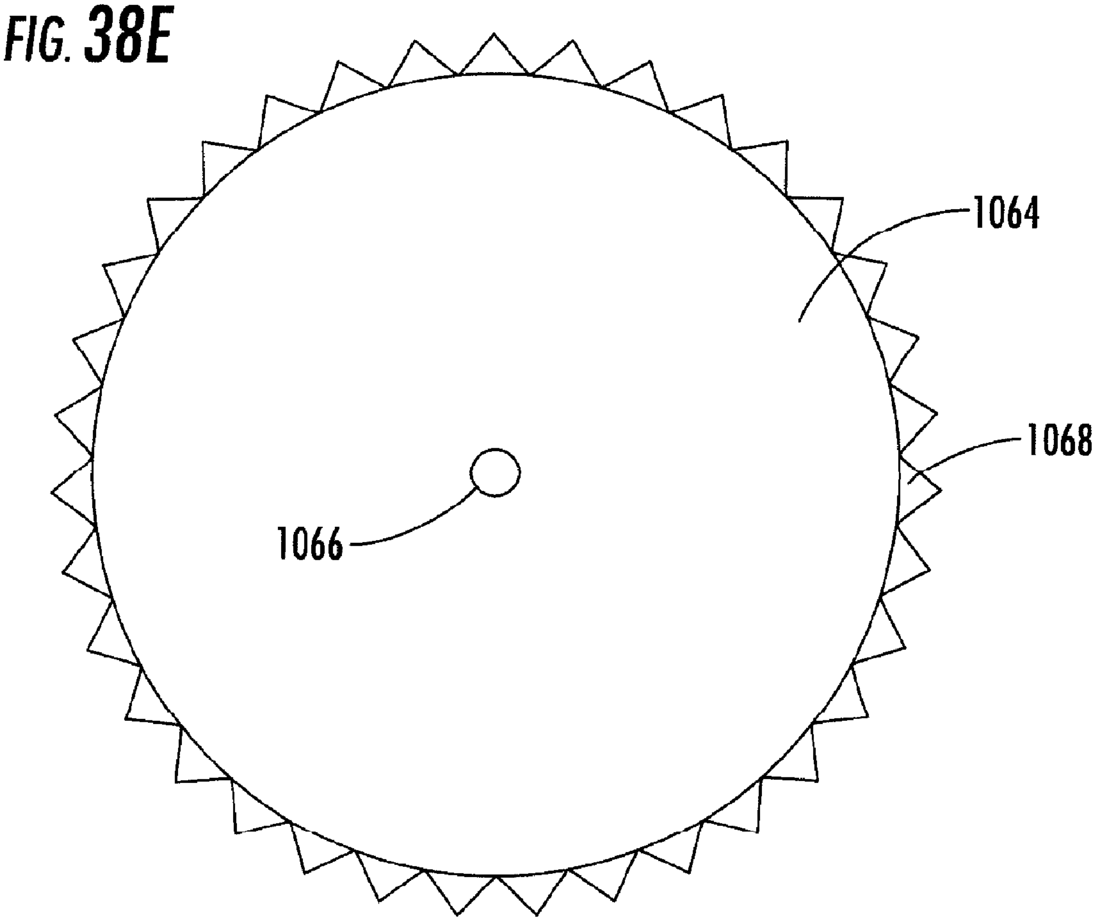
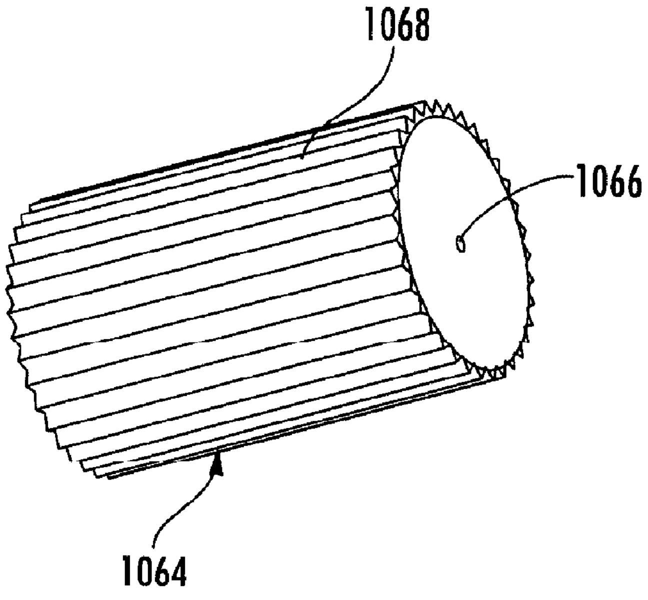
FIG. 38F

GAMING DEVICE WITH TRANSPORT DEVICE AND METHOD OF USE

CROSS REFERENCES TO RELATED APPLICATIONS

This application is a continuation-in-part application of U.S. patent application Ser. No. 10/245,532, filed Sep. 16, 2002, now issued as U.S. Pat. No. 6,860,809. This application also claims priority to U.S. provisional patent application Nos. 60/484,853, filed Jul. 3, 2003; 60/496,604, filed Aug. 19, 2003; and 60/503,205, filed Sep. 15, 2003. All of the above referenced applications are hereby expressly incorporated by reference in their entireties.

FIELD OF THE INVENTION

The present invention relates to a gaming device, and a method of use. More specifically, the gaming device includes a transport device configured to transport one or more movable objects from a plurality of movable objects contained within a container.

BACKGROUND

Gaming Devices

Gaming devices are well known in the art and a large variety of gaming devices have been developed. In general, gaming devices allow users or players to play a game. In many casino-type gaming devices, the outcome of the game depends, at least in part, on a randomly generated event. For example, a gaming device may use a random number generator to generate a random or pseudo-random number. The random number may then be compared to a predefined table to determine the outcome of the event. If the random number falls within a certain range of numbers on the table, the player may win a predefined prize. The table may also contain display information that allows the gaming device to generate a display that corresponds to the outcome of the game. The gaming device may present the outcome of the game on a large variety of display devices, such as mechanical spinning reels or video screens.

Bonus Prizes

Some gaming devices award bonuses in addition to prizes that are awarded in the primary game. A bonus can be defined as an additional prize that is awarded to the player when a predefined event occurs. An example of a bonus game can be found in U.S. Pat. No. 5,848,932 issued to Adams. One of the gaming devices described in this document comprises three spinning reels and a spinning wheel bonus display. When predetermined indicia are displayed on the spinning reels of the primary game, the wheel can be activated to indicate a bonus prize. The bonus prize is awarded in addition to any prizes awarded in the primary game.

In another embodiment described in this document, the gaming device includes a container having one or more movable objects and a transport device for transporting the one or more movable objects within the container. When predetermined symbols are displayed on the reels of the primary game, the transport device can be activated to transport the movable objects while the player is allowed to play the bonus game.

Generally, bonus prizes are offered in such games in order to increase the excitement and enjoyment experienced by players. This attracts more players to the game and encourages players to play longer. When gaming devices attract more players and the players play longer, they tend to be more commercially successful relative to other gaming devices.

Display Devices

In addition, highly visible display devices are utilized on gaming devices in order to attract players. Once players are attracted to the gaming device, they tend to play longer because the display device enhances the stimulation and excitement experienced by players. It is, therefore, desirable for gaming devices to incorporate highly visible display devices.

The applicants believe that display devices tend to be more successful if they are a derivation of a well-known game or theme. They are more successful because players tend to be drawn to games that they instantly recognize. Many players are reluctant to try completely new games because they must spend time to learn the new game. It is, therefore, desirable to provide display devices that are based on well-known games or themes.

The applicants also believe that display devices tend to be more successful if they utilize physical objects rather than simulations. Although video devices and electronic signs can be used for display devices, players are more attracted to display devices that utilize physical objects. Physical objects can be even more effective display devices if they are moveable and they are used in combination with lights and sounds. With the movement of objects within display devices, it is advantageous to use transport devices that will attain maximum effectiveness while occupying a minimum amount of space. It is important to minimize the amount of occupied space because a smaller gaming device generally corresponds to an overall lower cost.

Keno

Upon an initial examination, it would appear to the applicants that the display device of Keno is an excellent choice for a display device for gaming devices. Keno is well known to the playing public, and it utilizes a highly visible and attractive display device. The display device comprises a container with a plurality of numbered balls. The balls in the container are agitated or jumbled, usually by a jet of air, to a state where they ricochet off of the walls of the container.

In the game of Keno, players select numbers that may be drawn from the Keno display device. The display device jumbles or mixes numbered balls in the container and then draws a predetermined number of balls from the container. Players are paid based on the number of balls drawn from the display device that match the numbers they selected.

However, before the present invention, the Keno display device has been unsuitable for use with gaming devices. One of the reasons this is so is because Keno is susceptible to environmental influences. An important aspect of any gaming device is resistance to environmental influences that could affect the results of the game. However, as the balls are jumbled in the Keno ball device, static electricity, dust, and contaminants build up on the balls. This may cause the balls to stick to each other or to components in the display device thereby influencing the randomness of the game. Furthermore, the balls used in Keno displays may have slightly different weights or sizes that subtly affect the outcome of the game.

Another reason the game of Keno has been unsuitable as an indicator for a gaming device is that it requires a great deal of human involvement. In many Keno games, human operators are required to read the numbers of the Keno balls as they are selected and input the numbers into a computer or display. Furthermore, operators must regularly clean the Keno balls and the Keno devices to keep dust and contaminants from building up on the balls. Not only does this require far too much human involvement for an automated gaming device (the greater the human involvement, the greater the cost of operating the game), the game is also susceptible to tampering and cheating.

Because of their susceptibility to environmental influences and tampering and their dependence on human operators and maintenance personnel, Keno games are not allowed in at least one major gaming jurisdiction. Furthermore, these disadvantages have prevented Keno display devices and other devices that use jumbled balls from being adapted for use with gaming devices. The applicants have discovered that what has long been needed is a means for adapting jumbled ball display devices for use with gaming devices. Although reference is made to the game of Keno, it is to be understood that the present invention may be used with almost any type of ball, jumbled ball, or action unit display device, such as lottery balls for example.

Bingo

Similar to Keno, some Bingo game devices utilize a container with a plurality of numbered balls. The balls in the container are agitated or jumbled, usually by rotation of the container. Players receive cards with a grid of cells or spaces. A randomly determined number of symbol is printed in each cell. As balls are randomly drawn from the container, players mark cells on their cards when the numbers on the ball correspond to numbers in the cell. The first player to fill a column, row, or diagonal line on the card with marks, wins the game. Although Bingo devices are well known and provide an attractive display, they suffer from the same problems as Keno devices. Therefore, before the present invention, they have not been thought to be acceptable for use with gaming devices.

Jumbled Ball Displays

Two references that have attempted to utilize jumbled ball displays are U.S. Pat. No. 4,871,171 issued to Rivero and U.S. Pat. No. 5,380,007 issued to Travis et al. Rivero appears to disclose a game device with means for simulating the release of a ball. In this reference, a rotating drum 2 is provided with numbered balls 17. As the drum rotates, a ball is released into a transparent tube 16.

However, Rivero is not intended to show the player the ball that is released from the drum. Rather, the ball is held in the tube, out of view of the player, and an electronic simulation of the ball number is presented in a window 9. This is intended to give the player "the impression" that the ball has been counted. Rivero fails to disclose or suggest displaying actual balls to the player to indicate the outcome of the game or the value of a prize. In addition, in the Rivero device the balls are in a cage and quite exposed to the environment and tampering. The ball cage of Rivero is also mounted on the front side and well below the top of the gaming machine, hiding the ball cage from view of potential game players who are not in position to see the front side of the machine.

Travis et al. appear to disclose a video lottery gaming device with numbered balls 48. However, all of the balls are simulations generated by software and no physical balls are displayed to the player. Travis et al. also fails to disclose or suggest displaying actual balls to the player to indicate the outcome of the game or the value of a prize.

One of the disadvantages with Rivero and Travis et al. is that no actual physical balls are used to display the outcome of a game. This is less desirable because players like to see physical objects rather than electronic simulations of the physical objects. Moreover, players tend to believe that a game device is misleading when the device purports to display a simulation of an object rather than the object itself. This is especially true when the object itself is supposedly available for viewing, as is the case in Rivero.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to provide game players with a more exciting and desirable gaming experience;

the ability to attract more patrons to play a game;

provide longer play times and a greater payout possibility for a player;

provide greater revenues for gaming operators;

provide a gaming device that utilizes a visually appealing and highly visible display device;

provide a gaming device including a transport device occupying a minimal amount of space; and provide a gaming device with a bonus activating event where the container simulates a popcorn popper for activation during a bonus game cycle.

These and other advantages may be realized by reference to the remaining portions of the specification, claims, and abstract.

BRIEF DESCRIPTION OF ONE EMBODIMENT OF THE PRESENT INVENTION

The present invention includes a gaming device having a container, at least one movable object situated within the container, and a transport device configured to transport the at least one movable object. Optionally, the transport device further may include a transport component for receiving the movable object.

The present invention also discloses a method for moving one or more movable objects in a gaming device including providing a gaming device having a container with at least one movable object and a transport device configured to transport the at least one movable object. The transport device is activated and the at least one moveable object is transported by the transport device.

The present invention further discloses a gaming method including allowing a player to play a gaming device having a container with at least one movable object contained therein. The gaming device further including a transport device configured to transport the at least one movable object and providing at least one bonus qualifying event. If the at least one bonus qualifying event occurs, a plurality of symbols is presented to a player. Next, at least one symbol is selected from the plurality of symbols and a prize may be awarded to the player.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 38E is a cross-sectional view of another embodiment of the transport device of the present invention.

FIG. 38F is a front perspective view of the transport device in FIG. 38E.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made with out departing from the scope of the present invention.

In the Detailed Description below, the applicants utilize various spatially orienting terms such as "upper," "lower," "horizontal," and "vertical." It is to be understood that these terms are used for ease of description of the preferred embodiments with respect to the drawings but are not necessarily in themselves limiting or requiring of an orientation as thereby described in the following Detailed Description.

Figure 1A:
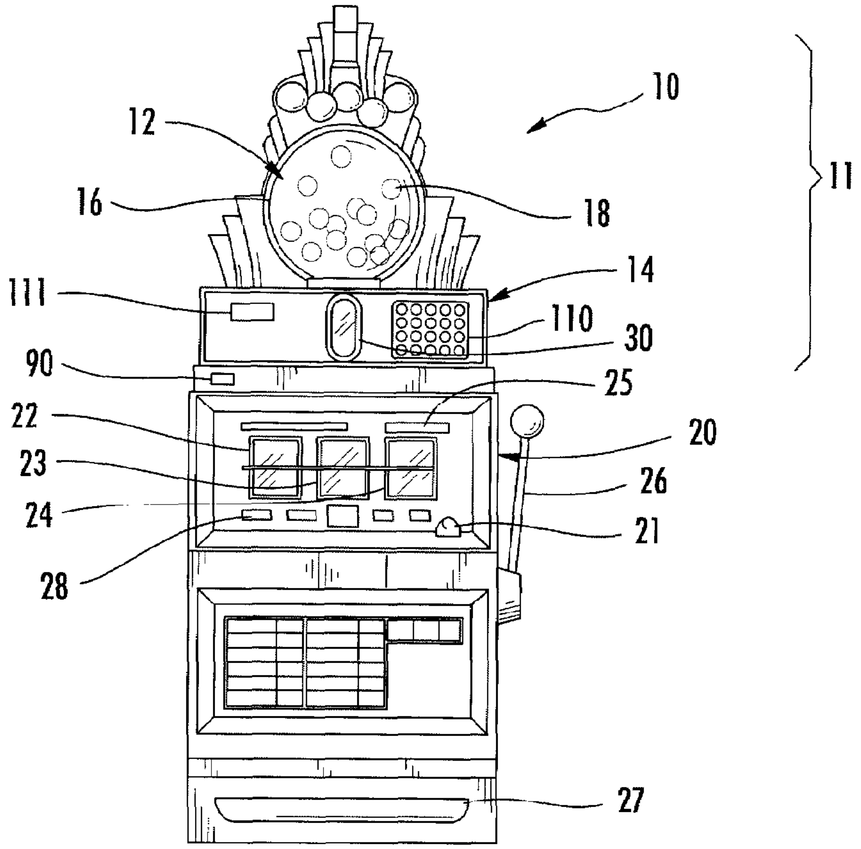
FIG. 1A is substantially a front view of the gaming device of the present invention.

As seen in FIG. 1A, one embodiment disclosed herein comprises a gaming device, generally indicated by reference number 10. Gaming device 10 comprises a display device 11 and a game apparatus 20. Display device 11 may comprise a jumbled ball display 12 and a prize display 14.

Game Apparatus

With continuing reference to FIG. 1A, game apparatus 20 maybe any of a large number of devices that are adapted to allow players to play a game. For example, game apparatus 20 may utilize reel displays, such as spinning reels 22-24 or a video display (not shown), to display outcomes of the game. Means may also be provided for accepting wagers, such as a coin slot 21 or card reader 25, and for awarding prizes, such as a coin dispenser 27. A handle 26 and button 28 are provided for activating game apparatus 20 to begin a game. In at least one preferred embodiment, game apparatus 20 may be an S Plus model gaming device manufactured by International Game Technology in Reno, Nev.

Game apparatus 20 is preferably controlled by an electronic controller 82 (see FIG. 2A) that utilizes a random number generator. The random number generator produces a random or pseudo random number for each game. The outcome of the game may be determined by comparing the random number to a table of outcomes stored in a memory and accessed by controller 82. A number of different tables of outcomes may be used and different tables may be used for different games. The tables can be designed so that different prizes have different probabilities of being awarded. Such design techniques are well known in gaming. Examples of such designs are shown in U.S. Pat. No. 4,448,419, issued to Telnaes, and U.S. Pat. No. 5,456,465, issued to Durham. Controller 82 causes spinning reels 22-24 of the video display to show the outcome of the game that corresponds to the outcome of the random number generator. It is recognized that game apparatus 20 may operate in many other ways and still achieve the objects of the present invention.

Game apparatus 20 may also be capable of producing a bonus-activating event. This event may be many different types of events. For example, a bonus-activating event may comprise displaying a particular symbol, such as a "bonus" symbol, or combination of symbols, such as three "7" symbols, on reels 22-24. If the game being played is poker based, the bonus-activating event may be occurrence of a certain hand, such as a royal flush. Furthermore, a bonus-activating event may occur when a player accumulates a number of symbols or game outcomes over a number of separate game plays. For example, a bonus-activating event may occur when the player receives three "bonus" symbols during a period of time. The bonus-activating event may be based on an external event. For example, a bonus-activating event may occur when a group of players obtain a certain result.

Jumbled Ball Display

With continuing reference to FIG. 1A, jumbled ball display 12 comprises a container 16 that is adapted to hold a plurality of display balls 18. Container 16 is at least partially transparent allowing players to view display balls 18 inside of the container. Container 16 is made of a transparent material, such as plastic or glass. In the preferred embodiment, container 16 is made of acrylic. Suitable containers of this type may be obtained from Tripp Plastics of Reno, Nev. However, container 16 may also be a wire cage of a type that is used in some Keno games.

Container 16 may have many different shapes, such as a sphere, cube, cylinder, triangle, etc. In the preferred embodiment, container 16 is substantially spherical with a partially flat back (not shown). The flat back allows container 16 to be large while still allowing gaming device 10 to placed against a wall, another gaming device, or other objects.

Although display balls 18 are preferably similar to Keno balls, many other types of balls may be used. For example, display balls 18 may be ping-pong balls or rubber balls. Display 12 also comprises, an agitator (not shown in FIG. 1) to agitate or jumble display balls 18 within container 16. The agitator may be a stream of air or a mechanical mixing device. The agitator causes the balls to bounce and ricochet off of the walls of container 16. In the preferred embodiment, a stream of air is used as an agitator and container 16 comprises an off center opening for the stream of air. The opening is off center to increase the initial agitation of display balls 18.

Fins (not shown) may also be provided at the bottom of container 16 to help agitate display balls 18. The fins support display balls 18 when they are resting at the bottom of container 16. This helps air circulate underneath display balls 18 to lift and separate the balls. The purpose of jumbled ball display 12 is to attract and entertain players. When display balls 18 are agitated, they produce a vivid display that attracts the attention of people nearby and provides an exciting display for players playing gaming device 10. Display Balls 18 are preferably kept separate from balls used in display device 14.

Figure 1B:
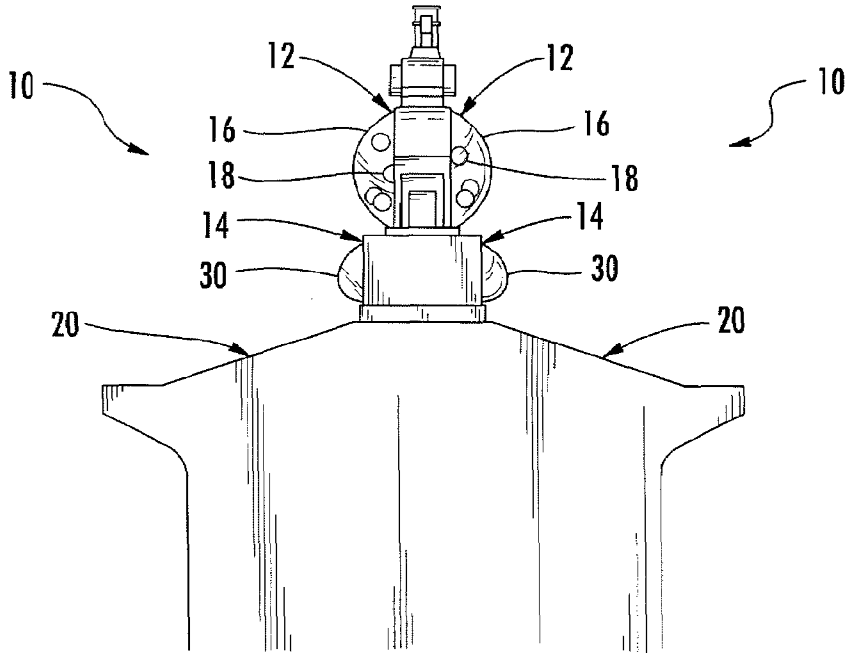
FIG. 1B is substantially a side view of an alternative embodiment of the gaming device of the present invention.

FIG. 1B represents an alternative embodiment of the present invention in which two gaming devices 10 are placed back to back. Each gaming device 10 comprises a game apparatus 20. Game apparatuses 20, shown in FIG. 1B are known as "slant top" models for their sloping upper surfaces. However, other types of gaming devices, such as the upright game apparatus 20 shown in FIG. 1A, may also be used.

In this embodiment, a separate jumbled ball display 12 is provided for each game apparatus 20. Each jumbled ball display 12 may comprise container 16 in the shape of a hemisphere. Containers 16 may be placed back to back so that the two containers have a spherical appearance when viewed from the side. Other shapes, such as cubes and cylinders, may also be used. A mirror may be placed at the back of each container 16 to enhance the appearance of the jumbled ball displays 12 by reflecting images of jumbled display balls 18 outward toward the players. Containers 16 may also be one single container that is divided in two by a mirror or other partition. Each container 16 has its own independently operated agitator and jumbled display balls 18. Each game apparatus 20 has its own independently operated prize display 14 with display window 30.

Prize Display

Referring to FIGS. 1A and 1B, prize display 14 is adapted to select a prize ball and display the ball to a player. When a bonus-activating event occurs, prize display 14 senses this, selects a prize ball, and displays the ball in a display window 30.

Turning now to FIG. 2, prize display 14 comprises a controller 76 that is adapted to control the operation of the device. Controller 76 may be one or more computers or processor boards. For example, in the presently implemented embodiment, controller 76 comprises a bonus controller and stepper motor controller, which may be manufactured by Progressive Solutions in Carmichael, Calif., a core module by Z-World in Davis, Calif., and a sound board by Clever devices in Syosset, N.Y. Other, equally suitable devices may be purchased from other manufacturers. It is recognized that controller 76 may be a single processor or processor board. Furthermore, it is also recognized that controller 76 and controller 82 may be combined in a single processor or processor board.

Controller 76 is adapted to detect when a bonus activating event occurs in game apparatus 20. This may be accomplished by game apparatus controller 82 transmitting a signal to controller 76 that a bonus event has occurred. For example, controller 82 may determine the outcome of each game and when a bonus-activating outcome occurs, it transmits a signal to controller 76. Alternatively, controller 76 may periodically interrogate controller 82. In another embodiment, one or more sensors may be provided for determining if a bonus activating event has occurred. For example, sensors 84-86 may sense the positions of reels 22-24. When reels 22-24 are in a bonus activating position, controller 76 would sense this position and begin a bonus sequence (described below). Sensors may also be provided external to gaming device 10 to detect external bonus-activating events.

Controller 82 may also transmit a variety of information to controller 76. For example, controller 82 may signal when coins or currency have been inserted, when a game starts, when an error has occurred, and when a sensor detects tampering.

When controller 76 detects a bonus-activating event, it may begin a bonus sequence by activating display 110. Display 110 may comprise many different kinds of display devices, such as video screens, lights, light emitting diodes, etc. Display 110 may comprise its own controller that is adapted to generate a variety of displays.

Display 110 may indicate that a player has qualified for a bonus round and prompt the player to perform an action. In the preferred embodiment, the player is prompted to activate the bonus sequence by pressing input device 90. Input device 90 may be a simple button, a keyboard, or a touch screen display. In the embodiment in which the player must accumulate a number of bonus symbols to qualify for a bonus, display 110 may indicate the number of symbols the player has received.

When controller 76 detects input device 90 being activated, the controller would activate the agitator in jumbled ball display 12. In the preferred embodiment, the agitator comprises blower 50, which blows air into container 16. Alternatively, the agitator may begin automatically and input device 90 may be used to initiate the display sequence. In another embodiment, controller 76 may wait a predetermined time period for the player to activate input device 90. If the player does not activate input device 90 in that time period, controller 76 would automatically activate the display 12 and initiate the display sequence. In yet another embodiment, controller 76 automatically initiates the display sequence in a predetermined time period, independent from input device 90, and input device 90 is only used to activate the jumbled ball display 12. Of course, no input device may be used and controller 76 may automatically activate display 12 and begin the display sequence.

To display a prize ball, controller 76 performs a routine to determine which ball will be displayed. This may be performed by a number of methods that are well known in the art. For example, prize balls 92 may be sequentially displayed or displayed based on external events, such as certain bonus activating events may always cause the same prize ball to be displayed.

In the preferred embodiment, however, prize balls 92 are randomly selected. Controller 76 generates a random number and then compares the random number to a pay table similar to that described for game apparatus 20 or as described in U.S. Pat. No. 5,823,874, issued to Adams. A simple pay table may appear as follows:

TABLE 1

| Random Number | Prize Ball Number | Amount Paid |
|---|---|---|
| 0.00 to 0.50 | 1 | $1.00 |
| 0.51 to 0.75 | 2 | $5.00 |
| 0.76 to 0.95 | 3 | x 2 |
| 0.96 to 1.00 | 4 | $1,000.00 |

For example, if the random number generator produced 0.65, prize ball number 2 would be displayed and $5.00 would be awarded to the player. If the random number generator produced 0.80, prize ball number 3 would be displayed. Prize ball number 3 is a multiplier ball that multiplies some amount produced by game apparatus 20. Gaming apparatus 20, for instance, may award $20 and the multiplier ball would multiply this by two, awarding the player $40.

This embodiment is not necessarily limited to the example pay table shown. A greater number of prize balls may be used and, as will be discussed below, a combination of prize balls may be displayed. Furthermore, different kinds of prizes, besides monetary prizes, may be awarded. For example, the prizes may be goods, services or additional games. The goods and services may be awarded in the form of physical objects, tickets, vouchers, coupons, etc. Additional games may be presented in the form of tickets, such as scratch off lottery tickets. In the embodiments in which tickets, vouchers, and coupons are used, the objects are dispensed using an internally or externally mounted dispenser 111. Such dispensers are well known in the art.

Once controller 76 determines the prize ball to be displayed and the prize to be awarded, the controller activates a positioning mechanism 77. Positioning mechanism 77 is adapted to position a selected prize ball (that is separate from display balls 18) so that it can be displayed. Positioning mechanism 77 may utilize a large variety of devices to achieve its purpose. In the preferred embodiment, all of the prize balls are held in a ball holder 58. Ball holder 58 may be made from a variety of materials, such as plastics, metals, or composites. In one embodiment, ball holder 58 is cast high-density urethane foam that is machined to obtain a precise shape. In the preferred embodiment, ball holder 58 is injection molded plastic.

Prize balls 92 preferably have a similar appearance to display balls 18 in container 16. This creates the illusion that balls displayed in display window 30 originate from container 16. At least one of prize balls 92 have a symbol that is capable of indicating a prize to be awarded to the player.

Prize balls 92 are stored in ball holder 58 in an individually controlled manner so that individual balls can be selectively removed from the ball holder. This allows particular balls with particular symbols or values to be individually manipulated and displayed when desired. This may be accomplished in different ways. In the preferred embodiment, ball holder 58 comprises a chamber 62 for each prize ball 92 stored in the holder. A display mechanism 29 is provided for removing ball 92 stored in chamber 62, displaying the ball, and replacing it in the chamber.

Figure 3:
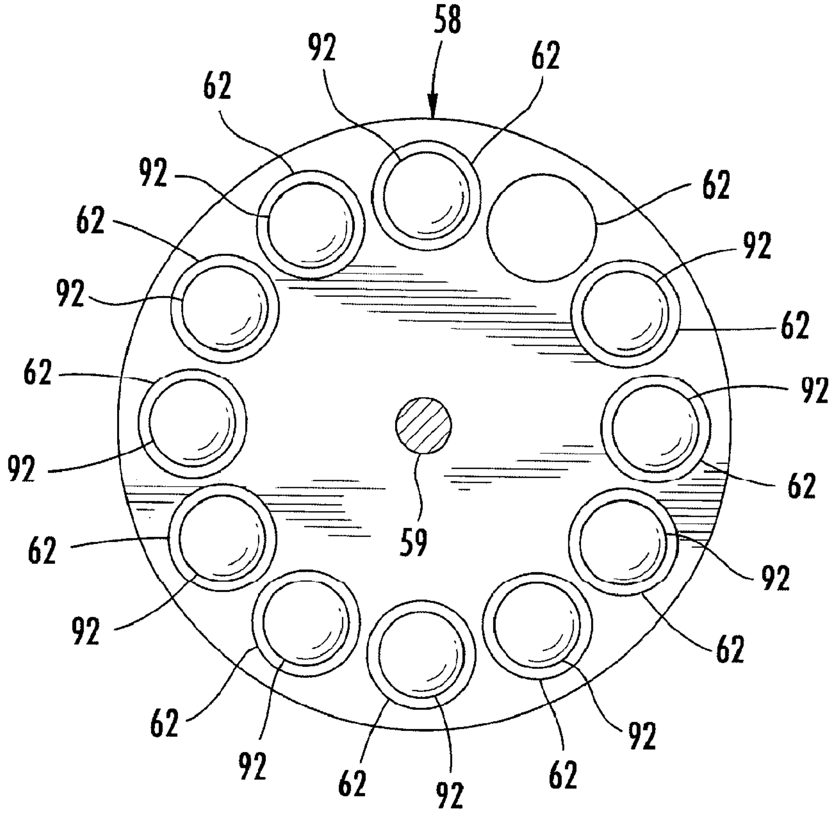
FIG. 3 is substantially a top cross sectional view of the preferred ball holder of the present invention taken along line III in FIG. 2A.
Figure 4:
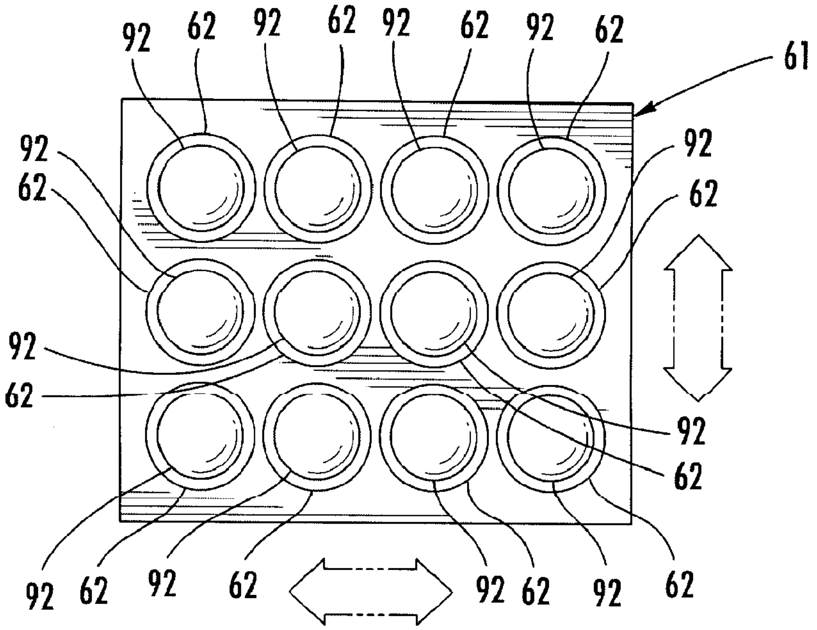
FIG. 4 is substantially a top cross sectional view of an alternative ball holder of the present invention.

In the preferred embodiment, ball holder 58 is cylindrical as illustrated in FIG. 3. Chambers 62 are positioned outward from a central axis 59 of ball holder 58, near the periphery of the holder. Thus, chambers 62 may be positioned by rotating ball holder 58 around its central axis 59. Ball holder 58 may be provided in different configurations. For example, as shown in FIG. 4, ball holder 61 may be square or rectangular with chambers 62 arranged in rows and columns. In this embodiment, controller 76 is programmed with the location of chambers 62 and ball holder 61 is positioned by moving it laterally and longitudinally. Stepper motors and gears may perform the lateral and longitudinal positioning (not shown).

Returning to FIG. 2, positioning mechanism 77 comprises a stepper motor 60 for rotating holder 58. Wheel 74, rigidly attached to holder 58, and sensor 83, not attached to the holder, are provided for determining the angular position of the holder. Thus, controller 76 can position a ball 92 in holder 58 where it can be removed and replaced by rotating the holder and monitoring its angular position. The angular position of each prize ball 92 is stored in memory in controller 76. Sensor 83 may be an infrared source and detector and the periphery of wheel 74 may comprise portions with different reflective characteristics, such as physical holes or gaps or absorbent paint lines. Alternatively, an optical flag configuration similar to that described in U.S. Pat. No. 4,911,449, issued to Bertram, may be used.

Figure 2A:
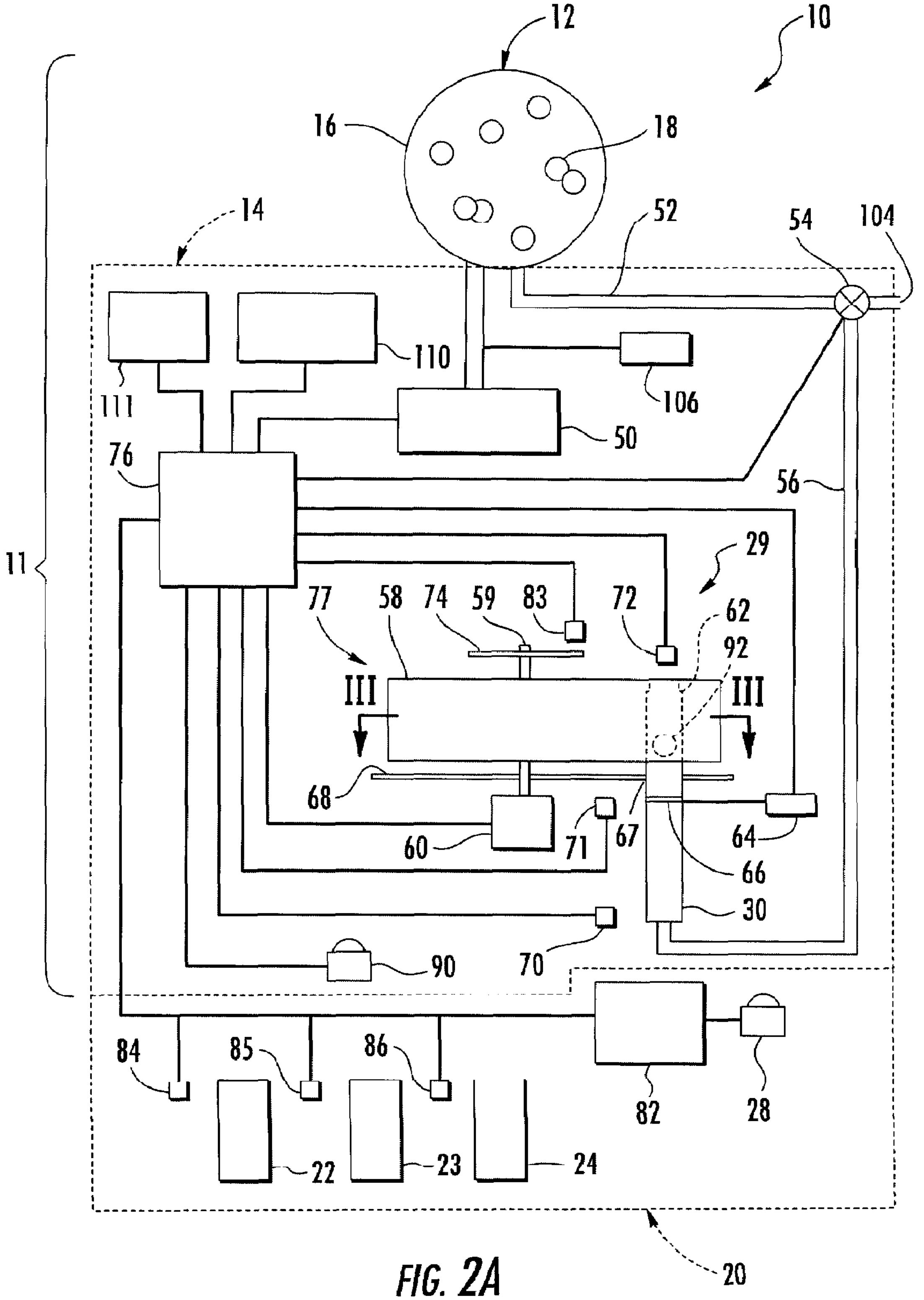
FIG. 2A is substantially a schematic diagram of the gaming device of the present invention.
Figure 5A:
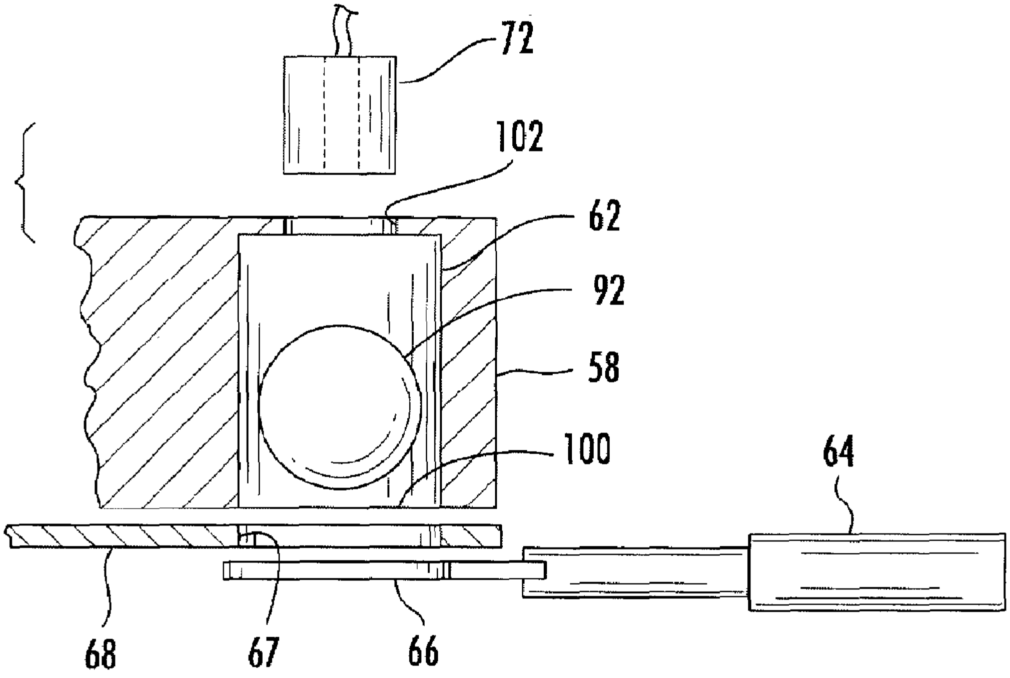
FIG. 5A is substantially an enlarged view of the ball holder shown in FIG. 2A.

In the preferred embodiment, holder 58 is arranged to allow the force of gravity to remove balls 92 from the holder. Referring now to FIGS. 2A and 5A, each chamber 62 has a lower opening 100 that is large enough for prize ball 92 to pass through. A plate 68 is provided on the lower surface of holder 58 for preventing prize balls 92 from falling out of chambers 62. A hole 67 is provided in one portion of plate 68 for allowing ball 92 to pass through the plate. A gate 66 blocks ball 92 until it is opened by an actuator 64. Gate 66 may cover the entire hole 67 or just a portion of it and it may be operated in a sliding or hinged manner. Actuator 64 may be an electrical solenoid actuator.

Figure 5B:
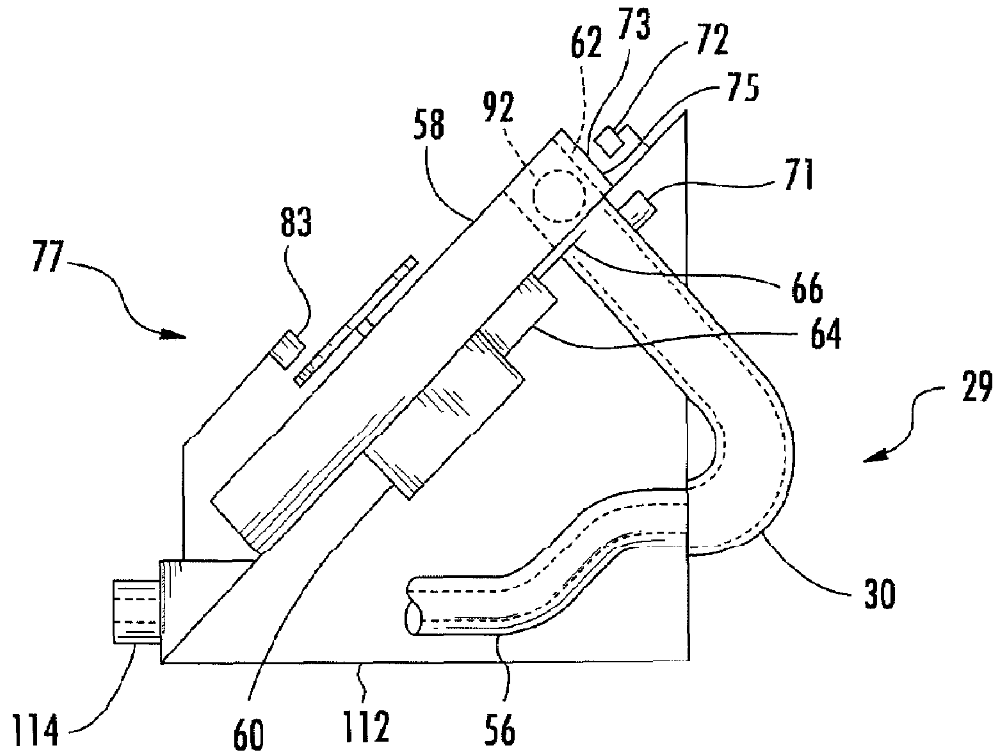
FIG. 5B is substantially a side elevational view of the positioning and display mechanisms of the preferred embodiment of the present invention.

FIG. 5B represents a preferred embodiment in which a chassis 112 supports ball holder 58 at approximately a forty-five degree angle to the vertical. Mounting grooves (not shown) may be provided in prize display 14 for slidably receiving chassis 112 and connector 114 may be provided for connecting electrical circuits and devices to power supplies and controller 76. One of the advantages of this embodiment is that positioning mechanism 77 and display mechanism 29 can be easily serviced by removing chassis 112 from prize display device 14.

Referring to FIGS. 2A and 5A, in normal operation, after controller 76 has determined which ball is to be displayed, the controller rotates holder 58 until the desired prize ball 92 is positioned over the plate hole 67. At the appropriate time, controller 76 activates actuator 64 to open gate 66. The force of gravity then pulls prize ball 92 downward through hole 67 into display window 30. Display window 30 may be a chamber with a transparent or partially transparent wall that allows the player to see selected prize ball 92. In the preferred embodiment, display window 30 comprises a tube that projects outward from the front surface of prize display device 14. This allows players to view prize ball 92 from many different angles and see symbols on the ball. Sensors 70 and/or 71 may be used to verify that prize ball 92 has fallen into display window 30. If sensors 70 and/or 71 do not detect ball 92 in its proper position, controller 76 may enter an error mode.

If the ball is detected in its proper position, controller 76 may cause display 110 to display the prize, if any, that the player has won. Other effects may also be presented, such as pre-recorded sound from speakers. If the actual prize is money, the amount of the prize may be added to the player's credit meter or the prize may be dispensed from dispenser 111 or coin dispenser 27.

After ball 92 has been displayed long enough, controller 76 operates a valve 54 to divert exhaust air from container 16. While blower 50 is in operation, air is allowed to escape container 16 through an exhaust duct 52. Valve 54 is used to divert air from a vent 104 to a display duct 56. Display duct 56 directs air to the bottom of display window 30 where it blows the ball 92 upwards back into chamber 62. An upper opening 102 is provided in chamber 62 for allowing air to escape from the chamber thereby producing an air current. Sensors 72 and/or 71 may be used to verify that ball 92 has returned to chamber 62. If the ball is not detected in its proper position, controller 76 may enter an error mode and an attendant is called. In the preferred embodiment, shown in FIG. 5B, sensor 72 is placed next to the peripheral wall 75 of ball holder 58 and a hole 73 is provided in the peripheral wall next to each chamber 62.

Components of the present invention may be arranged alternatively so that ball display window 30 is located above holder 58 and ball 92 is blown upwards into the display. When valve 54 is closed, the force of gravity pulls ball 92 back into chamber 62. In this alternate embodiment, once ball 92 has returned to chamber 62, controller 76 closes gate 66 by activating actuator 64, turns off blower 50, and waits for the next activating event.

A power failure or power surge could cause actuator 64 to malfunction and improperly open gate 66 while prize display 14 is idle. This would cause prize ball 92 to fall out of chamber 62 into display window 30, thereby giving a false indication that the player had won a prize. In order to prevent this, in the preferred embodiment, at least one chamber 62 does not have prize ball 92 (see FIG. 3). This empty chamber is positioned over hole 67 whenever prize display 14 is idle.

Of course, other methods for agitating display balls 18 may be provided. In addition, other methods for actuating and displaying prize balls 92 may be used. The present invention is not limited to any particular method or apparatus for agitating or displaying display balls 18 and/or prize balls 92.

For example, in certain embodiments, including embodiments discussed further below, display balls 18 may be agitated by actuation of jumbled ball display 12. If display balls 18 are agitated by actuation of jumbled ball display 12, it may be desirable to employ other methods of actuating and displaying prize balls 92. For example, if an air compressor is not needed for agitation of display balls 18, it may be beneficial to modify the method of displaying prize balls 92 so that the air compressor may be eliminated from game apparatus 20.

Figure 2B:
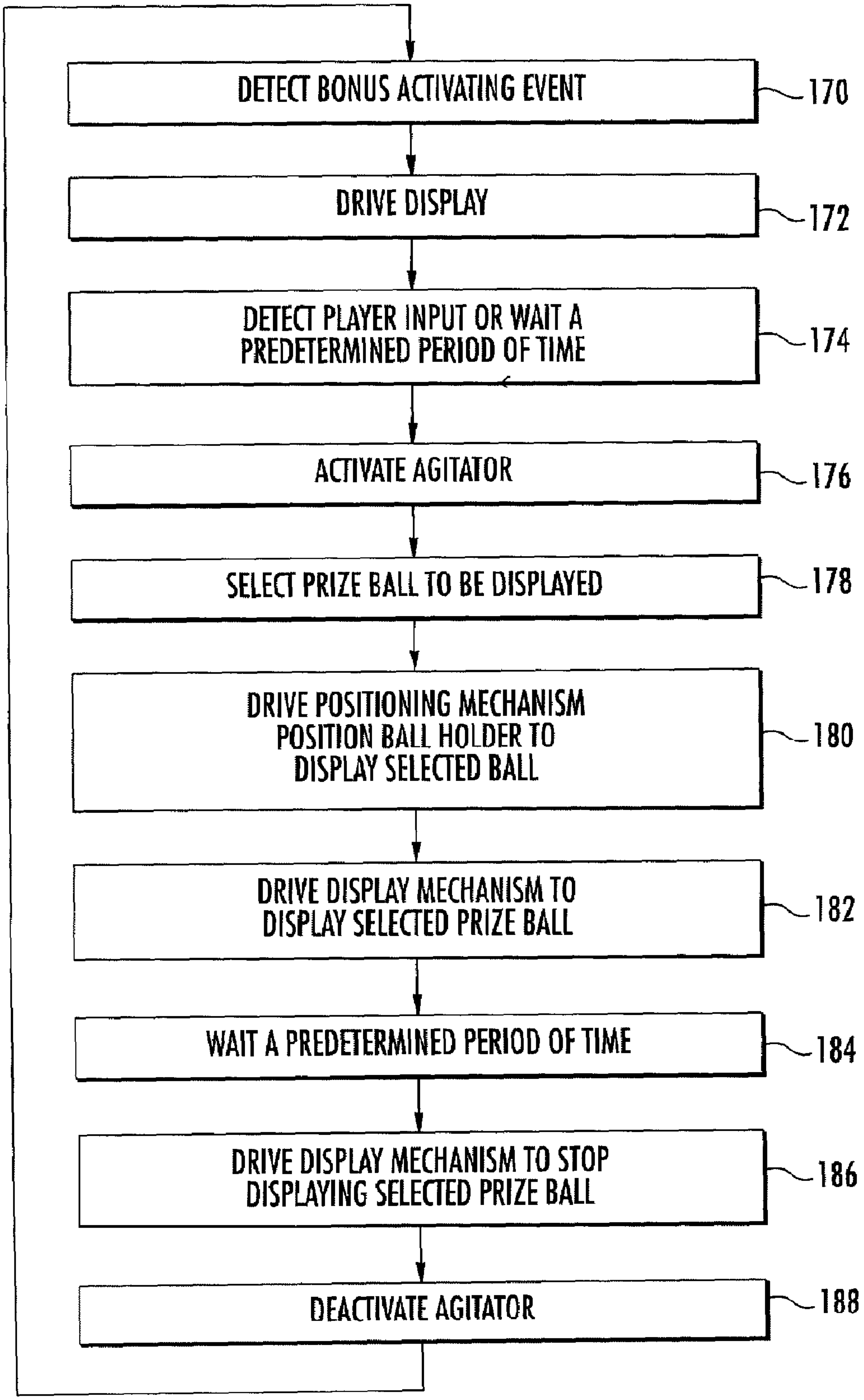
FIG. 2B is substantially a flow chart showing one of the many ways the display device may be operated.
Figure 2C:
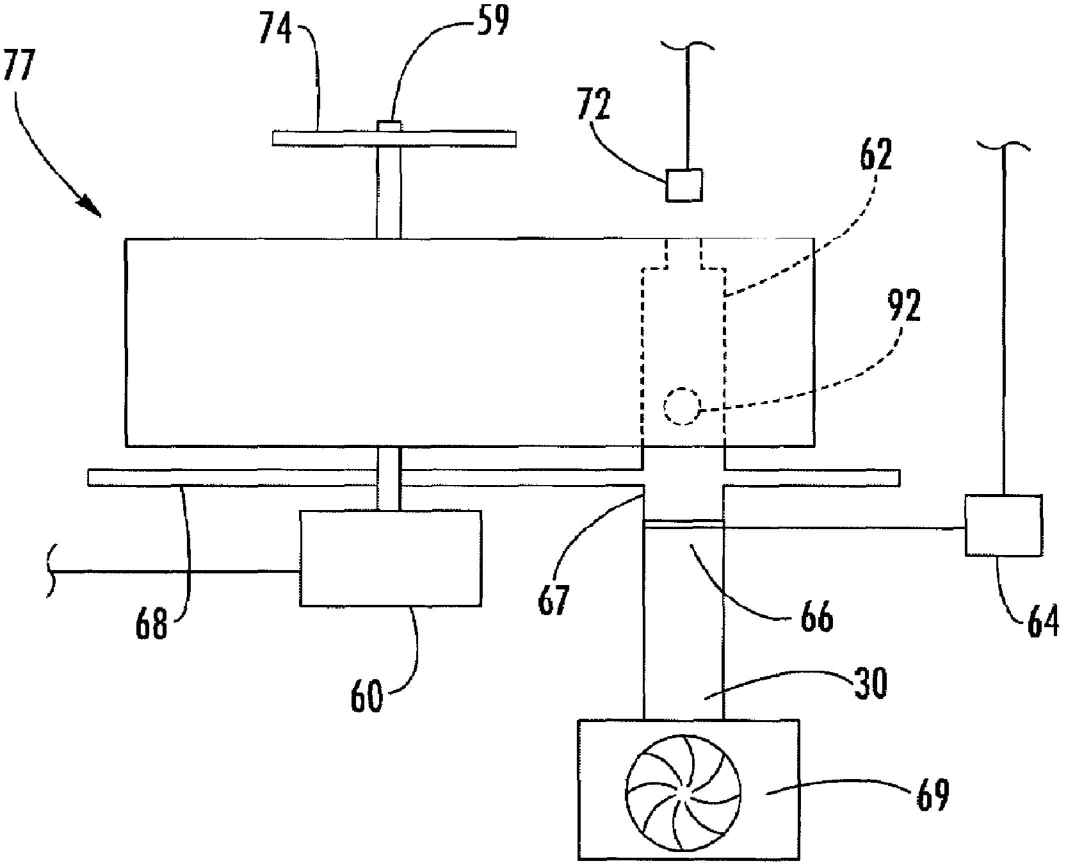
FIG. 2C is substantially a schematic diagram of an alternate prize ball display mechanism for use in the gaming device of FIG. 2A.

For example, as illustrated in FIG. 2C, rather than opening valve 54 to divert air to display duct 56 (as in FIG. 2A), an air source or blower can be located below display window 30. For example, a fan 69 may be placed below display window 30. When activated by controller 76, fan 69 operates and creates a stream of air that blows display ball 92 in display window 30 back into chamber 62. Although many fans can be used, one suitable fan is DC brushless fan motor model number BG0703-B044-000 available from Minebea Co., Ltd. of Tokyo, Japan. Of course, other air sources besides fans may be used without departing from the scope of the present invention.

Because some balls are very light, static electricity can cause the balls to stick to each other and to other components. To prevent this, a variety of static discharge devices 106 may be placed in various locations in the present invention. In the preferred embodiment, static discharge device 106 (FIG. 2A) is a bare stranded copper wire with its strands spread out. The wire is placed in the flow of air between agitator 50 and container 16 and wire is attached to a common ground.

Prize display 14 of the present invention may also comprise means for simultaneously displaying a plurality of balls 92. To accomplish this, plate 68 may have multiple holes 67 (not shown), each with its own gate 66 and actuator 64, for supplying balls to multiple display windows. Thus, holder 58 may be positioned so that the appropriate ball is positioned over the appropriate hole 67 for supplying the appropriate display window 30. Alternatively, a plurality of ball holders 58 may be provided, each one supplying balls to a separate display window 30.

Figure 6:
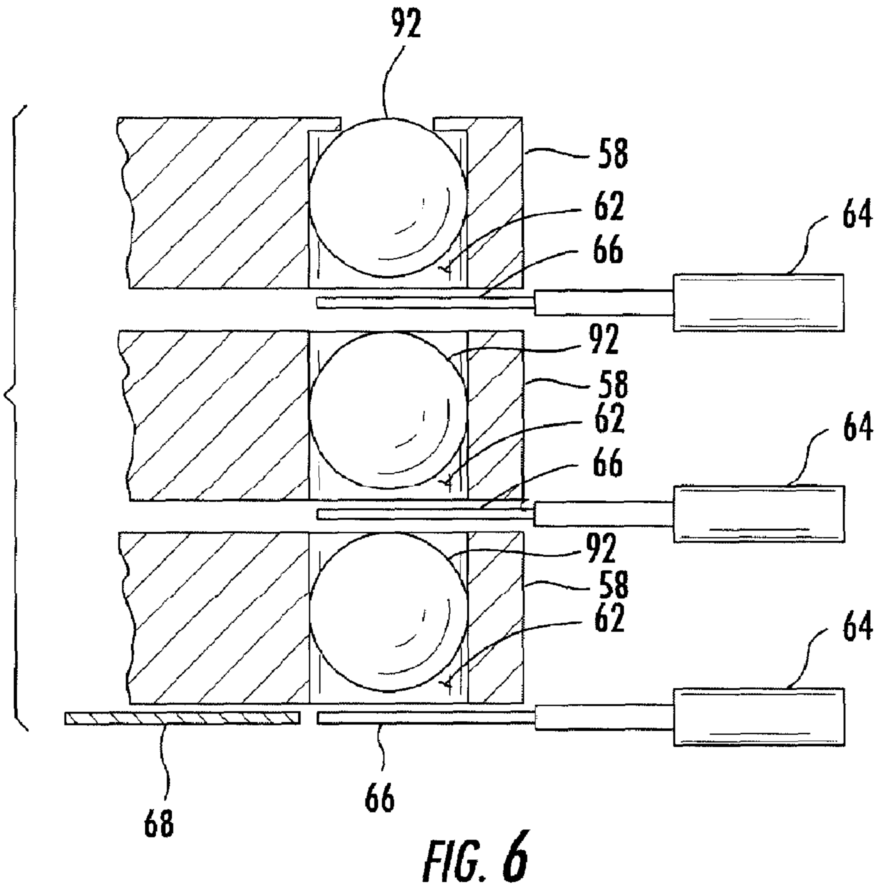
FIG. 6 is substantially a schematic diagram of an alternative embodiment of the present invention using multiple stacked ball holders.

In yet another embodiment, seen in FIG. 6, a plurality of separately controlled ball holders 58 are arranged in a stack. Each ball holder 58 is rotated to a position so that chambers 62 are aligned above display window 30(FIG. 1A). Gates 66 are then opened and balls 92 are allowed to fall into display window 30. In this embodiment, display window 30 is large enough to display three balls simultaneously. When the display period has ended, balls 92 are blown back into chambers 62 and gates 66 are closed to separate and contain the balls. The action of gates 66 separates prize balls 92 into separate chambers 62.

With multiple balls being displayed, it is possible to use combinations of balls to indicate various bonus outcomes. It is also possible to replace the primary display of a gaming device with selector and prize display device 14. In other words, game apparatus 20 may be entirely replaced with selector and prize display device 14.

Figure 7:
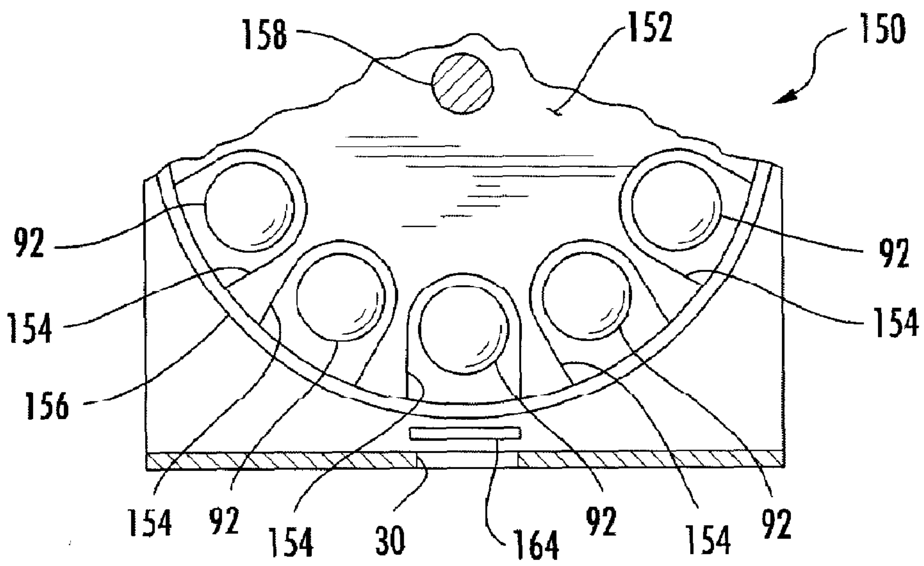
FIG. 7 is substantially an alternative display mechanism of the present invention.

As seen in FIG. 7, the present invention comprises an alternative display mechanism 150. Display mechanism 150 comprises a cylindrical ball holder 152 that may be rotated around its central axis 158. Ball holder 152 comprises a plurality of chambers 154 positioned along the periphery of the holder, each chamber is adapted to hold ball 92. Unlike the embodiment described in FIG. 2A, it is not necessary to remove and replace balls 92 from chambers 154. Instead, at least a portion of the outer wall of each chamber 154 comprises a transparent material that allows players to view balls 92 inside the chamber. The transparent wall may comprise a ring of transparent material 156 that surrounds holder 152. A shutter device or door 164 may be provided between display window 30 and holder 152 for blocking the view of players while the holder is rotated. Although this embodiment has the advantage of a simpler mechanism, it may be less entertaining to players because it may be more apparent to the players that balls 92 do not originate from jumbled ball display 12.

Figure 1C:
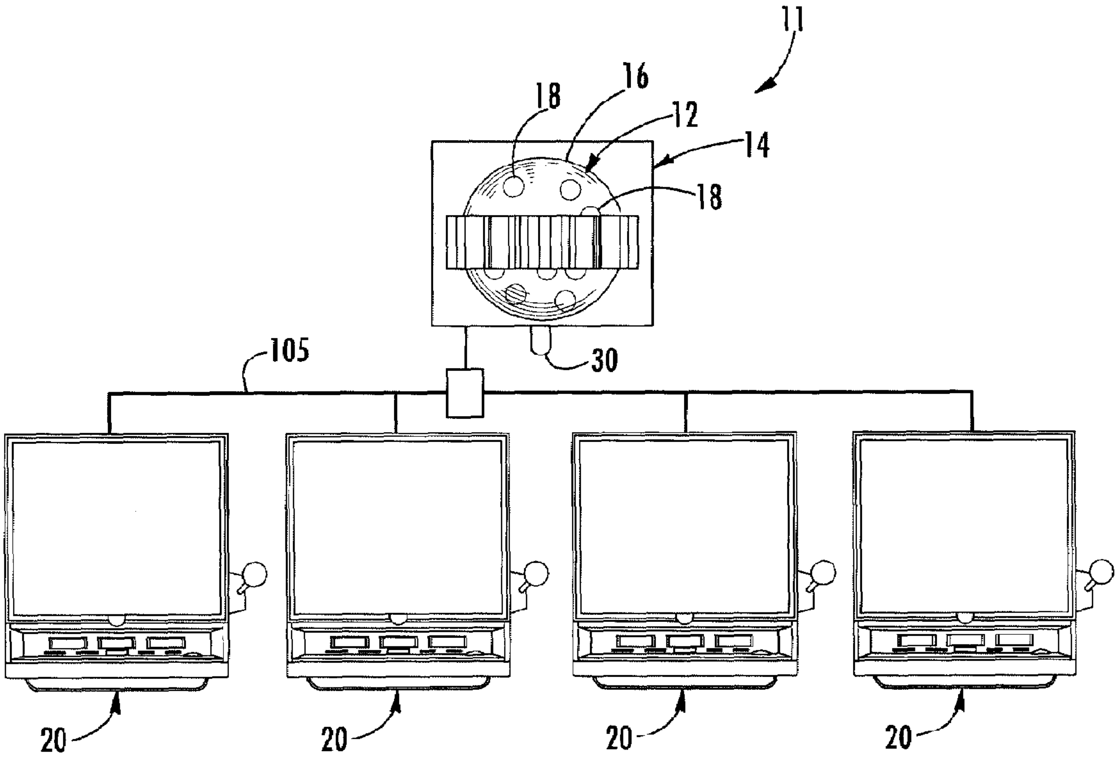
FIG. 1C is substantially a top schematic diagram of the display device of the present invention in use with a plurality of game apparatus.

As seen in FIG. 1C, a single display device 11 may also be used with a plurality of game apparatus 20. In this embodiment, each game apparatus is in communication with display device 11 by a communication device 104. Communication device 104 may be a network cable, such as an Ethernet cable, and appropriate hardware, such as network interface cards, may be included in display device 11 and game apparatus 20. When one of the game apparatus 20 produces a bonus-activating event, a signal is sent to display device 11. A prize ball may then be selected and displayed as described above.

Turning now to FIG. 2B, the operation of prize display 14 begins when controller 76 detects a bonus-activating event 170. Controller 76 may then drive display 110 to display an appropriate presentation or message 172. As discussed above, controller 76 may wait for player input from input device 90 (shown in FIG. 2A) or it may wait for a predetermined period of time 174. At some point, controller 76 activates the agitator 176 and selects a prize ball to be displayed 178 from ball holder 58. Controller 76 then drives positioning mechanism 77 to position ball holder 58 so that the selected prize ball may be displayed 180 and causes display mechanism 29 to display the selected ball 182. Controller 76 may then wait a predetermined period of time so that the player may see the displayed prize ball 184, after which it causes display mechanism 29 to stop displaying the selected prize ball 186. The agitator is then deactivated 188 and controller 76 returns to a monitoring state to detect the next bonus activating event 170.

Bingo

Figure 8:
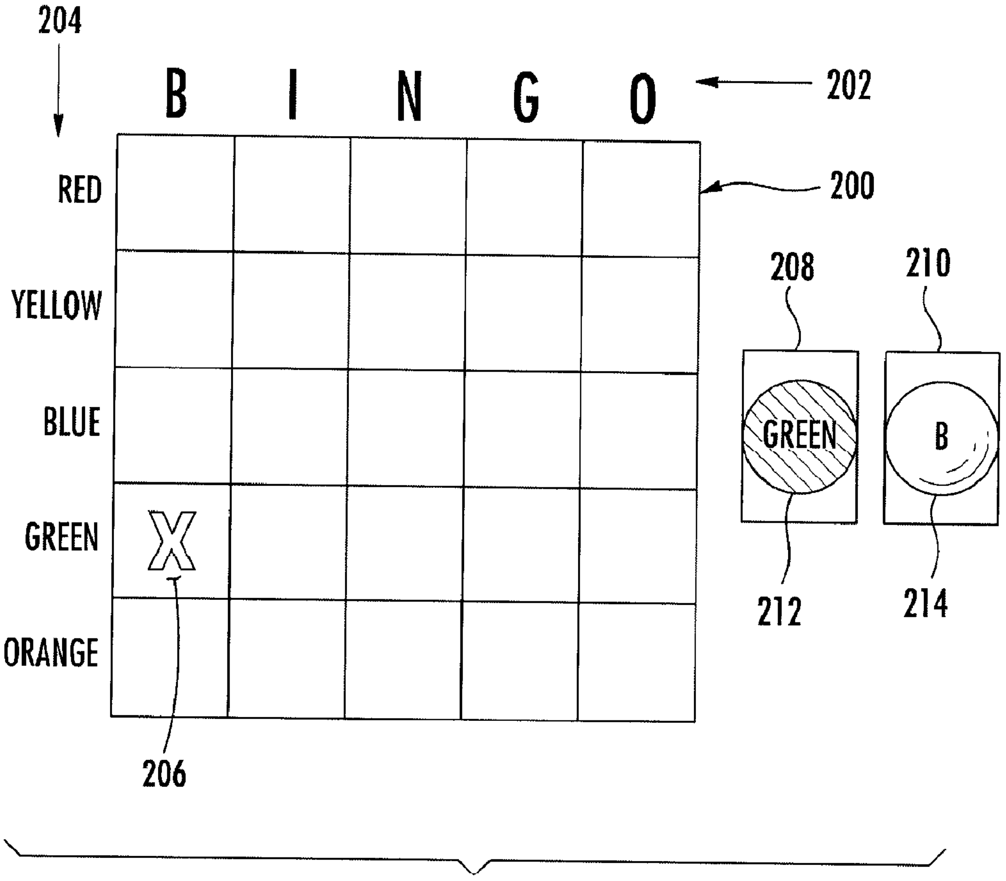
FIG. 8 is substantially a schematic representation of a bingo game that may be used with the present invention.

A number of games have been developed to take advantage of the unique features of the present invention. As seen in FIG. 8, one of the games of the present invention comprises a bingo card 200 that may be displayed by a display device, such as an LCD, LED, CRT, or backlit translucent material. The horizontal axis of the card may comprise alphabetic or numeric characters 202 and the vertical axis of the card may comprise colors 204. The alphanumeric characters and the colors may be randomly arranged for each new game, thereby adding variety to the game.

In the Bingo embodiment, prize display 14 comprises two display windows 208 and 210. Each display window 208 and 210 may have its own individual ball holder 58 and prize balls 92 (not shown in FIG. 8). Ball display 208 corresponds to the vertical axis with balls 212 therein displaying colors and ball display 210 corresponds to the horizontal axis with balls therein displaying alphabetic or numeric characters.

In this game, the player wins a bonus prize by filling all of the spaces in a row, column, diagonal line, or combination of rows, columns, and diagonal lines with a symbol. For example, when the player qualifies for a bonus award, prize display 14 may randomly select and display a green ball 212 and a ball 214 with the letter "B" on it. A symbol 206 may then be displayed in the space where the "B" column and the green row intersect. Play would continue in this way until the player wins a prize. Once a prize is won, card 200 may be cleared so that the bonus game may be replayed.

Figure 9:
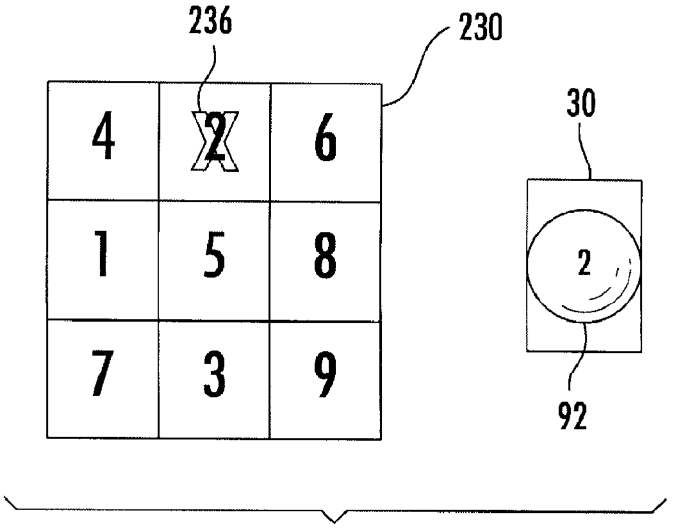
FIG. 9 is substantially a schematic representation of an alternative bingo game that may be used with the present invention.

An alternative embodiment of the Bingo bonus game is disclosed in FIG. 9. In this embodiment, a bingo card 230 displays a plurality of symbols. The symbols may be randomly arranged on card 230 for each game. When display window 30 displays a ball 92, displaying a symbol thereon, a symbol 236, such as an "X," is placed on the corresponding space on bingo card 230.

Figure 10:
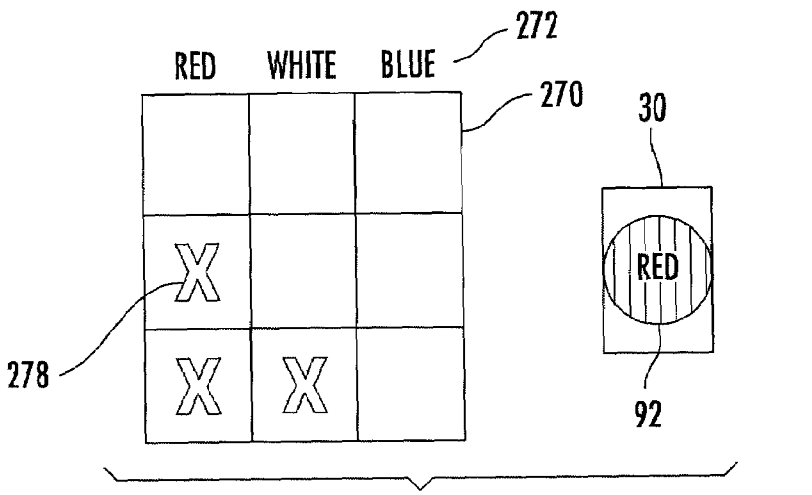
FIG. 10 is substantially a schematic representation of an alternative bingo game that may be used with the present invention.

In another embodiment, shown in FIG. 10, card 270 is divided into a plurality of columns. Each column corresponds with a particular type of symbol or color. The columns preferably have labels 272 on a horizontal axis. As prize display 14 displays a ball 92 in display window 30, a symbol 278 is placed in a space in the column that corresponds to the symbol on the ball. In this embodiment, the player is awarded a prize when all of the spaces in at least one column are filled. Card 270 is then cleared so that play can repeat.

Of course, many different variations of the Bingo bonus game may be utilized with the present invention. For example, larger or smaller cards and different symbols or combination of symbols may be used with the invention.

Lottery

Figure 11:
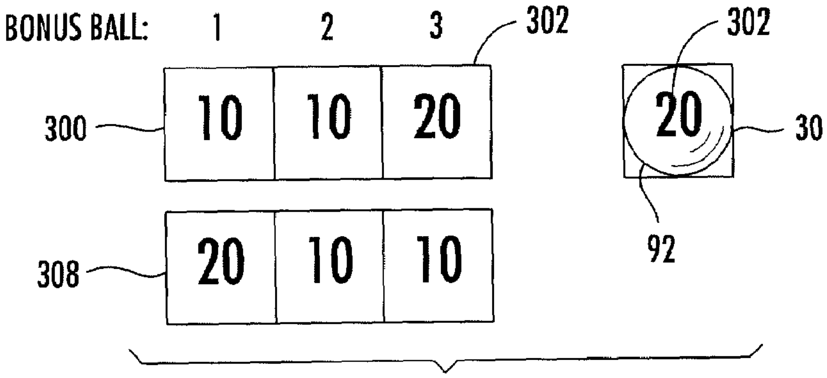
FIG. 11 is substantially a schematic representation of a lottery style game that may be used with the present invention.

An embodiment may provide a game that follows a format similar to a lottery game. In this embodiment, seen in FIG. 11, prize ball 92 is selected and displayed in display window 30 in the same manner as other embodiments discussed above. Each time a ball is selected, a symbol 302 on the prize ball 92 is recorded in a first symbol display 300. In the example shown in FIG. 11, the number "10" has been recorded in the first and second areas for balls that have been previously selected and the number "20" is displayed in the third area for the most recent ball 92 selected. A second symbol display 308 is provided for displaying a randomly selected set of numbers. The numbers displayed in second display 308 may be generated with a random number generator that is adapted to select only the numbers that may be displayed on prize balls 92. Alternatively, similar to well known lottery games, the player may be allowed to pick the numbers in display 308. Of course, a greater or lesser number of spaces may be provided in displays 300 and 308.

In the preferred lottery embodiment, the player is paid the amount shown on each prize ball 92 as it is displayed. Thus, in the example in FIG. 11, the player would be paid 20 credits or dollars for number 302 that is presented on the currently displayed ball 92. In addition to the prize displayed on ball 92, the player may qualify for an additional amount if the symbols displayed in first symbol display 300 are the same as the symbols displayed in second symbol display 308. In one embodiment, the symbols in first symbol display 300 must be in the same order as the symbols displayed in second symbol display 308. Thus, in the example shown in FIG. 11 the player would not win a prize because the order of the numbers is not the same. In another embodiment, the order of the numbers is irrelevant. Thus, in the example shown in FIG. 11 the player would win a prize because the symbols in first symbol display 300 are the same as the symbols in second symbol display 308. A modified version of the second embodiment would award a larger prize to the player if the order of the numbers in the two displays 300 and 308 were the same. In yet another embodiment, the prize that is awarded to a player is a progressive jackpot of a type that is well known in the art.

Player Selection

Figure 12:
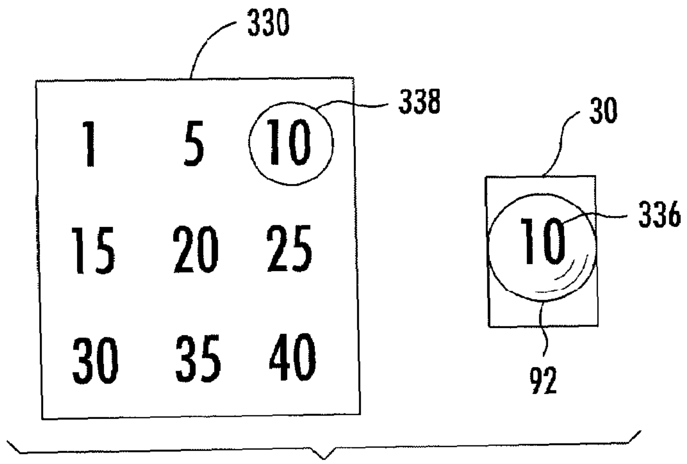
FIG. 12 is substantially a schematic representation of a player selection game that may be used with the present invention.

In another embodiment, the player selects a symbol or symbols from a list of symbols that the player may receive. Illustrated in FIG. 12, a display device 330 may be provided that displays a plurality of different symbols. When the game begins, the player may be prompted to select one of the possible symbols. In the case of a touch screen, the player may select the symbol by pressing the symbol with the player's finger. Other selection devices, such as buttons, may also be used. A graphical indicator may be used to indicate that the symbol has been selected, such as a circle 338 around the symbol. Once the symbol has been selected, the prize display 14 selects a prize ball and displays it in display window 30. If a symbol 336 on ball 92 matches the symbol selected by the player, the player is awarded a prize. In an alternative embodiment, the player is awarded the prize shown on the ball and the player receives an additional prize if the symbol on the ball matches the symbol selected by the player.

The player selection embodiment of the present invention may be combined with the lottery embodiment of the present invention. In this combination, the player is asked to select a plurality of numbers. If the symbols on the balls selected by prize display 14 are the same as the symbols selected by the player, the player is awarded a prize.

One of the advantages of providing the games discussed above is to increase the excitement and enjoyment of playing gaming device 10. Not only are the games entertaining to view, but they also increase the excitement and enjoyment experienced by players by offering large prizes. Each of the games can be adapted to award large prizes because they are capable of producing low probability events from which the large prizes are awarded.

In addition, the games may be adapted for use as the primary game. Thus, game apparatus 20 may be completely replaced with the games of the present invention.

Video Display Embodiment

Figure 13:
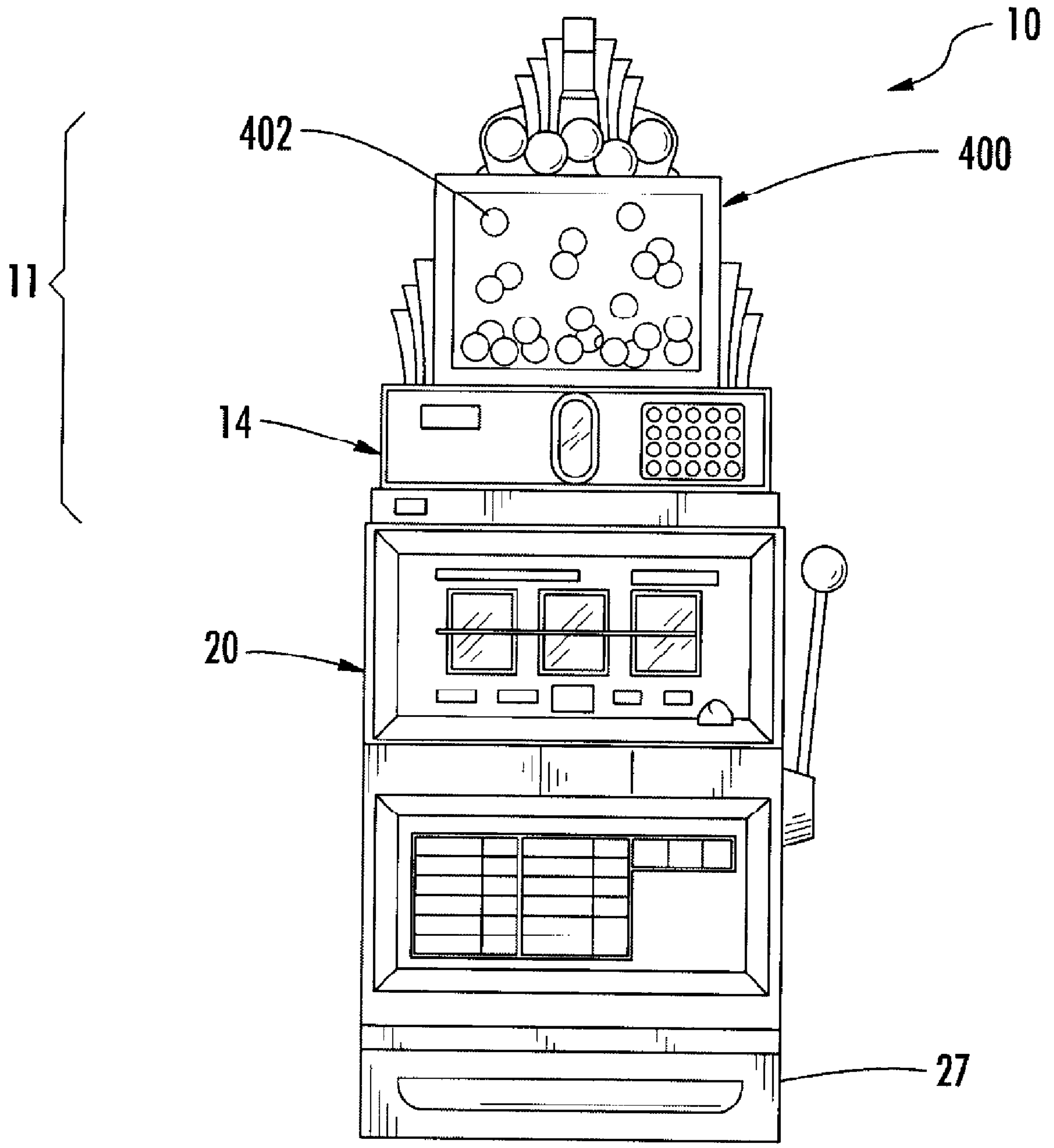
FIG. 13 is substantially a front view of the gaming device of the present invention utilizing a video display device.

As seen in FIG. 13, an alternative embodiment that utilizes a video display device. In this embodiment, jumbled ball display 12 (see FIG. 1) is replaced by video display device 400. Video display device 400 presents an image of display balls 402 that is shown to the player. Video display device 400 may be any of a large number of display devices that are well known in the art. For example, video display device 400 may be a cathode ray tube of a type that is used with many personal computers.

Video display device 400 is in communication with controller 76 (see FIG. 2A). Controller 76 transmits messages to video display device 400 to request the display device to produce different displays. For example, controller 76 may send a signal to video display device 400 when a bonus activating event has occurred to show balls 402 in an agitated state. After a bonus ball is selected and displayed, controller 76 may send another signal to video display device 400 to show the balls returning to a resting state.

Video display device 400 may comprise a video controller (not shown) that drives the display device to present various displays. Many different well-known video controllers may be used. Software and data used to produce different presentations may be stored on the video controller in non-volatile memory, such as compact disks, magnetic disk drives, or erasable programmable read only memory (EPROM).

Of course, video display device 400 may display other information in graphic and text form, such as instructions on how to use gaming device 10. Speakers may also be provided for presenting audio information, such as the sound of agitated balls or music when a prize is won.

This video display embodiment has the advantage of reducing maintenance because the moving parts of the jumbled ball display are eliminated. This embodiment also provides greater flexibility because many different kinds of presentations may be displayed on the video display device 400.

Gaming device 10 disclosed in FIG. 13 utilizes video display device 400 in place of jumbled ball display 12, but prize display 14 is provided to select and display physical prize balls, which may be adapted to appear to originate from the video display device. However, it is recognized that video display device 400 may be used in place of prize display 14 as well. In this embodiment, video display device 400 could display a prize ball that appears to be randomly selected from the agitated display balls.

Alternative Jumbled Ball Display Embodiments

Figure 14:
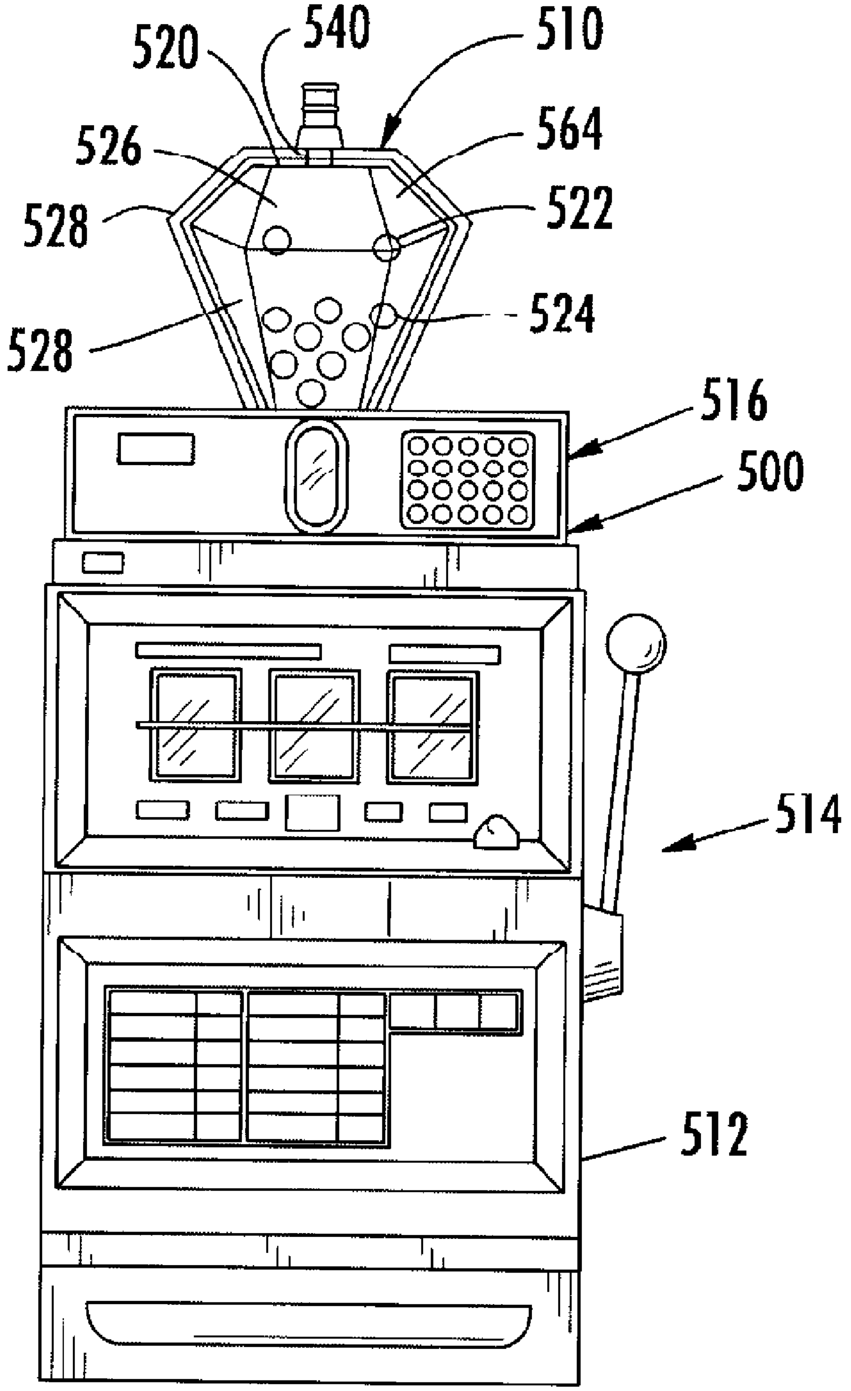
FIG. 14 is a front plan view of an alternative embodiment, having a moveable or action ball or unit container extending upwardly from the top section of the gaming machine housing.

With reference now to FIG. 14, another jumbled ball display embodiment 500 provides a jumbled action unit or action ball display container 510 rotatably mounted on the top of the gaming machine housing 512. The gaming machine housing 512 has mounted within it: an underlying gaming device, generally 514; a game ball selector display, generally 516, such as described in connection with other embodiments above; and the separate, rotatable action ball container 510 extending upwardly from the top of the gaming machine housing 512. The action ball container 510 has an outer frame 518 surrounding a windowpane container 520 containing action balls, for example, 522, 524, viewable from outside the container through the windowpane sidewalls, for example, 526, 528, of the container 520.

Figure 15:
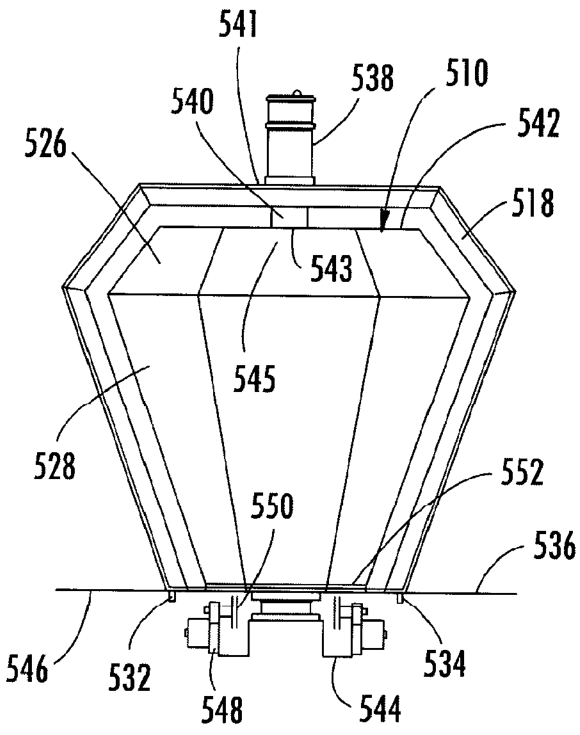
FIG. 15 is a front plan, partially sectional view of the action ball container of FIG. 14 as mounted on a top planar mounting plate.

Referring now to FIG. 15, the windowpanes, e.g., 526, 528, are preferably made from clear or colored acrylic, such as aesthetically attractive lightly blue-tinted acrylic available from Tripp Plastics, Inc., Reno, Nev. The windowpanes, for example, 526, 528, preferably are secured to each other by a durable, clear and strong adhesive.

Alternatively, the windowpanes, for example, 526, 528, could be made of tempered glass. The glass panes, 526, 528, may then be secured in a window frame structure (not shown) well known to those skilled in making window pane frame containers, such as those used to providing outside household lighting.

The outer frame 518, which is somewhat U-shaped, surrounds the periphery of the window pane structure and the external sides of the window panes, for example, 526, 528, to penetrate mating mounting passages 532, 534 in a planar mounting plate 536 on the top of the gaming machine housing 512. A decorative frame cap 538 is mounted on the uppermost side 541 of the outer frame 518, and the top center of the outer frame 518 has an internal, vertically extending tubular frame bearing with associated bearing passage (not shown) that matingly receives an upwardly extending rod bearing 540, which penetrates the frame bearing passage in the frame bearing in the outer frame 518. In this fashion, the action ball container 510 may rotate with respect to the outer frame 518 about the axis of the upwardly extending rod bearing 540, which is secured at its lowermost section 543 to the top center 545 of the action ball container 510. The frame bearing passage and rod bearing 540 are both preferably made of ABS plastic, although other suitable bearing materials also may readily be used.

A rotating drive assembly 544 is mounted to the underside 546 of the mounting plate 536. The rotating drive includes drive gears, for example, 548, 550, that penetrate mating gear teeth slots (not shown) in a bottom drive plate 552 secured to the bottom of the container window frame structure.

Figure 16:
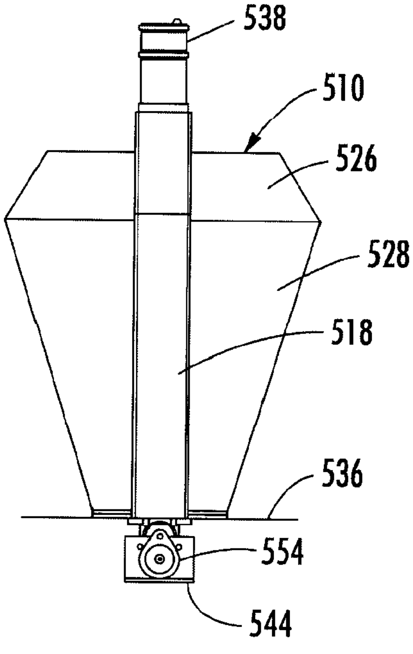
FIG. 16 is a side plan, partially sectional view of the action ball container of FIG. 15.
Figure 17:
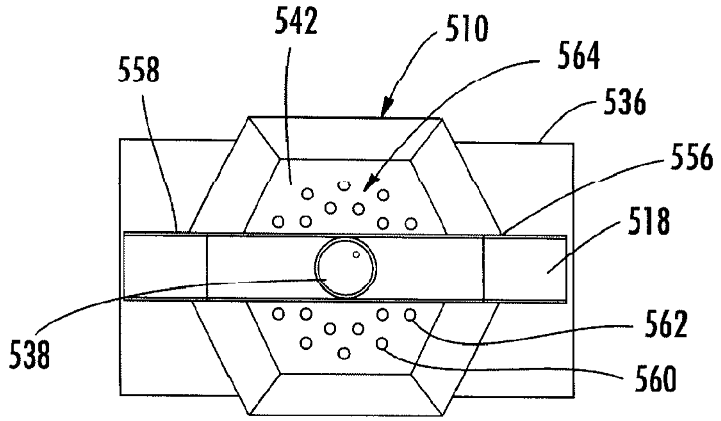
FIG. 17 is a top sectional elevational view of the action ball container of FIG. 15.

With reference now to FIG. 16, it should be noted that the rotating drive assembly 544 includes a drive gear cover 554 not shown in FIG. 15. In addition, the outer frame 518 extends vertically upwardly from the mounting plate 536 and is relatively substantially narrower in width than the widths of a given window pane, for example, 526, 528. As shown in FIG. 17, the outer frame 518 also extends laterally outwardly from, or to the side of, the window frame structure and the windowpanes, for example, 526, 528, on opposing sides 556, 558 of the window frame structure.

With continuing reference to FIG. 17, the planar top 542 of the window frame structure consists of hexagonal window pane 542 with a number of air passages, for example, 560, 562, penetrating the plate 542 to provide channels for the passage of air from within the interior container section, generally 564, bounded by the window frame structure and window panes, to the exterior of the interior container section. As shown in FIG. 14, the action balls or units 522, 524 are mounted and secured within this interior container section 564 by the action ball container 510, which is secured in position by the associated outer frame 518, frame bearing housing 538, and rod bearing 540.

Figure 18:
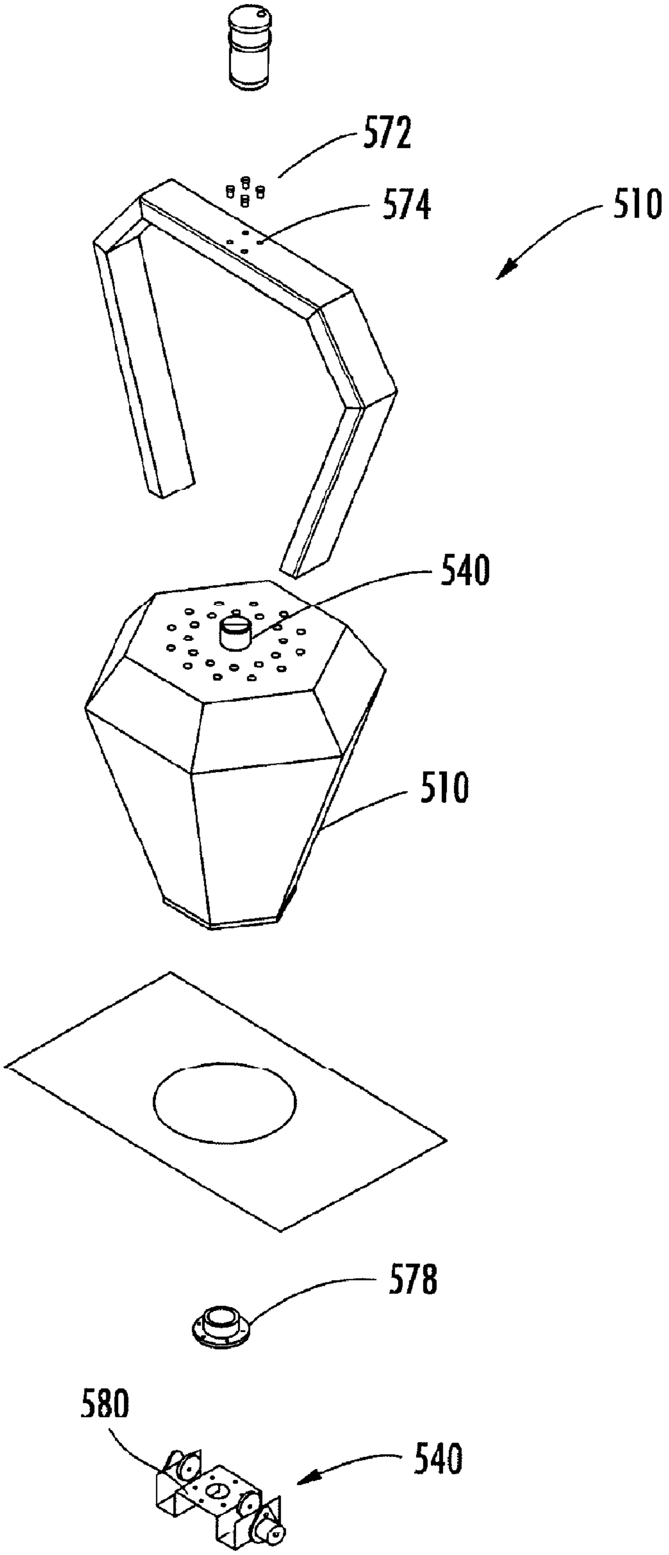
FIG. 18 is an exploded view of the action ball container of FIG. 15.

With reference now to FIGS. 17 and 18, the frame bearing housing 538 and its associated internally mounted frame bearing (not shown) are secured to outer frame 518 by fasteners, for example, 572, penetrating fastener passages, for example, 574, surrounding the axis of the frame bearing passage (not shown) in the outer frame 518. In turn, the rod bearing 540 penetrates the rod bearing passage in the frame bearing, and a lower, tubular ABS rod bearing 578 penetrates a mating horizontal bearing passage (not shown) in the bottom drive plate 552, as shown in FIG. 15. The lower ABS bearing 578 is secured by fasteners (not shown) to the top side 580 of the drive assembly 544 in order support the action ball container 510 in rotatable position with respect to the outer frame 518 on the top of the gaming machine housing 512 as shown in FIGS. 14 and 15.

Figure 19:
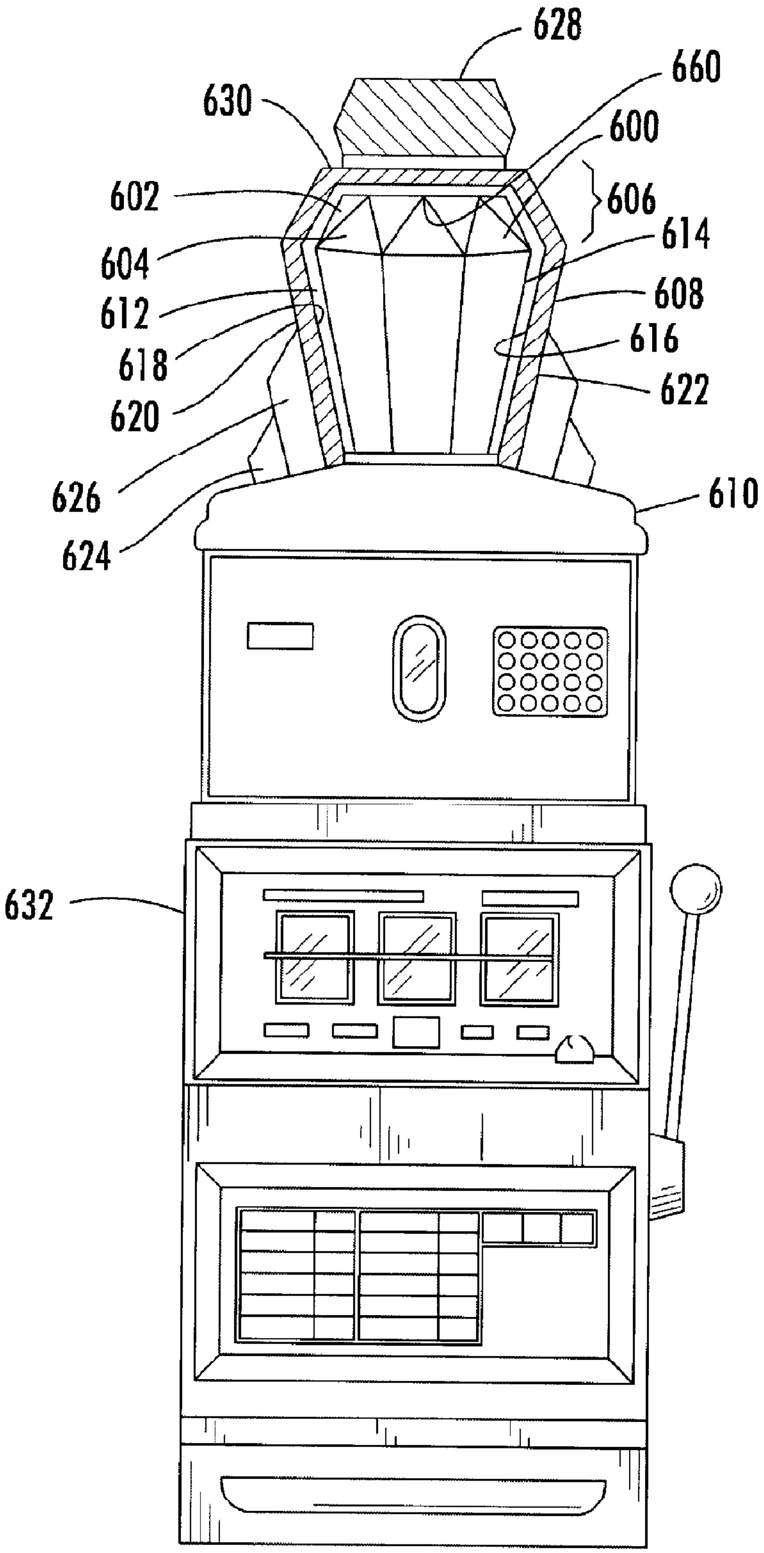
FIG. 19 is a front plan view of a yet alternative embodiment, having a slip driven upwardly action ball container cooperatively mounted on an underlying gaming machine housing, and associated gaming machine apparatus, generally of the type shown above in FIG. 1A.
Figure 20:
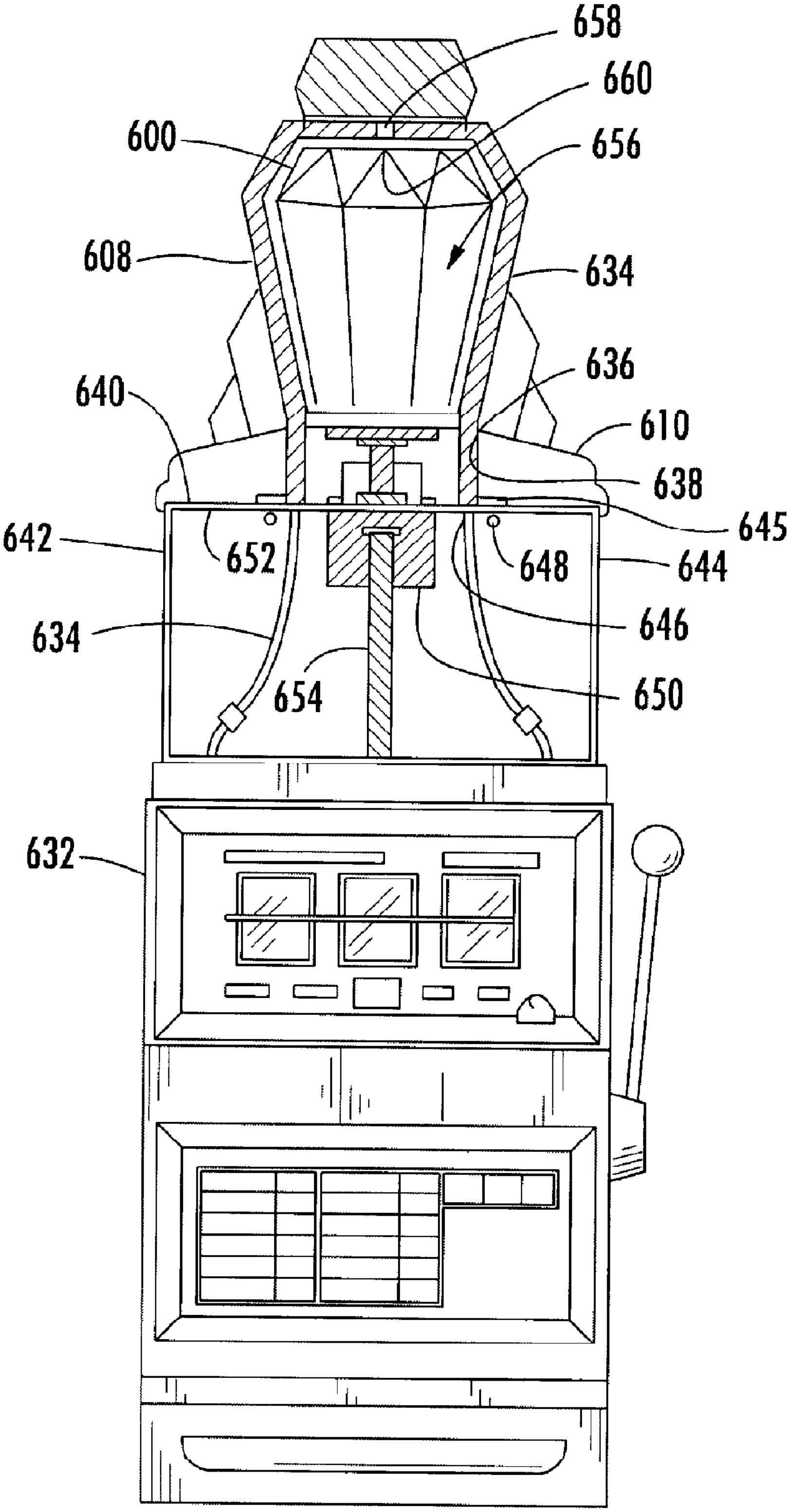
FIG. 20 is a front plan, partially sectional view of the slip drive embodiment of FIG. 19 showing the slip drive and agitating air blower mounted below the action ball container.
Figure 21:
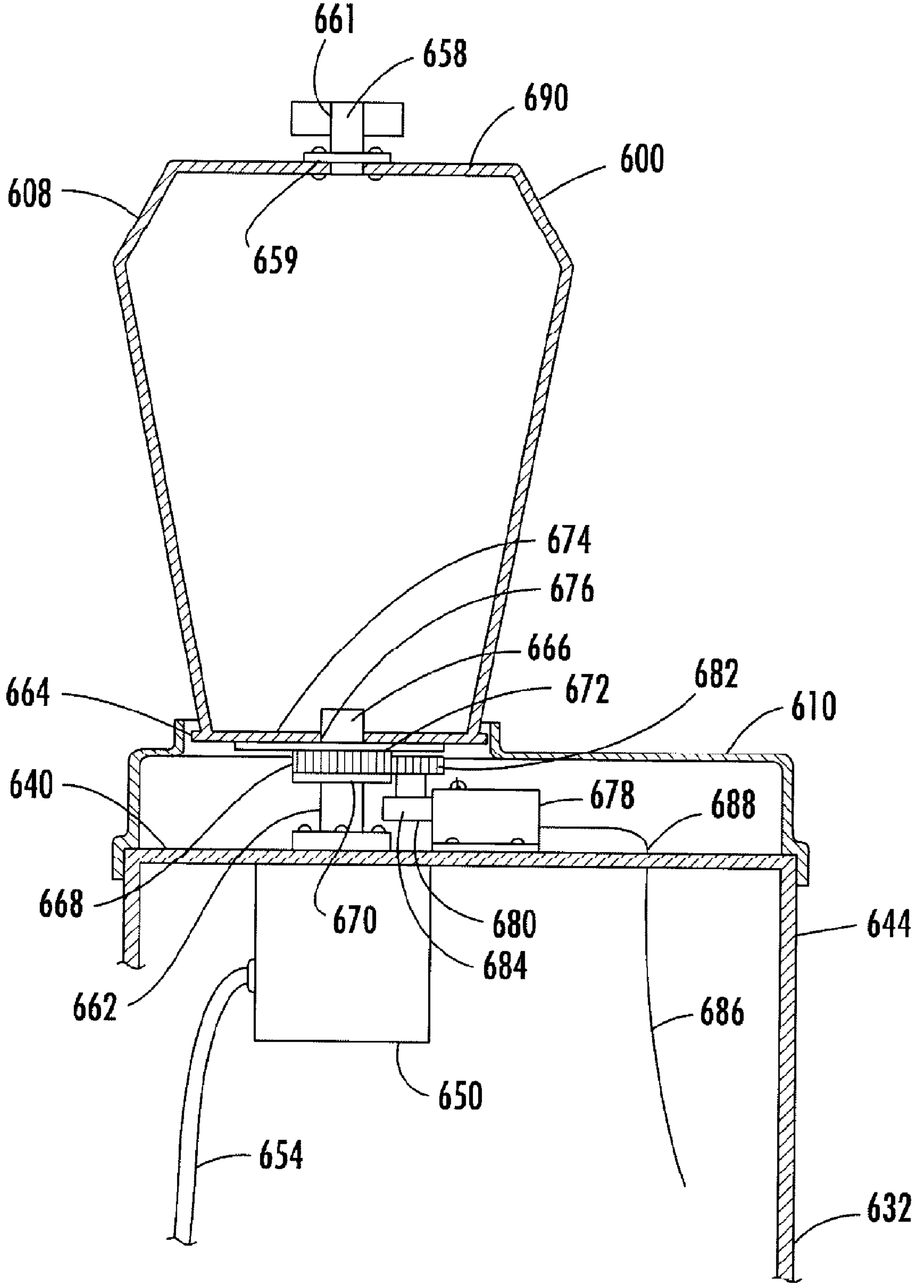
FIG. 21 is generally sectional side view of the action ball container of FIGS. 19 and 20 mounted on the upper housing section of the underlying gaming machine housing.

An alternative slip drive arrangement for an action ball or unit container 600 is shown in FIGS. 19-21. With reference to FIG. 19, this action ball container 600 has somewhat more windowpanes, for example, 602, 604, in the upper section 606 of the action ball container 600. These window panes 602, 604 in the upper section 606 are each, for example, 604, triangular rather than, as shown in FIG. 15, trapezoidal for upper window pane 526 in the FIG. 15 embodiment.

The FIG. 19 embodiment also includes a somewhat inverted and protective U-shaped outer frame 608 extending upwardly from a plastic upper gaming machine housing cap 610 to surround the opposing lateral sides 612, 614 of the action ball container 600. The internal sides 618, 616 of the outer frame 608 adjacent the opposing lateral sides 612, 614 of the action ball container 600 include inwardly directed lighting LED's (not shown) facing toward the adjacent lateral sides 612, 614 in order to illuminate the action ball container 600 and its contents. Other frame shapes maybe readily substituted of course to alter the aesthetic appearance or functionality of the outer frame 608.

Adjacent each of the external opposing sides, for example, 620, of the outer frame 608, a first upwardly extending attractor light bar 624 abuts a second upwardly extending attractor light bar 626, which in turn abuts the respective external side 620 of the outer frame 608. The first and second attractor light bars 624, 626 extend upwardly from the upper gaming machine housing cap 610, which is preferably made of rigid, resilient plastic or pressed metal.

A lighted game sign 628 extends vertically upwardly from the uppermost horizontally extending side 630 of the outer frame 608. Power is supplied to the lighted game sign 628, the attractor light bars, for example, 624, 628, and the outer frame internal lighting LED's by wiring (not shown in FIG. 19; see, for example, 634 in FIG. 20) passing through an internal wiring passage (not shown) in the outer frame 608, then through, as shown in FIG. 20, wiring passages (not shown) in the machine housing cap 610 into the gaming machine housing 632.

With continuing reference now to FIG. 20, each of the opposing outer frame legs, for example, 634, has a lowermost vertically extending section 636, which penetrates a mating frame leg mounting passage 638 in the machine housing cap 610 to abut a planar, horizontally extending mounting plate 640 that extends from one outer lateral side 642 of the gaming machine housing 632 to the gaming machine's opposing outer lateral side 644. Each vertically extending section, for example, 636, has an integral bent, horizontally extending support arm 645 extending outwardly from the lowermost edge 646 of the vertically extending section 636, and a fastener 648 secures the support arm, and thereby the outer frame 608, to the mounting plate 640. Preferably, the fastener 648 consists of a bolt section welded, and extending downwardly from, to the lower side of the horizontal support arm 645 and a mating nut threaded to the bolt section.

An air blower 650 is mounted to the underside 652 of the mounting plate 640. A wiring harness 654 is secured to the air blower 650 to provide power from a power supply (not shown) in the gaming machine housing 632. The air blower 650 provides compressed air through air supply passages (not shown in FIG. 20) into the lowermost interior section, generally 656, within the action ball container 600. The compressed air thus agitates and moves lightweight plastic action balls (such as Keno balls, not shown) in the action ball container 600 and then exits upper air passages (not shown) extending centrally, vertically, and co-axially upwardly through the action ball container 600, an upper ABS tubular outer frame bearing 658 secured, as shown in FIG. 21, at its lower end 659 by fasteners to the axial center of the generally planar top section 660 of the action ball container 600 and retained at its upper end 661 within a mating aperture in the outer frame 608.

With continuing reference to FIG. 21, the air blower 650 provides an upwardly extending air supply tube (not shown) that extends through an air tube passage (not shown) in the mounting plate 640 to penetrate a coaxial air tube passage (not shown) in a substantially tubular ABS support tube 662 secured to and extending vertically upwardly from the mounting plate 640. The uppermost planar edge of the ABS support tube 662 supports a matingly abutting metal ring bearing 670. The upper and lower surfaces of the ring bearing 670 may be planar or may have radially extending ridges, providing less friction contact between the ring bearing 670 and abutting surfaces.

An ABS driven external spur gear 664 has a tubular, compressed air supply delivery section 666 extending vertically above and below an integral, horizontally or laterally outwardly extending driven spur gear tooth plate section 668, the lower planar surface of which rests on the upper surface of the ring bearing 670. The lower tubular section (not shown) of the driven external spur gear 664 matingly penetrates a central circular aperture in the ring bearing 670 to also penetrate the upper tubular interior (not shown) of the ABS support tube 662.

A planar slip drive ring 672 in turn rests on, and is thereby in driving contact with, the upper planar surface of driven spur gear tooth plate section 668 with the upper tubular section of the ABS driven external spur gear 664 penetrating through and extending upwardly above the generally horizontally disposed slip drive ring 672. The diametral width of the slip drive ring 672 is substantially wider than the diametral width of the driven spur gear tooth plate section 670 but only slightly less than the diametral width of the circular bottom plate 674 of the action ball container 600. The circular bottom plate 674 thus rests on, and is also in driving contact with, the upper surface of the slip drive ring 672 and has an axially centered support and air supply aperture 676, through which the upper tubular section of the ABS driven external spur gear 664 passes in order to secure the action ball container 600 while providing an agitating air supply passage into the lower section of the action ball container 600. The slip drive ring 672 is preferably made of a rigid, resilient plastic and has roughened (not smooth or flat) upper and lower surfaces in order to increase frictional driving contact with abutting surfaces of the ABS driven spur gear 664 and the circular bottom plate 674 described above.

A substantially inverted U-shaped pinion drive housing 678 is secured by fasteners to the upper side of the mounting plate 640 laterally spaced from external periphery of the ABS driven external spur gear 664. A pinion drive 680 is mounted by fasteners substantially within the confines of the pinion drive housing 678 but with its axial pinion gear drive section 684 extending laterally or horizontally outwardly from the pinion drive housing 678 in the direction of the ABS driven external spur gear 664 in order to drive an ABS pinion spur gear 682, which matingly engages the driven spur gear tooth plate section 668 in order to drive rotation of the ABS driven spur gear 664 when the pinion drive 680 is activated. When the pinion drive 680 is activated, the ABS pinion spur gear 682 thus drives rotation of the slip drive ring 672 through friction contact between the slip drive ring 672 and the ABS driven external spur gear 664, which in turn drives rotation of the circular bottom plate 674 and thereby the action ball container 600 through friction contact between the slip drive ring 672 and the circular bottom plate 674.

Power wiring 686 is secured at one end to the pinion drive 680 and passes through an aperture 688 in the mounting plate 640 in order to connect to a power supply (not shown) within the gaming machine housing 632. The pinion drive 680 is activated upon receipt of electrical power through this power wiring 686, and preferably, this electrical power, as well as that to the air blower 650, is provided during the entire time the gaming machine within the gaming housing 632 is activated. In this fashion, the rotatable action ball container 600 rotates and agitates action balls within the action ball container 600 whenever the underlying gaming machine is turned on except when, as a result of the slip drive arrangement, the action ball container 600 ceases rotation due to interference with the rotation of the action ball container 600 by, for example, contact with a patron or interfering object. The action ball container 600 resumes rotation automatically upon removal of the interference provided that power is still being provided to the pinion drive 680.

One advantage of the alternative action ball container embodiments are that they each can provide a rotating, simulated agitated action ball container that attracts attention to the underlying gaming machine, as well as to any other associated machines in the vicinity of the underlying gaming machine. These embodiments also can provide the impression that outcome balls are selected from this container, while avoiding problems—such as environmental or regulatory problems—associated with game ball selection of an outcome-determinative game ball from agitated game balls in a container. These embodiments can thus allow a game player to play a keno-like or other game ball or action unit selection game, while avoiding environmental or regulatory problems associated with games that select from among visible, agitated action balls or other action units to provide outcome or award balls for display to the game player.

At least one embodiment may provide an action ball or unit container with a slip drive linkage between the action ball container and container drive. The slip drive preferably renders this embodiment less likely to be damaged by persons or objects that may interfere with the rotation of the container. At the same time, this slip drive embodiment also can be less likely to damage anything that may come into contact with the rotating action ball container, such as by falling between the container and the frame surrounding the container. The slip drive may allow the rotating container to (i) stop rotating when the drive faces sufficient (and preferably relatively slight) resistance, and then (ii) automatically resume rotating of the action ball container when the resistance is removed with the container still in position on the gaming machine housing. It is to be understood that the preferred, disclosed slip drive is only one possible type of slip drive or clutch arrangement that could be substituted or added to accomplish to some degree one or more or these types of advantages.

Cage Jumbled Ball Display Embodiment

Figure 22:
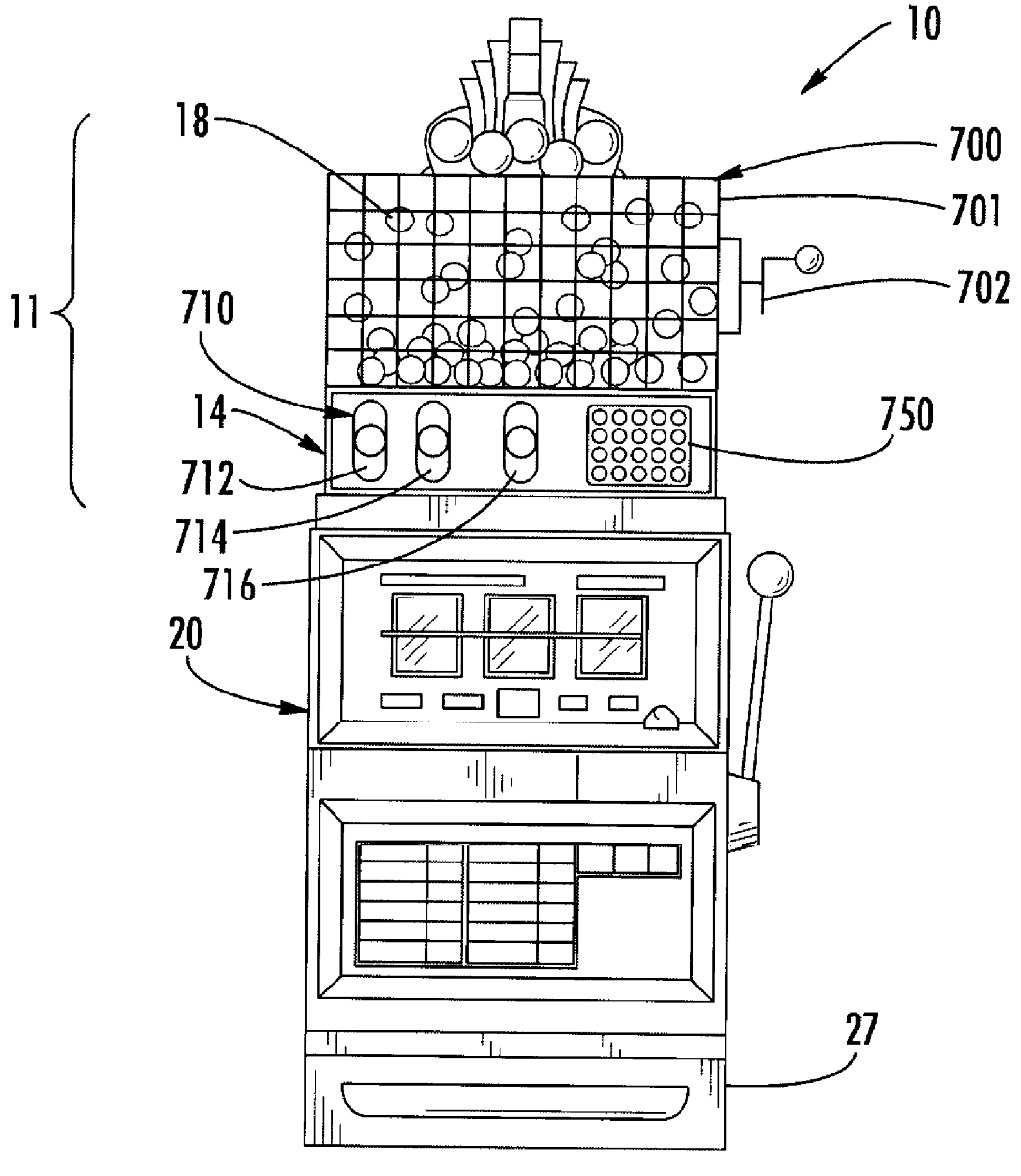
FIG. 22 is substantially a front elevational view of another embodiment of the gaming device of the present invention including a cage-type display.

Referring to FIG. 22, the present invention comprises an alternative embodiment wherein jumbled ball display 12 is replaced by display 700. Display 700 may be a cage-type display. Cage-type display 700 may include an actual cage 701 formed from wire mesh that is adapted to hold a number of display balls 18. Alternatively, cage-type display 700 may be a representation of a cage and may be formed from other materials, such as injection molded plastic or sheet metal. As used herein, the term "cage" is used to refer to an actual cage, a replica, a representation of a cage, or an image of a cage. Of course, other representations of display 700 could be used.

Figure 29:
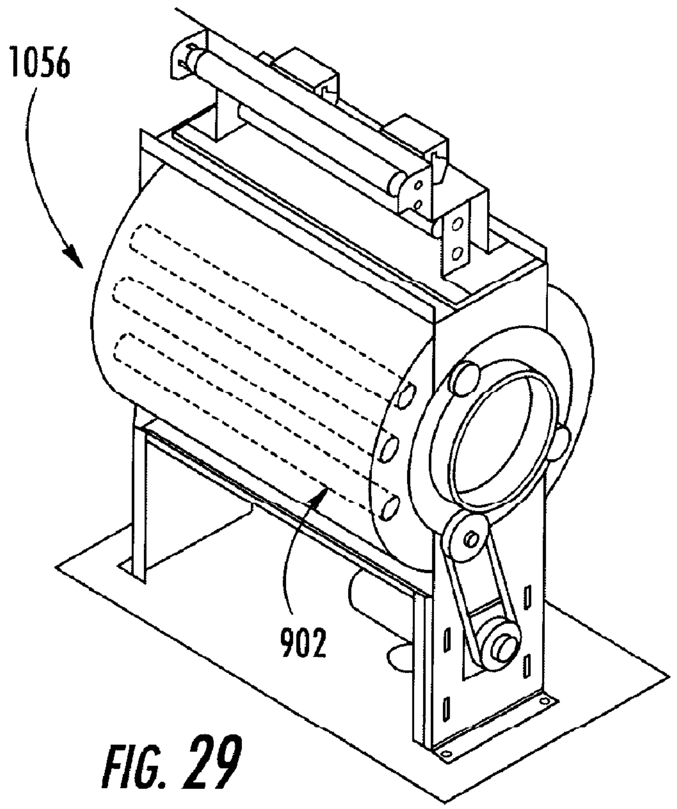
FIG. 29 is substantially a front view of one embodiment of a gaming device according to the present invention.
Figure 30:
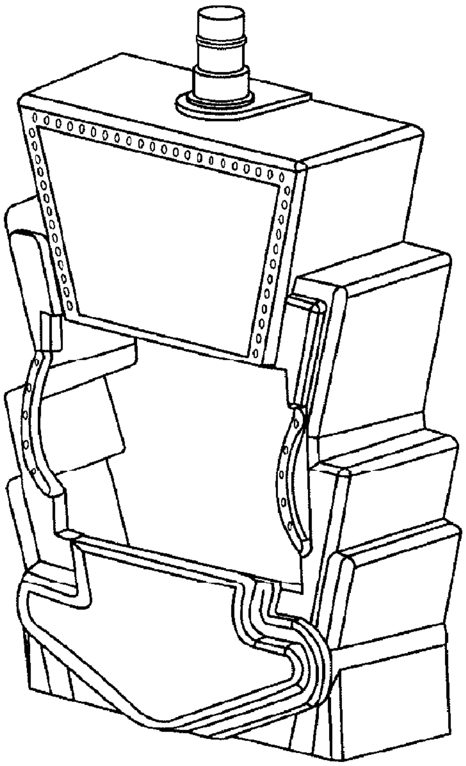
FIG. 30 is substantially a front view of one embodiment of a gaming device according to the present invention.

In a presently preferred embodiment, cage-type display 700 may be a substantially cylindrical container. The cylindrical container can be made of a variety of materials, including Plexiglas and various types of plastic. The cylindrical container is preferably hollow and filled with a number of display balls 18. One suitable housing and display are illustrated in FIGS. 29 and 30.

Displays 700 are also preferably provided with accent lighting in order to enhance the visual appearance of the gaming device and to attract attention to the gaming device. For example, when display 700 is a cylindrical object, lights may be placed on the ends of the cylinder. Various types of lights can be used, including, for example, LED, fluorescent, neon, and incandescent lights.

Cage 701 is preferably mounted to game apparatus 20 above prize display 14. Prize display 14 preferably comprises a group of display windows 710 and a game display 750.

Cage 701 may be fixed or may be rotatably mounted to game apparatus 20. In the embodiment wherein cage 701 is fixed (not shown), a variety of agitators described above and not shown in FIG. 22, such as an air stream or a mechanical mixer, may be used to stir the prize balls.

In the embodiment where cage 701 is rotatably mounted to game apparatus 20, cage 701 may include an axle (not shown) that rotates on cage sidewalls (not shown), which may be provided on each side of the cage 701. An actuator (not shown) may cause the axle to rotate thereby causing cage 701 to rotate.

Figure 23:
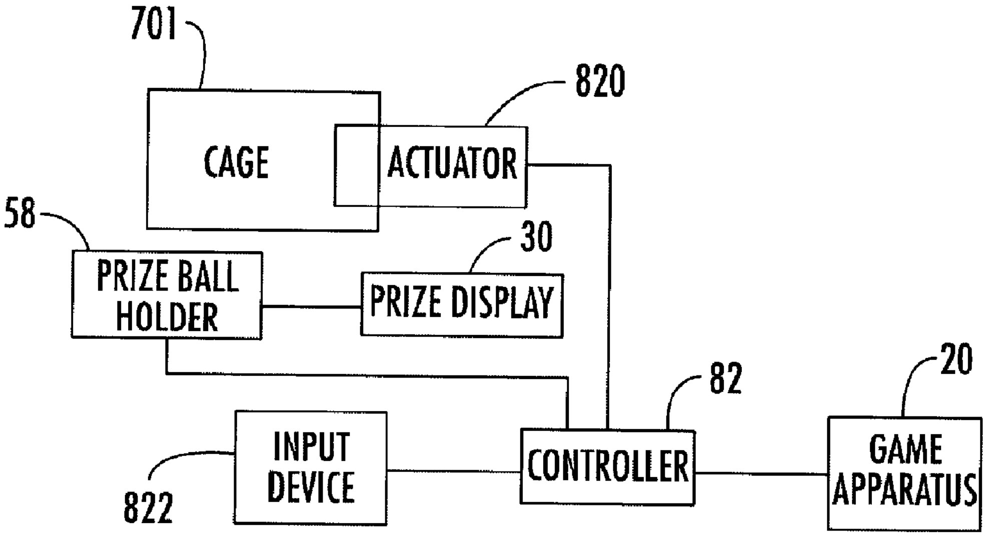
FIG. 23 is substantially a schematic diagram showing the preferred components that may be used for a rotatable cage embodiment.

Referring now to FIG. 23, components of a rotatable cage embodiment are shown wherein cage 701 is preferably coupled to an actuator 820. Actuator 820 may be an electromagnetic motor, such as a DC motor, a stepper motor, an AC motor, a switched reluctance motor, or other well known actuators that could cause the rotation of the cage. Actuator 820 may also be a combination of the components discussed above. Actuator 820 preferably rotates cage 701 on a rotational axis substantially parallel to a floor (not shown). As actuator 820 rotates cage 701, display balls 18 are tumbled and mixed within the cage.

Actuator 820 is preferably in communication with controller 82 discussed above. Controller 82 is preferably in communication with game apparatus 20. In one embodiment, controller 82 may be configured to sense a bonus-activating event, discussed above, and activate actuator 820 to rotate cage 701. Other embodiments of display 700, including the cylindrical display, can be mounted and rotated in an analogous manner to cage 701.

In another embodiment, controller 82 may be configured to activate actuator 820 to rotate display 700, such as cage 701, during an attract mode, wherein controller 82 rotates cage 701 even when no game play is being conducted on game apparatus 20. The attract mode may be implemented to simply attract customers' attention to game apparatus 20. This attract mode is an improvement over other types of games. Rotation of cage 701 draws attention to the game, but does not indicate a particular prize. An attract mode in other types of games may result in a prize being indicated by the gaming apparatus, even though no game is being played. However, players in the vicinity of the gaming apparatus may mistakenly believe that the machine has awarded them a prize. The use of the jumbled ball displays of the present invention reduces the risk of player confusion because no prize is indicated by the jumbled ball display. This attract mode can also be used in other embodiments of the invention.

In yet another embodiment, actuator 820 may be in communication with an input device 822 and controller 82. Controller 82 may be configured to prompt a player to activate an input device 822 to start or stop actuator 820. Input device 822 may be a button (not shown), a mouse (not shown), a keyboard (not shown), a touch screen (not shown), or other input devices known in the art. Controller 82 may further be configured to allow a player to indicate manual rotation of display 700, such as cage 701, on input device 822 and deactivate actuator 820.

Figure 24A:
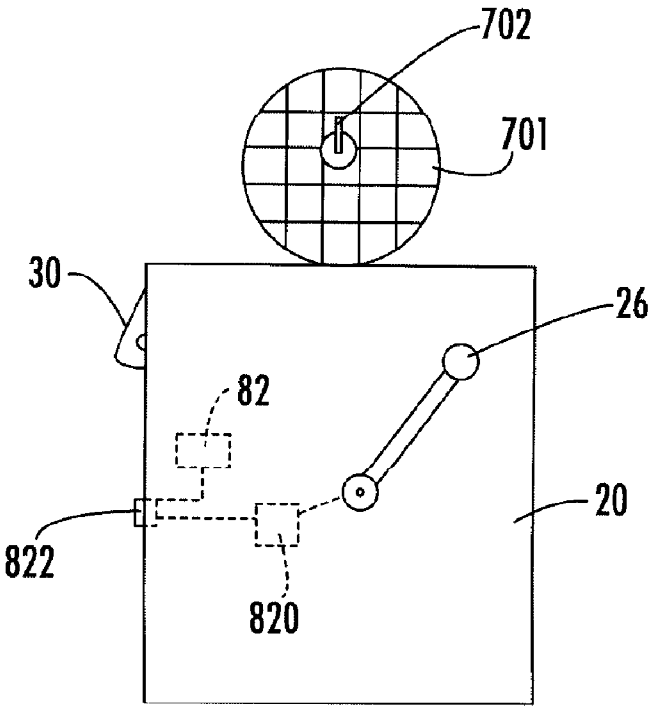
FIG. 24A is substantially a partial cross-sectional view of the gaming device having a handle, which is adjacent to the gaming apparatus and which may be used to rotate the cage positioned on top of the gaming apparatus.

Referring now to FIG. 24A, a handle 702 may be attached to display 700, including cage 701, for the player to manually rotate cage 701. Handle 26 (shown in FIG. 1) may also be configured to allow the player to cause cage 701 to rotate. Handle 26 may be in communication with controller 82. Controller 82 may cause actuator 820 to start and or stop rotating cage 701 in response to a player pulling handle 26. If a game requires rotation of cage 701, controller 82 is preferably configured to start actuator 820 if the player does not pull handle 26 (or input device 822). Similarly, controller 82 is preferably configured to stop actuator 820 after an amount of time has passed without the player stopping actuator 820 by pulling handle 26 (or input device 822).

It can thus be realized that this embodiment of the present invention allows a game player to at least partially control the rotation of the cage, which, in turn, provides the player the illusion that he can control the selection of indicia and the consequent game outcome. The indicia are preferably randomly selected by controller 82. Controller 82 preferably selects at least one prize ball that is representative of the randomly selected indicia from prize ball holder 58 (see also FIG. 3). Prize ball holder 58 is preferably separate from cage 701, and indicia are preferably displayed in prize ball display 30. It is noted that this configuration achieves the ability to maintain the randomness of game outcomes, while at the same time, provides the illusion to the player that the player can manually operate the cage to manipulate the game outcomes.

Figure 24B:
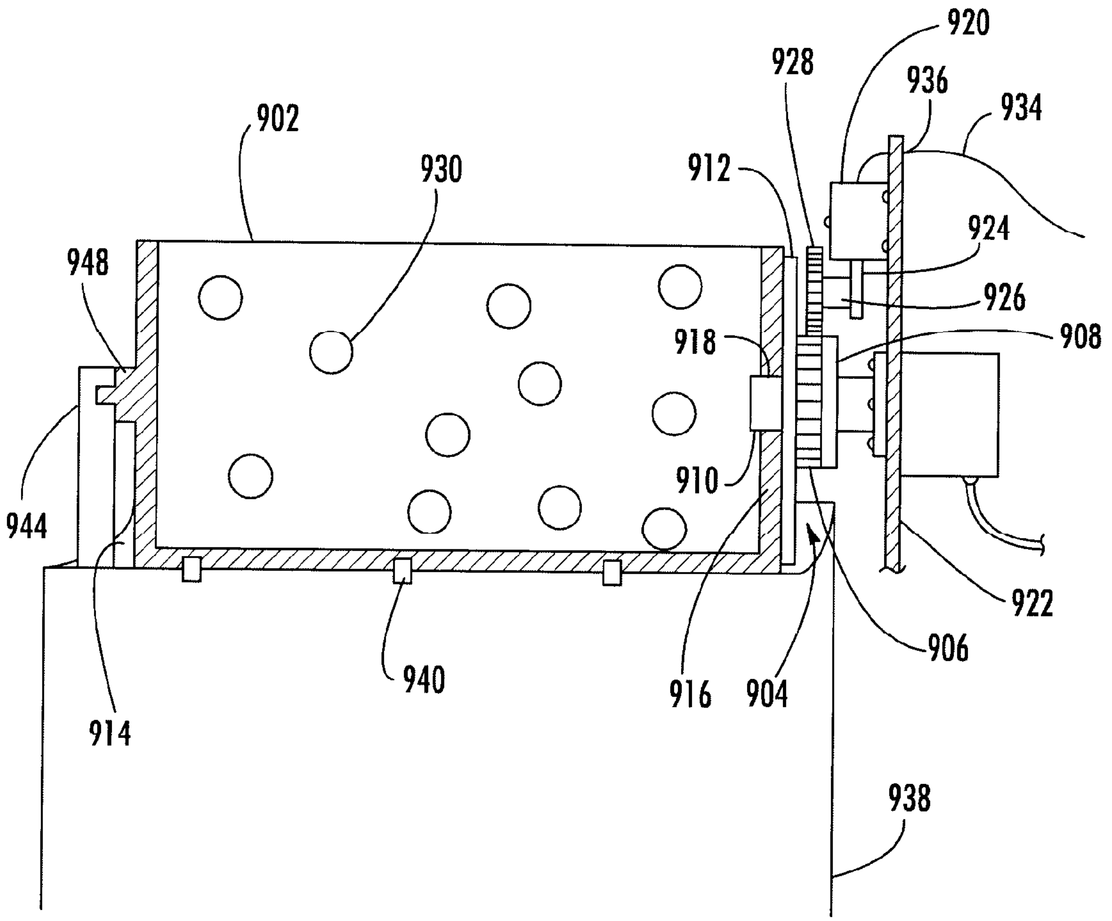
FIG. 24B is substantially a front view of one possible actuating mechanism for one embodiment of a gaming device according to the present invention.

FIG. 24B illustrates one possible actuator for action ball cylinder 902. Of course, the invention is not limited to a particular actuator and any suitable actuator, now known or later developed, may be used with the present invention.

The actuating device of FIG. 24B may be similar to the actuator illustrated in FIG. 21. ABS driven external spur gear 904 has a driven spur gear tooth plate section 906. The lower, planar portion of plate section 906 rests on the upper surface of ring bearing 908. The lower tubular section (not shown) of driven external spur gear 904 matingly penetrates a central circular aperture in ring bearing 908 and the upper tubular interior (not shown) of ABS support tube 910.

A planar slip drive ring 912 rests on, and is thereby in driving contact with, the upper planar surface of driven gear tooth plate section 906, with the upper tubular section of ABS driven external spur gear 904 penetrating through and extending upwardly above the generally vertically disposed slip drive ring 912. The diametral width of slip drive ring 912 is substantially wider than the diametral width of drive spur gear tooth plate section 906, but only slightly less than the diametral width of circular end plate 916 of action ball cylinder 902. Circular end plate 916 thus rests on, and is also in driving contact with, the upper surface of slip drive ring 912 and has an axially centered support aperture 918 through which the upper tubular section of the ABS driven external spur gear 904 passes in order to secure action ball cylinder 902. Slip drive ring 912 is preferably made of a rigid, resilient plastic and has roughened (not smooth or flat) upper and lower surfaces in order to increase frictional driving contact with abutting surfaces of the ABS driven spur gear 904 and circular end plate 916.

A U-shaped pinion drive housing 920 is secured by fasteners to the upper side of mounting plate 922 laterally spaced from the external periphery of ABS driven external spur gear 904. A pinion drive 924 is mounted by fasteners substantially within the confines of pinion drive housing 920 but with its axial pinion drive gear section 926 extending substantially vertically outward from pinion drive housing 920 in the direction of ABS driven external spur gear 904 in order to drive an ABS pinion spur gear 928, which matingly engages driven spur gear tooth plate section 906 in order to drive rotation of ABS driven spur gear 904 when pinion drive 924 is activated. When pinion drive 924 is activated, ABS pinion spur gear 928 drives the rotation of slip drive ring 912 through friction contact between slip drive right 912 and ABS driven external spur gear 904, which in turn drives rotation of circular end plate 916.

Power wiring 934 is secured at one end to pinion drive 924 and passes through an aperture 936 in mounting plate 922 in order to connect to a power supply (not shown) within the gaming machine housing 938. Pinion drive 924 is activated upon receipt of electrical power through power wiring 934 and, preferably, this electrical power is provided during the entire time the gaming machine within gaming housing 938 is activated. When activated, rotatable action ball cylinder 902 will rotate and agitate balls 912 except when, as a result of the slip drive arrangement, action ball cylinder 902 ceases rotation due to interference with the rotation of the action ball cylinder 902 by, for example, contact with a patron or interfering object. Action ball cylinder 902 resumes rotation automatically upon removal of the interference provided that power is still being provided to pinion drive 924.

Wheels or rollers 940 may be mounted on recess 914. Wheels 940 may provide smoother rotation for action ball cylinder 902. Alternatively, action ball cylinder 902 may be held out of contact with recess 914 by mounting arm 944 and support 910. Mounting arm 944 is in communication with axle 948, which is coupled to action ball cylinder 902.

Figure 24D:
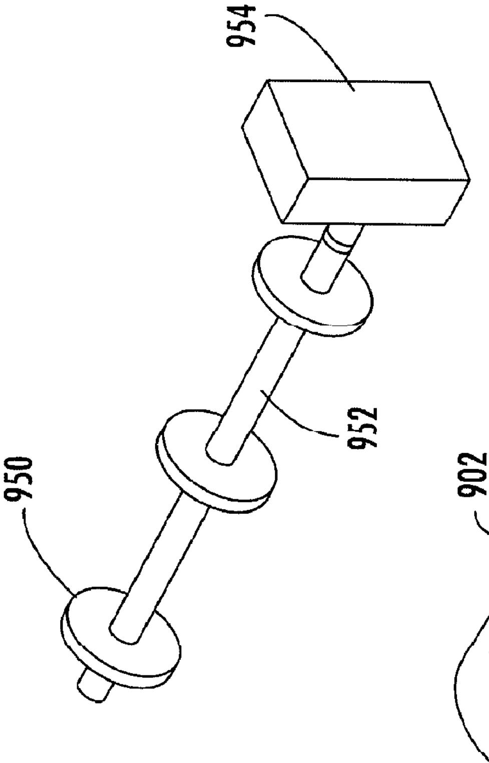
FIG. 24D is substantially a front view of one possible actuating mechanism for one embodiment of a gaming device according to the present invention.
Figure 24E:
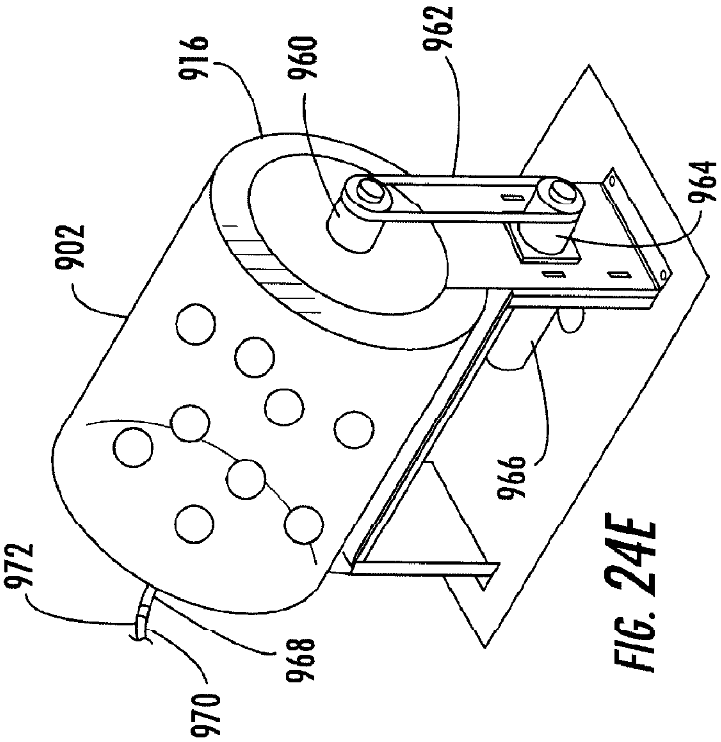
FIG. 24E is substantially a front view of one possible actuating mechanism for one embodiment of a gaming device according to the present invention.
Figure 24C:
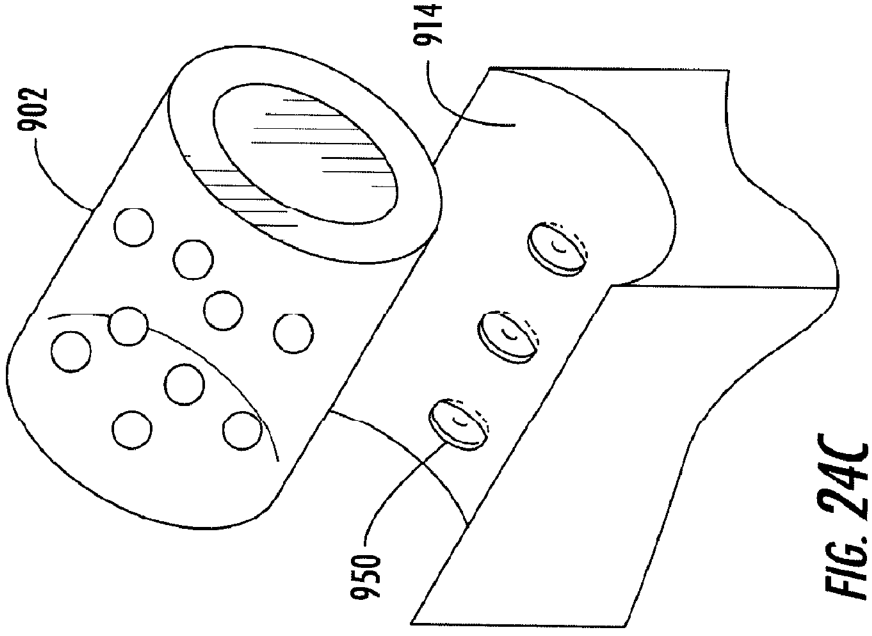
FIG. 24C is substantially a front view of one possible actuating mechanism for one embodiment of a gaming device according to the present invention.

In an alternative actuating mechanism, FIGS. 24C and 24D illustrate one or more rotatable wheels 950 in recessed area 914 that are in physical contact with action ball cylinder 902. Rotatable wheels 950 may be attached to shaft 952 that is in communication with motor 954. As motor 954 rotates shaft 952, wheels 950 will rotate and drive rotation of cylinder 902. Many types of wheels and motors may be used in this embodiment. For example, plastic, rubber, and other materials may be used to construct wheels 950. Shaft 952 is preferably matingly coupled to motor 954. Motor 954 may be, without limitation, a servo motor, a gear motor, or stepper motor. One suitable gear motor is model 24A4BEPM-D3, available from Bodine Electric Co. of Chicago, Ill.

FIG. 24E illustrates yet another possible actuating mechanism for action ball cylinder 902. In FIG. 24E, action ball cylinder 902 has a shaft 960 coupled to circular end plate 916. A belt 962 is in communication with shaft 960 and drive shaft 964 associated with motor 966. Axle 968 is coupled to the other circular end plate 916, which is coupled to a support arm (not shown). In all the discussed possible actuator embodiments, as well as other actuators that might be used, it may be desirable to have a slip or clutch mechanism so that rotational impediments will not damage the rotating element or the drive mechanism. Of course, action ball cylinder 902 could be protected from interference from player by at least partially encasing action ball cylinder 902 in a transparent housing. Any player operable components could extend out of the housing.

Figure 24G:
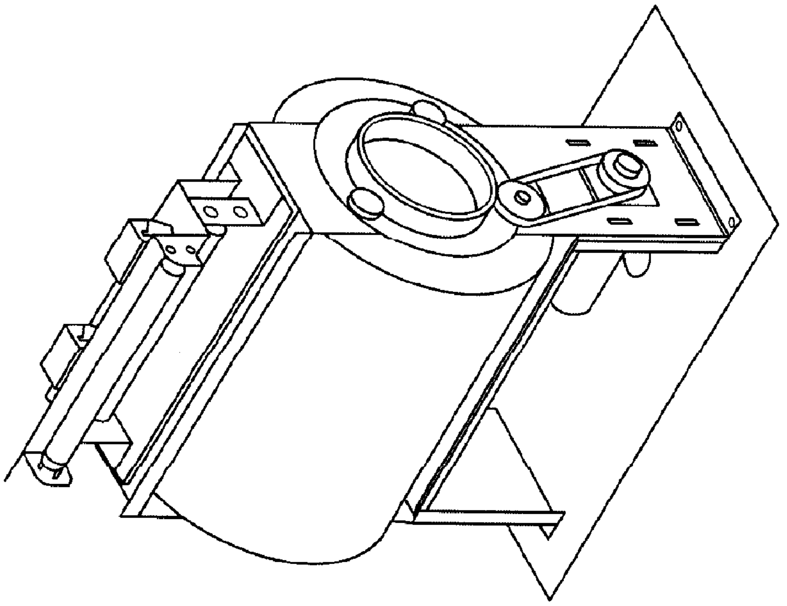
FIG. 24G is substantially a front view of one possible actuating mechanism for one embodiment of a gaming device according to the present invention.
Figure 24F:
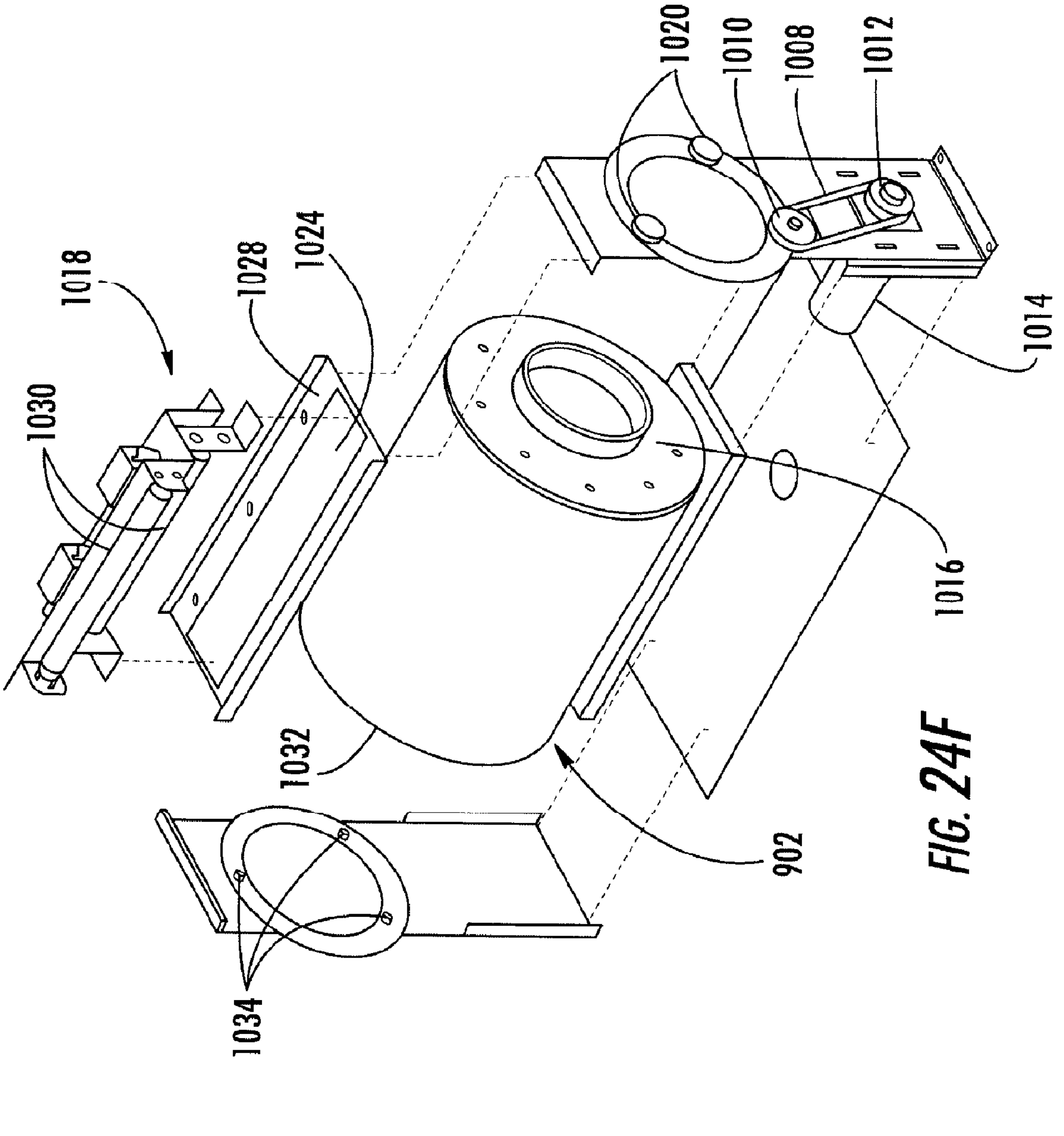
FIG. 24F is substantially an exploded view of one possible actuating mechanism for one embodiment of a gaming device according to the present invention.

FIG. 24G shows an actuating mechanism for action ball cylinder 902 that is presently particularly preferred. An exploded view of the actuating mechanism of FIG. 24G is shown in FIG. 24F. As shown in FIG. 24F, servo gear head motor 1014 drives pulley 1012. Belt 1008 runs between drive pulley 1012 and pulley 1010. Belt 1008 is in frictional contact with flange 1016 of action ball cylinder 902. Rollers 1019 are spaced around flange 1016 of action ball cylinder 902 in order to securely hold action ball cylinder 902 in place while allowing rotation of action ball cylinder 902.

Because belt 1008 is in frictional contact with flange 1016, action ball cylinder 902 may be touched by players and others without damaging actuator components, such as servo gear head motor 1014. If action ball cylinder 902 is prevented from rotating, belt 1008 will simply slip by flange 1016. In order to enhance this feature, it is preferable that belt 1008 be made of a suitable material, such as soft rubber materials, including urethane.

Also shown in FIG. 24F is light housing 1017 that may be mounted above aperture 1023 in top display plate 1028. Lights 1029 may be fluorescent lamps.

A second flange (not shown in FIGS. 24G and 24F), which may be similar or identical to flange 1016, may be placed at end 1031 of action ball cylinder 902. The second flange may be secured by a plurality of rollers 1033, which may be similar or identical to rollers 1019.

With reference now to FIG. 29, action ball cylinder 902 may be provided with means for assisting in the agitation of display balls 18 as action ball cylinder 902 is rotated. For example, action ball cylinder 902 may be provided with one or more bars 1055 in the interior of action ball cylinder 902. Display balls 18 may fall into the space between bars 1055, be carried upwards as action ball cylinder 902 rotates, and then fall down into the interior of action ball cylinder 902. The means for agitating display balls 18 is not limited to any particular means. For example, a series of fins, rather than bars 1055, may be used to achieve a similar effect. The inclusion of agitating means may result in a more visually appealing look for action ball cylinder 902-enhancing player interest and excitement.

Figure 25:
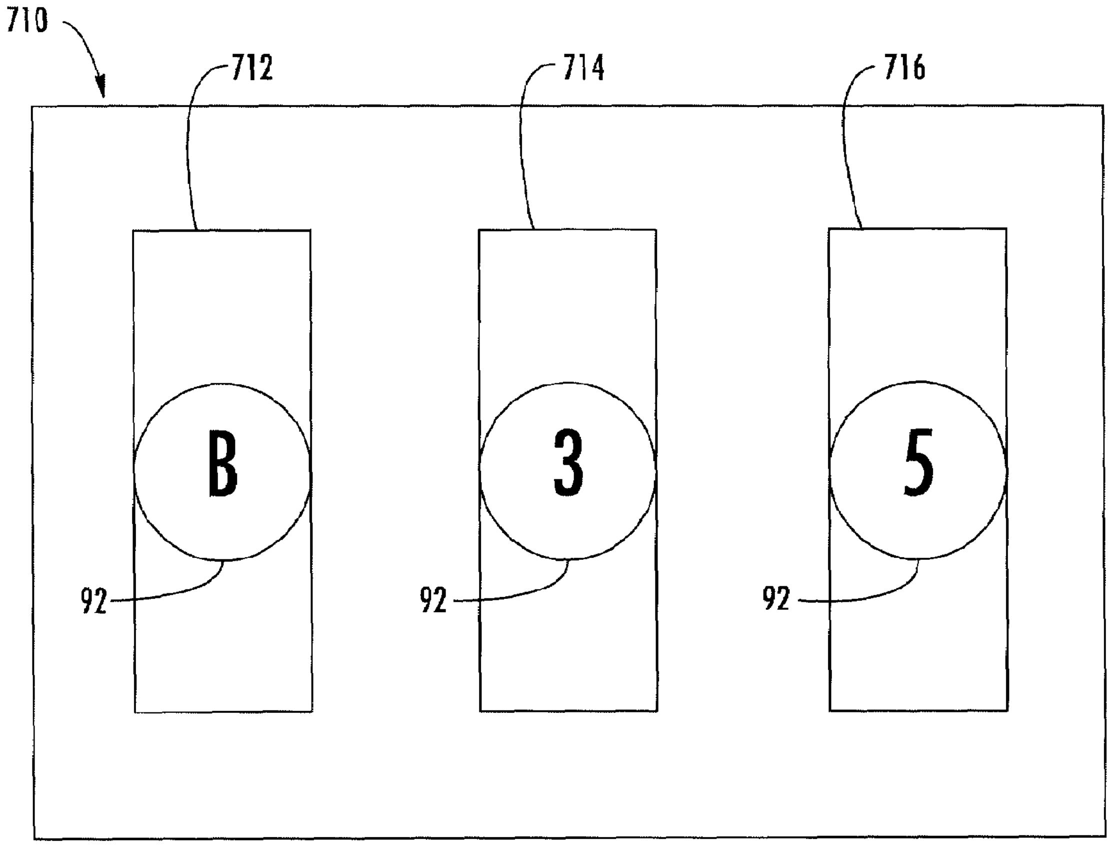
FIG. 25 is substantially a front close up view of the display windows of an embodiment of the gaming device of the present invention.

Referring now to FIG. 25, prize balls 92 are preferably displayed in display windows 710. Display windows 710 may include a group of display windows 712, 714, and 716. Display windows 710 are preferably similar to display window 30 of FIG. 1A. Display windows 712, 714, and 716 may each be configured to display a prize ball 92.

Prize balls 92 are preferably stored, handled, selected, and shown to the player as previously described above. As seen in FIGS. 3 and 5B, prize balls may be supplied to respective display windows 712, 714, and 716 through plate holes 62 defined by plate 58. Each hole 62 preferably has a corresponding gate 66 and actuator 64. Plate 58 may be positioned so that the appropriate ball is positioned over the appropriate hole 62 for supplying balls to the appropriate display windows 710. Alternatively, a plurality of plates 58 may be provided as seen from FIG. 6. Each plate 58 may supply balls to a separate display window 710.

Referring back to FIG. 25, prize balls 92 in display windows 712, 714, and 716 are preferably shown either with a letter or a number as indicia. Other symbols besides letters and numbers may be used, such as colors or images of various types of objects. While three display windows are shown, more or fewer display windows may be used.

At least one advantage of cage display 700 is that a game player can actually see cage 701 rotating and the display balls being mixed by the rotation of cage 701. The rotating cage enhances the illusion that the selected prize balls are being withdrawn from the cage and displayed. Display window 710 also enhances the illusion that the selected prize balls are being withdrawn from cage 701 and displayed.

Referring back to FIG. 24B, FIG. 24B depicts action ball cylinder 902 in a recessed portion 914 of game housing 938. Of course, action ball cylinder 902 may be mounted in a variety of ways without departing from the scope of the invention. However, it should be appreciated that having action ball cylinder 902 rotate in recessed area 914 may aid in providing the illusion that it is balls 912 in action ball cylinder 902 that are being selected and displayed to the player. The portion of action ball cylinder 902 in recessed area 914 is preferably not viewable by the player. Because the player is not able to view all of action ball cylinder 902, the player may believe that the mechanism that transports balls 912 from action ball cylinder 902 to the display area is in recessed area 914. Therefore, the actual method of operation of the gaming device is better concealed from the player, who is also less likely to question the illusion.

Figure 26:
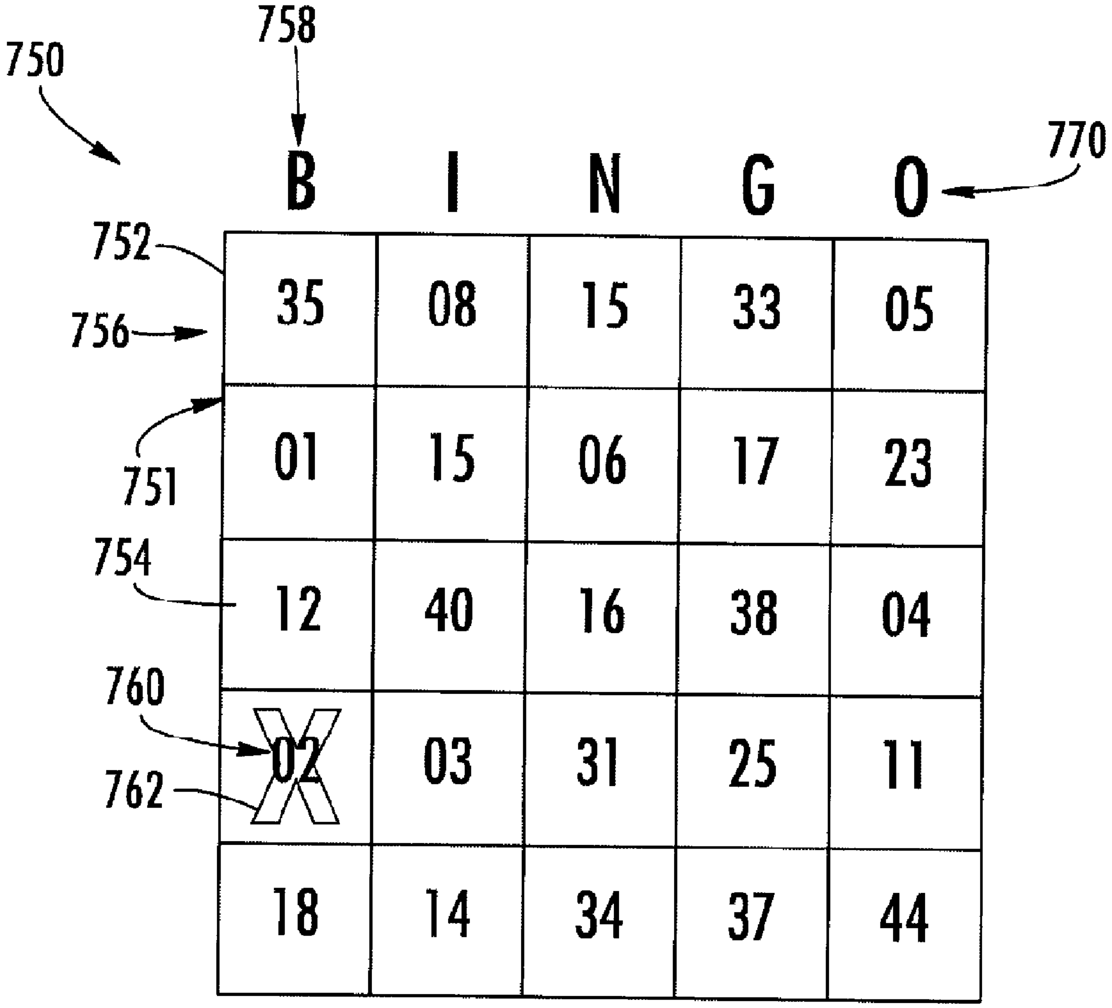
FIG. 26 is substantially a front elevational view of a game display in the form of a bingo card representation.

Referring now to FIG. 26, game display 750 preferably comprises a card representation 751 that has a matrix 752 of cells 754. Card representation 751 preferably resembles a bingo card, but other cards, such as lottery cards or keno cards, may be designed. Cells 754 preferably form rows 756 and columns 758. Various symbols 760 may be positioned in cells 754. Symbols 760 may be in the form of letters, numbers, colors, images or other symbols known in the art. When a prize ball 92 is selected (not shown), a selector symbol, or display symbol, 762, such as an X, is preferably placed over the corresponding symbol 760 to indicate its selection. Selector symbol 762 may be a light-emitting diode that may be activated to indicate symbol 760. Selector symbol 762 may also be other light sources known in the art, such as fluorescent and neon lights, which may be flashed to indicate symbol 760. Various methods of indicating symbol 760 may be utilized and still fall within the scope of the invention. Card representation 751 may include the standard bingo characters, B-I-N-G-O 770. Game display 750 may be in a video form or in a mechanical display form. Game card 751 may be blank when presented to the player, or may have some symbols already filled in. Having some symbols of game card 751 filled before the player begins the game may require less play before a player would be entitled to a prize.

It can be realized that certain embodiments that display multiple balls make it possible to use combinations of balls to indicate various bonus outcomes. For example, if three balls containing the three symbols B, 3, and 5 are displayed, a selector symbol, "X," may be placed over the corresponding symbol 760 on card representation 751. A controller (not shown) may continue to select a prize ball until either a row, a column, or a diagonal on card representation 751 is fully marked or indicated. The filling of a row, column, or diagonal may indicate a game winning event, and the player may be awarded a prize. In another embodiment, the prize may not be awarded until all of the cells on the card representation 751 are filled. Once a prize is won, card representation 751 may be cleared so that the bonus game may be replayed.

Video Cage Embodiment

Figure 27:
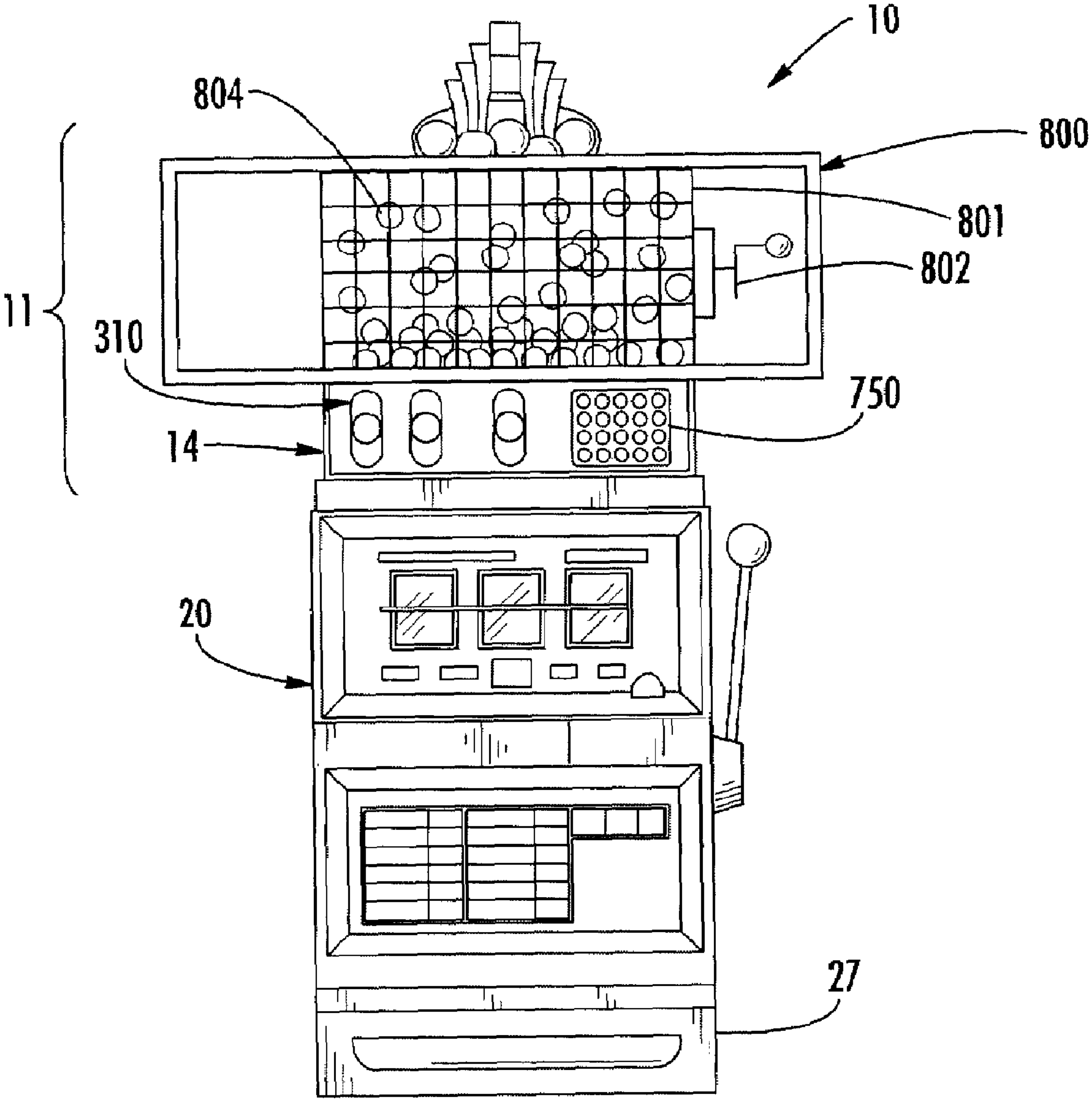
FIG. 27 is substantially a front elevational view of an alternative embodiment of the gaming device of the present invention that utilizes a video display to simulate a rotating cage adapted to hold and jumble display balls.

As seen in FIG. 27, an alternative embodiment of gaming device 10 utilizes a video display 800 to simulate a rotating cage adapted to hold and jumble display balls 804. In this embodiment, video display 800 replaces cage display 700. Video display 800 may be any of a large number of display devices that are well known in the art. For example, video display 800 may be a cathode ray tube of a type that is used with many personal computers and televisions. Video display 800 may also be LCDs or plasma displays known in the art.

Video display 800 may be similar to video display 400 (of FIG. 13) and may present an image of cage 801 with images of balls 804 contained therein. Video display 800 may further present an image of a cage handle 802 attached to cage image 801. Image of cage 801 may be static or may move. Video display 800 is preferably driven by controller 76 to produce different displays. Video display 800 is preferably mounted to game apparatus 20 above prize display 14. Prize display 14 preferably includes display window 710 and game display 750, which are both discussed above.

Video display 800 may be chosen to represent other shapes, as desired. For example, video display 800 could be made to represent a cylinder filled with images of balls. The image of the cylinder can be designed to appear to rotate and jumble the images of the balls.

Video display 800 may be configured to appear to move during the execution of a game when it is desired to make it appear that one of the ball images is being used to determine whether a player is entitled to be awarded a prize. Video display 800 may also be configured to provide an image of moving balls in an attract mode, when the game is not being actively played by a player, in order to call attention to the gaming device and encourage player to play the device. As was previously discussed, this attract mode is an improvement over prior systems because it creates the appearance of movement, yet does not appear to indicate a prize, and is therefore less likely that players will mistakenly believe they are entitled to a prize.

Game Play Flow Chart

Figure 28:
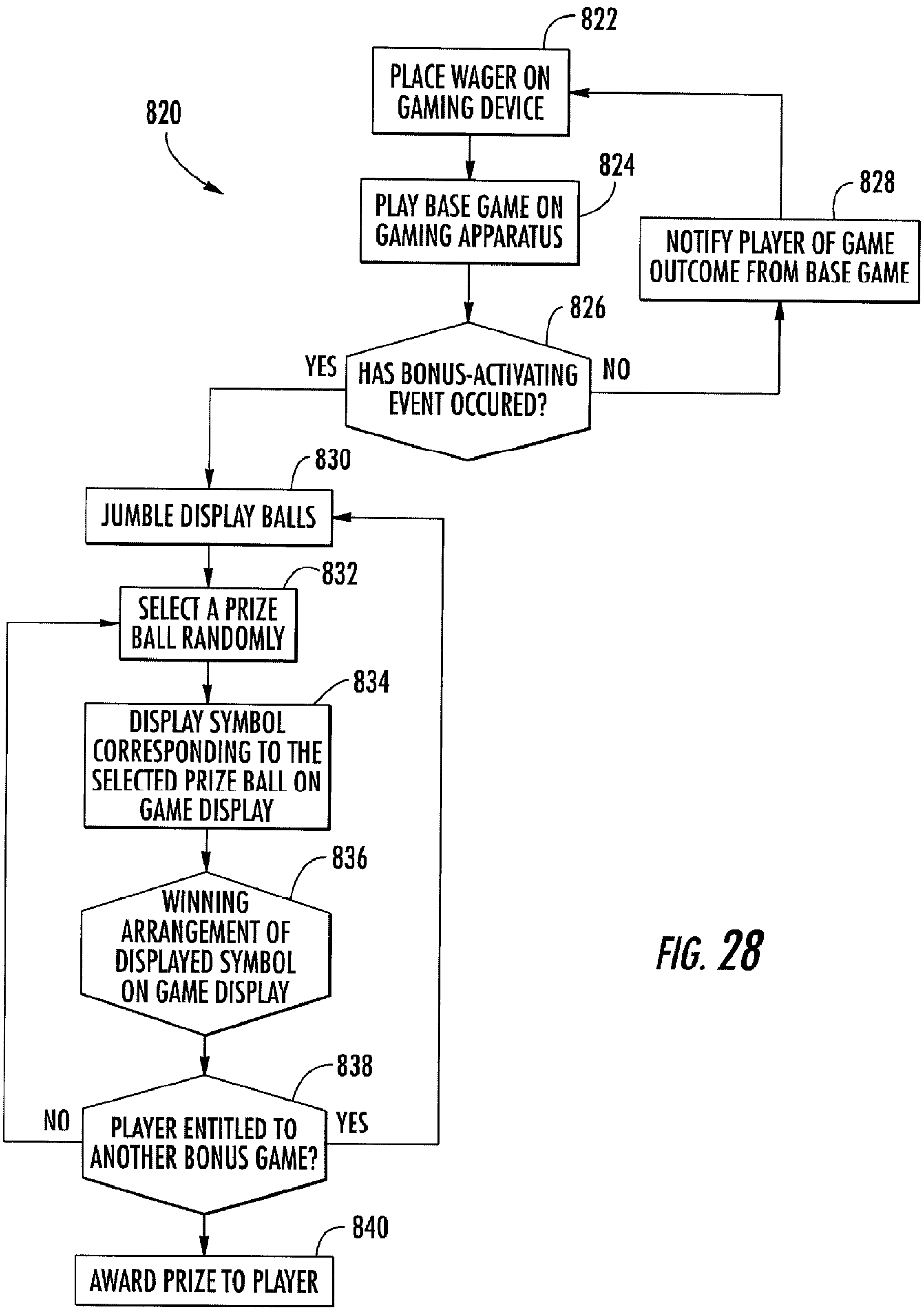
FIG. 28 is substantially a flow chart of one of the many possible game plays on the gaming device of the present invention.

Referring now to FIG. 28, a flowchart of a game play 820 is shown. At step 822, a player preferably initiates game play 820 by placing a wager on the gaming device. The wager may be in form of cash or credit from actual domestic or foreign currency, vouchers, coupons, tickets, electronic cards, and other sources or forms of wagers known in the art. Once the player initiates game play 820, the player may play a base game on the gaming apparatus at step 824. At step 826, the controller (not shown) detects the occurrence of a bonus-activating event. If the controller does not detect a bonus-activating event, then the controller notifies the player of the game outcome from the base game at step 828. The player may place a wager again and repeat steps 822 and 824 to continue playing a game on the gaming apparatus.

If the controller detects a bonus-activating event, the controller causes the jumbling of the display balls at step 830. The controller then randomly selects a prize ball at step 832. The controller causes the game display (not shown) to display and indicate the corresponding symbol of the selected prize ball at step 834. At step 836, the controller determines whether a winning arrangement of symbols on the game display is achieved. If no winning arrangement of symbols is achieved, then the controller continues to select a prize ball at step 832 and to display the symbol corresponding to the selected prize ball on game display at step 834 until a winning arrangement is achieved. A winning arrangement of symbols may be an alignment of symbols that fills a row, a column, or a diagonal line of the matrix of the game display.

If a winning arrangement of symbols on the game display is achieved, such as a completed row, column, or diagonal on the game display, then the player may be entitled to play another bonus game at step 838 or to a prize at step 840. If the player is entitled to another bonus game, the cycle repeats beginning at step 830. The steps shown in the flowchart do not necessarily imply that the steps have to take place in a particular order. The order of steps may be varied; some steps may be eliminated; and, some steps may be replaced with other steps. Such variations still fall within the scope of the invention.

It can thus be seen that the preferred embodiments can solve one or more problems associated with the prior art or provide advantages over prior art devices. One embodiment of the present invention provides a gaming device that utilizes a highly visible display device that may be used with a primary game or a bonus game. This embodiment can provide a display device that utilizes physical objects in the form of a jumbled ball display device that is similar to the well-known game of Keno and other games that utilize jumbled balls. This embodiment also can provide a display device that eliminates environmental influences on the outcome of the game. This embodiment can, in addition, provide a display device that reduces the risk of tampering, requires no human operators, and requires little maintenance.

Another embodiment can provide a rotatable container of agitated action balls that are also most preferably relatively inaccessible to general environmental influences. These action balls can add excitement and more realism to the gaming experience provided by the gaming machine and a separate game ball selector display that is also most preferably relatively inaccessible to general environmental influences during use of the gaming machine to play a game.

Transport Devices

Figure 31:
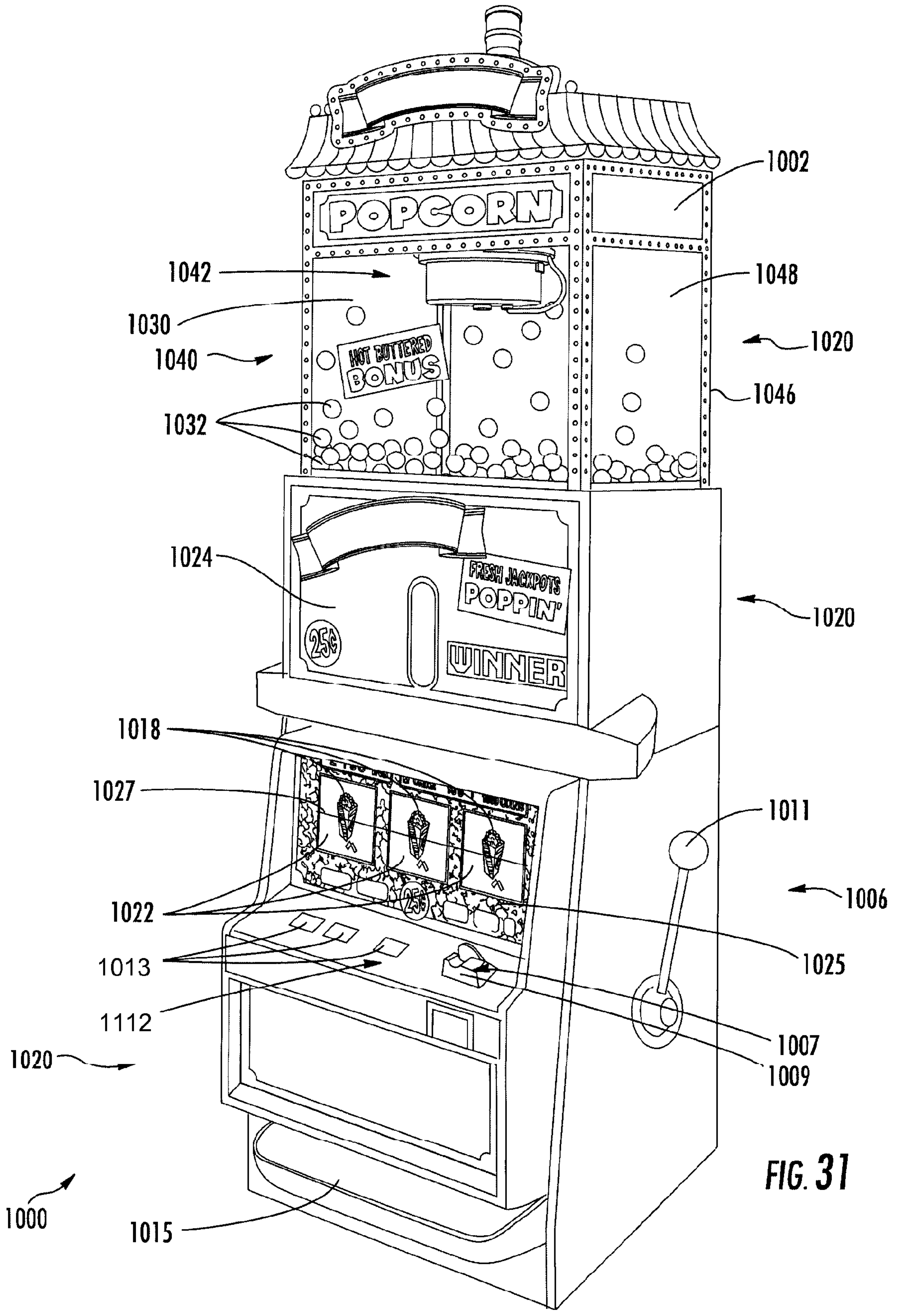
FIG. 31 is a front perspective view of another embodiment of the gaming device of the present invention.

FIG. 31 shows another embodiment of the present invention generally comprising a gaming device 1000 having a jumbled ball display 1002 provided with a transport device 1004 (see FIGS. 32-38F). Notably, gaming devices 1000 may be any of a large number of devices that are adapted to allow players (not shown) to play a game, such as those typically found in arcade and casino environments, including arcade games, video games, gambling machines, video poker machines, slot machines, etc. In this embodiment, the gaming device 1000 represents a slot machine 1006, which may have a value acceptor 1007 for accepting value from a player, such as a coin slot 1009, card reader (not shown), or a voucher reader (not shown). A handle 1011 and/or a button(s) 1013 also may be provided for activating the gaming device 1000 to begin a game.

A payout mechanism (not shown) and a coin dispenser 1015 may be provided for awarding prizes or for dispensing value to players cashing out and retiring from a game. A printer (not shown) may also be provided for printing out cashless vouchers. A pay table (not shown) may further be provided to allow a player to see what symbol 1018 or combination of symbols provide one or more winning events.

As further shown in FIG. 31, the gaming device 1000 includes a display device 1020 which may include physical game reels 1022, a bonus display 1024, and/or a video display device (not shown) including a cathode ray tube, LCD, LED, plasma, and the like, configured to display at least one symbol 1018 from a plurality of symbols 1018, which may include, for example, any letter, word, number, picture or image. In this figure, the symbols 1018 generally are represented by "a popcorn box with popcorn." The physical game reels 1022 may be attached to a drive mechanism (not shown) to rotate the reels 1022 in a manner well known in the art.

A panel 1025 may cover the game reels 1022 such that only a portion of their individual circumferences is shown to the player. At least one symbol 1018 from any of the game reels 1022 may be used to display a game outcome and/or activate a bonus game cycle 1026 (see FIG. 40). At least one pay line 1027 may be provided for the player to use in determining a game outcome based on the symbol 1018 or combination of symbols 1018 positioned thereon.

As indicated above, the display device 1020 also may include a video display (not shown) displaying game symbols 1018, for example, letters, words, numbers, pictures or images, in any number of formats and arrangements. Alternatively, the video display (not shown) may display images of game reels 1022 having symbols 1018 and an image of at least one pay line 1027. It is understood that the gaming device 1000 may comprise more than one display device 1020 such that the gaming device 1000 could include physical game reels 1022, a bonus display 1024, a jumbled ball display 1002, and/or a video display (not shown), or any combination thereof. Accordingly, the display device 1020, such as the jumbled ball display 1002, may be positioned at the top of the gaming device 1000, separate from the gaming device 1000 but in communication therewith, or in communication with a plurality of different gaming devices 1000 via a computer network in a manner that is well known in the art.

Figure 40:
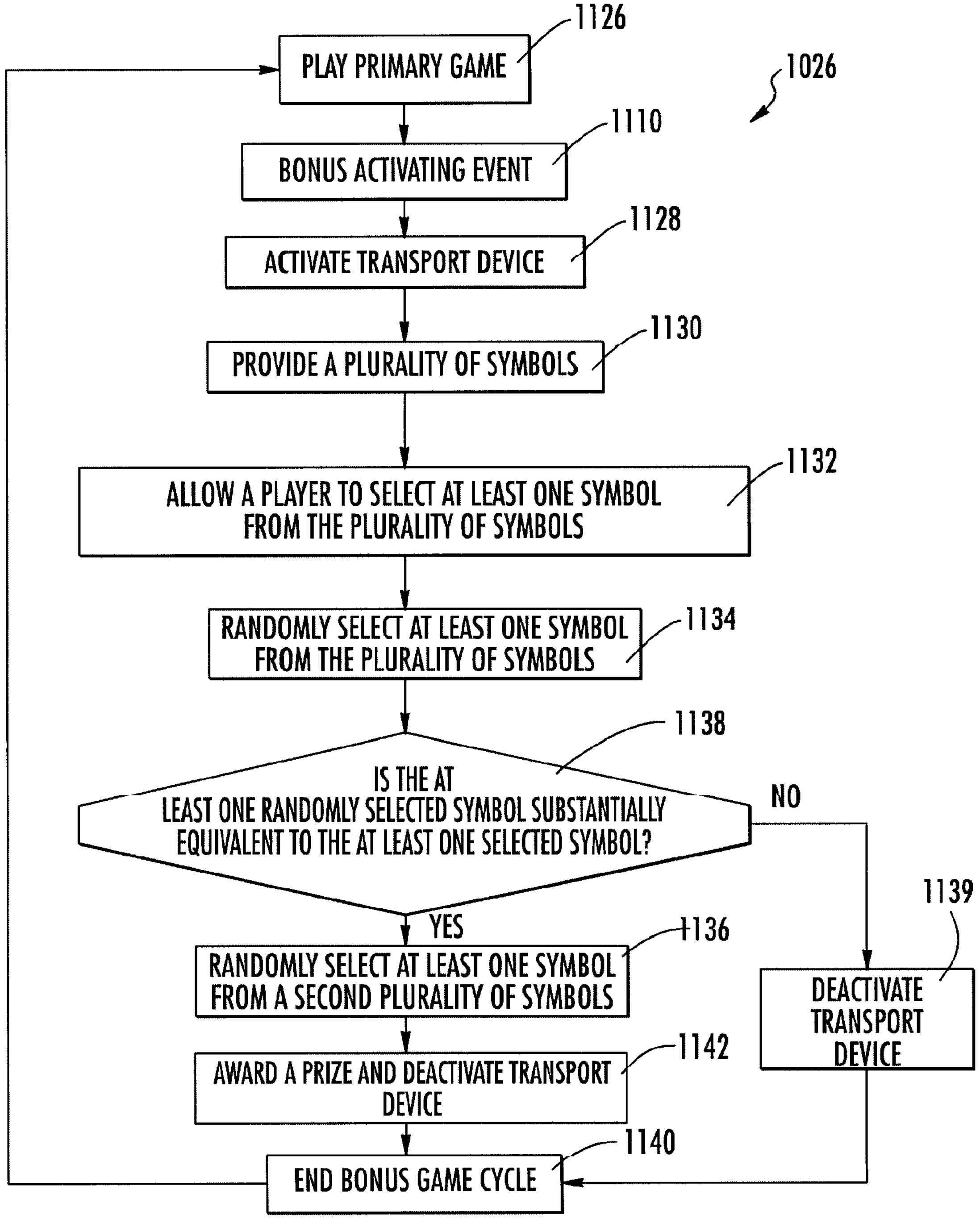
FIG. 40 is a flowchart of a gaming method of the present invention.

FIG. 31 shows the jumbled ball display 1002 and bonus display 1024, which preferably are configured to cooperate with the gaming device 1000 during a bonus game cycle 1026 (FIG. 40). One acceptable type of jumbled ball display 1002 is described in U.S. Pat. No. 6,338,678, issued on Jan. 15, 2002, hereby incorporated herein by reference. Notably, the jumbled ball display 1002 in FIG. 31 includes a container 1030 that is configured to hold at least one, preferably a plurality, of movable objects 1032 including any type of ball, for example, keno balls, ping-pong balls and rubber balls. The jumbled ball display 1002 may be replaced by a video display (not shown).

A ball holder (not shown) preferably is used in conjunction with the jumbled ball display 1002 and similarly is described in U.S. Pat. No. 6,338,678, issued on Jan. 15, 2002, which is hereby incorporated herein by reference. More specifically, the ball holder (not shown) is contained within the bonus display 1024 to display one or more movable objects 1032, including any type of ball, for example, keno balls, ping-pong balls or rubber balls, associated with the bonus game cycle 1026 (FIG. 40).

The container 1030 may be at least partially transparent allowing players to view one or more of the movable objects 1032 inside of the container. The container 1030 may be made of acrylic or other materials, including, for example, plastic, glass, or wire mesh. One or more movable objects 1032 may have colors and/or symbols, for example, letters, words, numbers, pictures or images.

Figure 32:
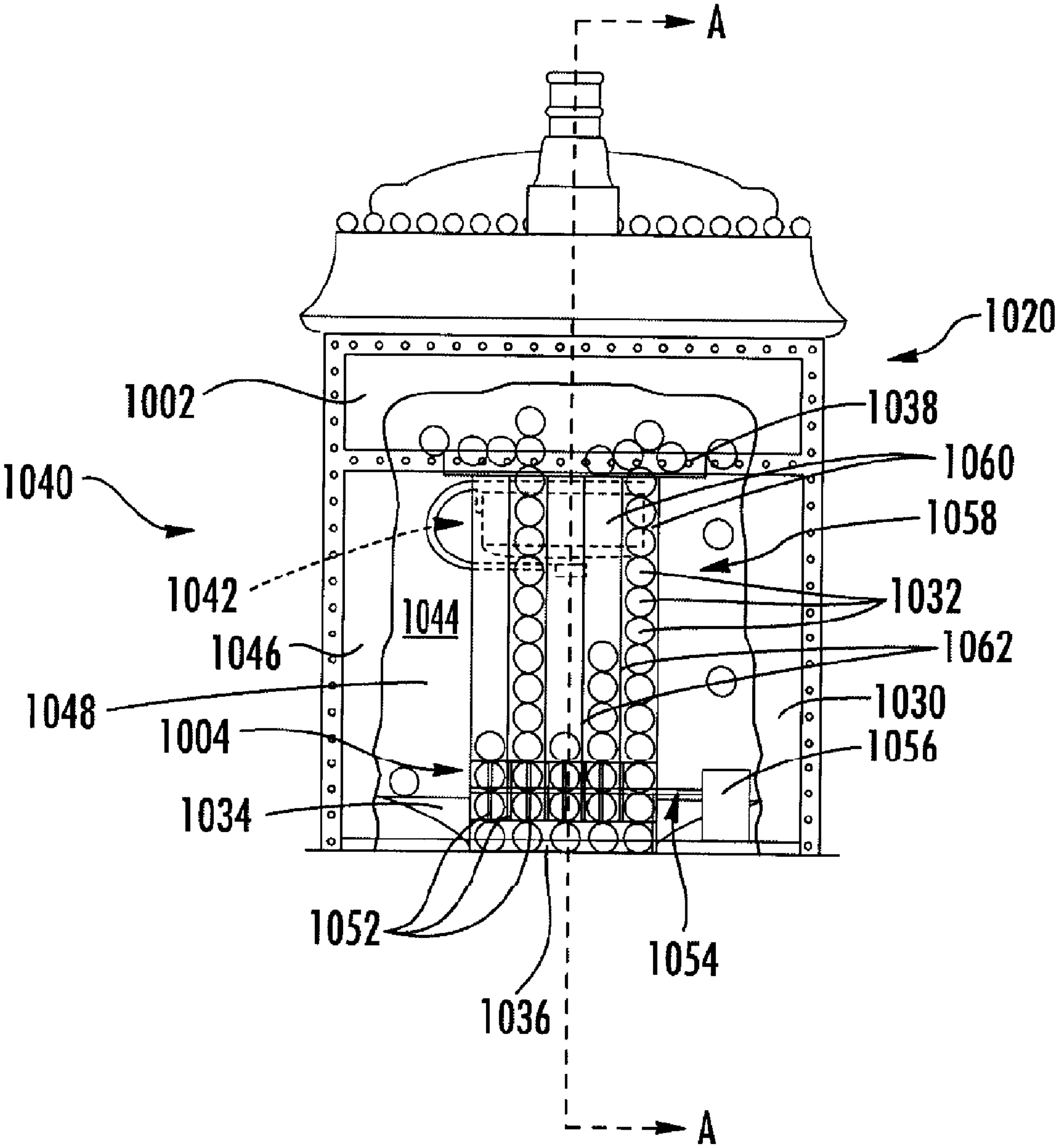
FIG. 32 is a partially cut-away rear elevational view of the jumbled ball display of FIG. 31 showing a transport device.
Figure 33:
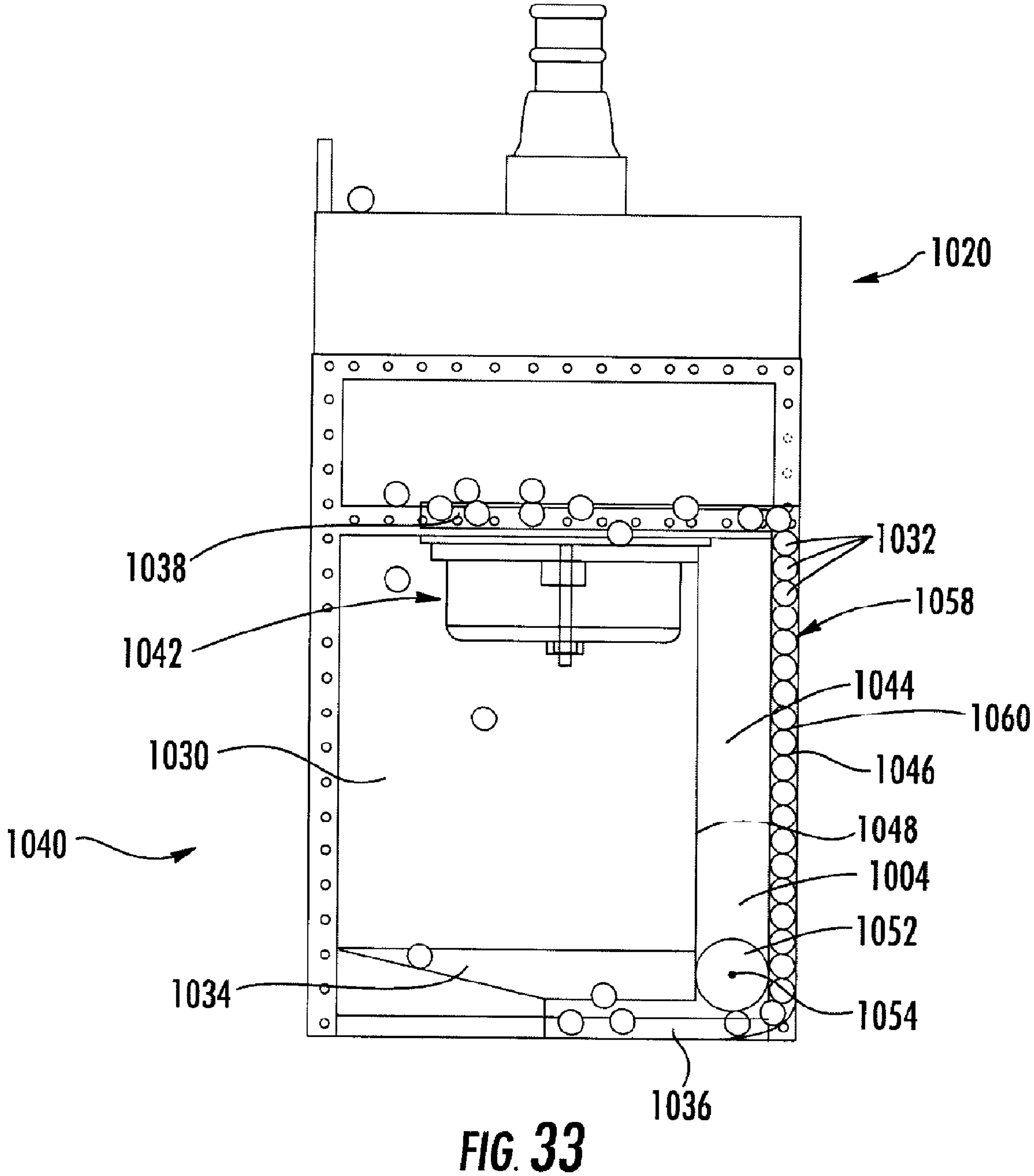
FIG. 33 is a cross-sectional view of FIG. 32 taken along lines A-A

As best shown in FIGS. 32 and 33, the container 1030 further includes a floor 1034 having a receptacle 1036 configured to collect the movable objects 1032. The floor 1034 preferably is sloped downwardly toward the receptacle 1036 so that the movable objects 1032 move effortlessly theretoward. A platform 1038 preferably is located suspended substantially within the top half of the container 1030 for receiving one or more movable objects 1032 from the at least one transport device 1004. In FIGS. 31-37, the container preferably simulates a popcorn popper 1040, such as an old fashioned kettle corn popper. The platform 1038 preferably is disguised by a kettle 1042.

The container 1030 further includes a rear compartment 1044 substantially defined by a back wall 1046 and a spaced-apart false wall 1048. The compartment 1044 allows for the placement of the at least one transport device 1004 therein with the false wall 1048 preferably keeping the transport device 1004 out of view from a player. Suitable transport devices 1004 may include, for example, conveyor belts, discs, wheels, lifts, claws and augers. The transport device 1004 may further include at least one transport component 1050 (see FIGS. 36-38D) such as, for example, cups, bowls, scoops, buckets, ledges, shovels and blades, cooperating with the transport device 1004 and configured to receive the at least one movable object 1032, for example, a ball, from the receptacle 1036. In one embodiment of the invention, the transport component is a helical blade.

As further shown in FIGS. 32 and 33, the transport device 1004 includes a plurality of vertically oriented discs 1052 rotatably secured to an axle 1054 that cooperates with a motor 1056. The discs 1052 may comprise, for example, plastic or rubber. When the motor 1056 is activated, the discs 1052 rotate about the axis of the axle 1054. The discs 1052 preferably are located substantially within the receptacle 1036 such that the discs 1052 are spaced apart therefrom so that a movable object 1032 can be received therebetween. Accordingly, one or more movable objects 1032 in the receptacle 1036 come into contact with the rotating discs 1052, and are moved up to the platform 1038 by way of a chute 1058, which may include one or more channels 1060 separated by dividers 1062. The channels 1060 preferably are slightly wider than the movable objects 1032 and help guide the objects 1032 to the platform 1038. Notably, the rotating discs 1052 continuously fill the channels 1060 with the movable objects 1032 thereby forcing the movable objects 1032 up to the platform 1038. The movable objects 1032 eventually are received onto the platform 1038 only to free fall therefrom back to the floor 1034 thereby preferably providing the illusion of popcorn popping and falling from the kettle 1042.

In an alternative embodiment, as shown in FIGS. 38E and 38F, a cylinder 1064 may replace the circular discs 1052. The cylinder 1064 similarly is disposed about an axle 1066 for movement thereabout and may include, for example, plastic or rubber. The cylinder 1064 can be activated by a motor 1056 and preferably includes an accordion-like surface 1068 for cooperating with the at least one movable objects 1032. In another alternative embodiment (not shown), a cylinder may comprise ridges in the form of a continuous ribbed surface, where the ribs or ridges are aligned circumferentially along the surface of the cylinder, that is, orthogonal to the axle of the cylinder; as the cylinder rotates about the axle, movable objects caught in the ridges or ribs are thereby transported on the surface of the cylinder along the axis of the cylinder. This embodiment is in contrast to cylinder 1064 (FIG. 38F) where the strips of the accordion surface are arranged parallel to the axle, rather than being arranged at right angles to the axle.

Figure 34:
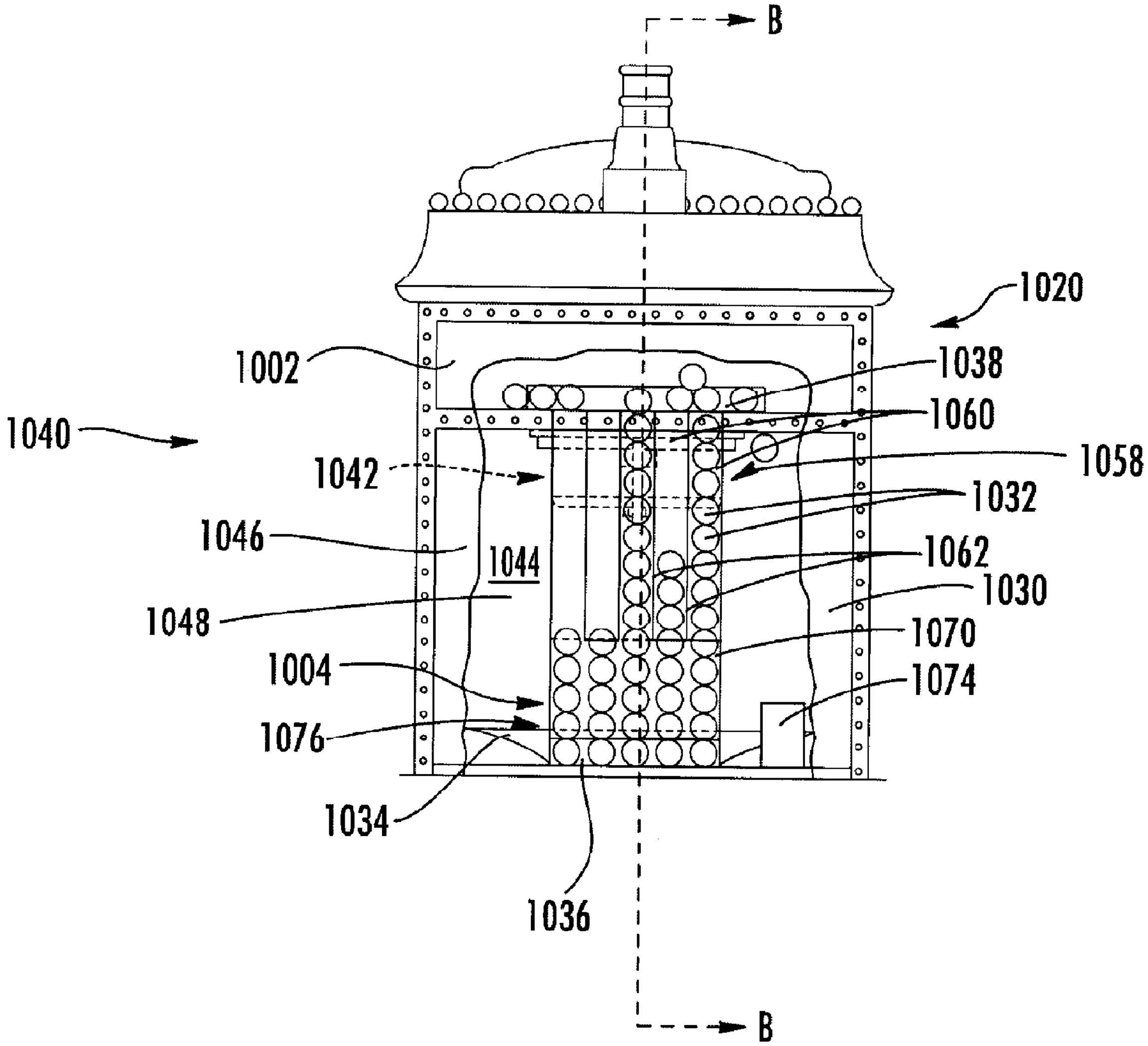
FIG. 34 is a partially cut-away rear elevational view of the jumbled ball display of FIG. 31 showing another embodiment of a transport device.
Figure 35:
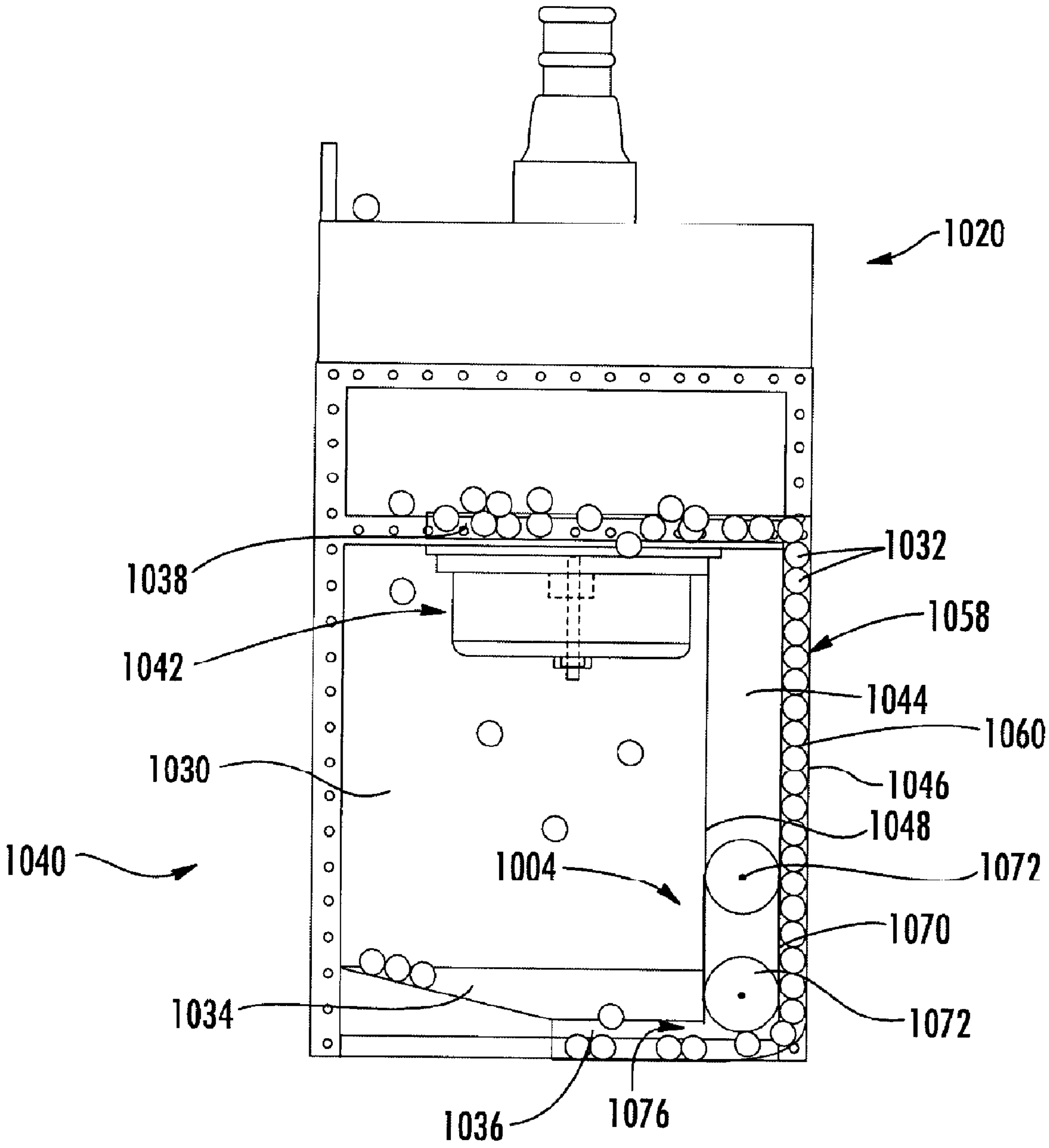
FIG. 35 is a cross-sectional view of the gaming device of FIG. 34 taken along lines B-B.

FIGS. 34 and 35 show another embodiment of the transport device 1004 of the present invention including at least one conveyor belt 1070 substantially vertically oriented and cooperating with at least one roller 1072 to rotate therearound when the at least one of roller 1072 is activated by a motor 1074. The conveyor belt 1070 can be any conventional type known in the art and may include, for example, wire mesh, rubber or plastic. It is understood that a plurality of conveyor belts 1070 may be placed in a side-by-side arrangement in place of one conveyor belt 1070.

When the motor 1074 is activated, the at least one conveyor 1070 belt rotates around the rollers 1072. Preferably, at least one end 1076 of the conveyor belt 1070 is substantially located within the receptacle 1036 with the one end 1076 preferably being spaced apart therefrom so that the movable objects 1032 can be received therebetween, preferably wedged therebetween.

Accordingly, one or more movable objects 1032 in the receptacle 1036 come into contact with the conveyor belt 1070, and are moved from the receptacle 1036, preferably via friction, up to the platform 1038 by way of the chute 1058, which includes the one or more channels 1060 separated by dividers 1062. The channels 1060 preferably are slightly wider than the movable objects 1032 and help guide the objects 1032 to the platform 1038. Notably, the conveyor belt 1070 continuously fills the channels 1060 with the movable objects 1032 thereby forcing the movable objects 1032 up to the platform 1038. The movable objects 1032 eventually are received onto the platform 1038 only to free fall therefrom back to the floor 1034 thereby preferably providing the illusion of popcorn popping and falling from the kettle 1042. It is understood that the conveyor belt 1070 could extend substantially the length of the container 1030 to transport the movable objects 1032 directly to the platform 1038.

Figure 36:
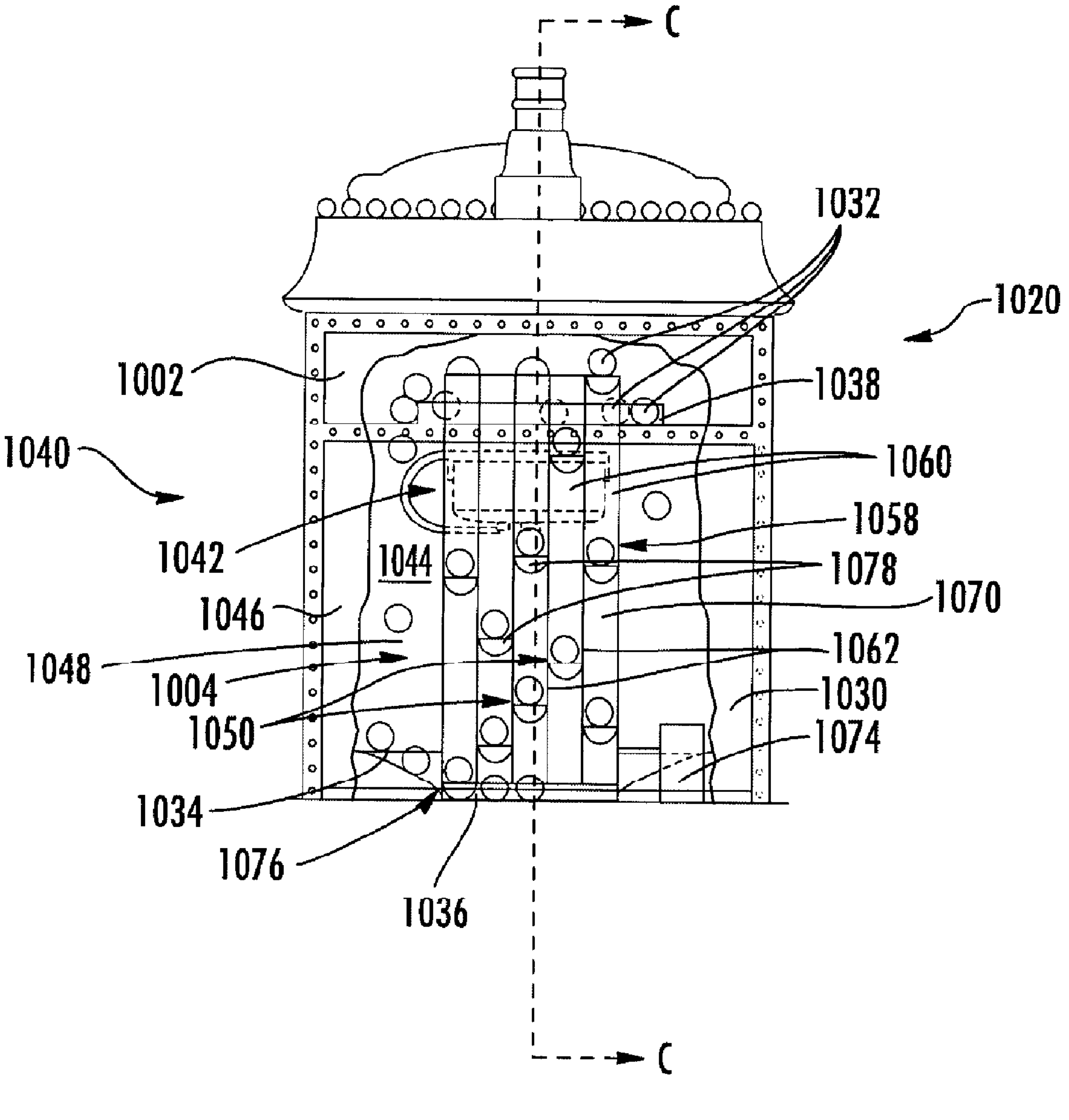
FIG. 36 is a partially cut-away rear elevational view of the jumbled ball display of FIG. 31 showing yet another embodiment of a transport device.
Figure 37:
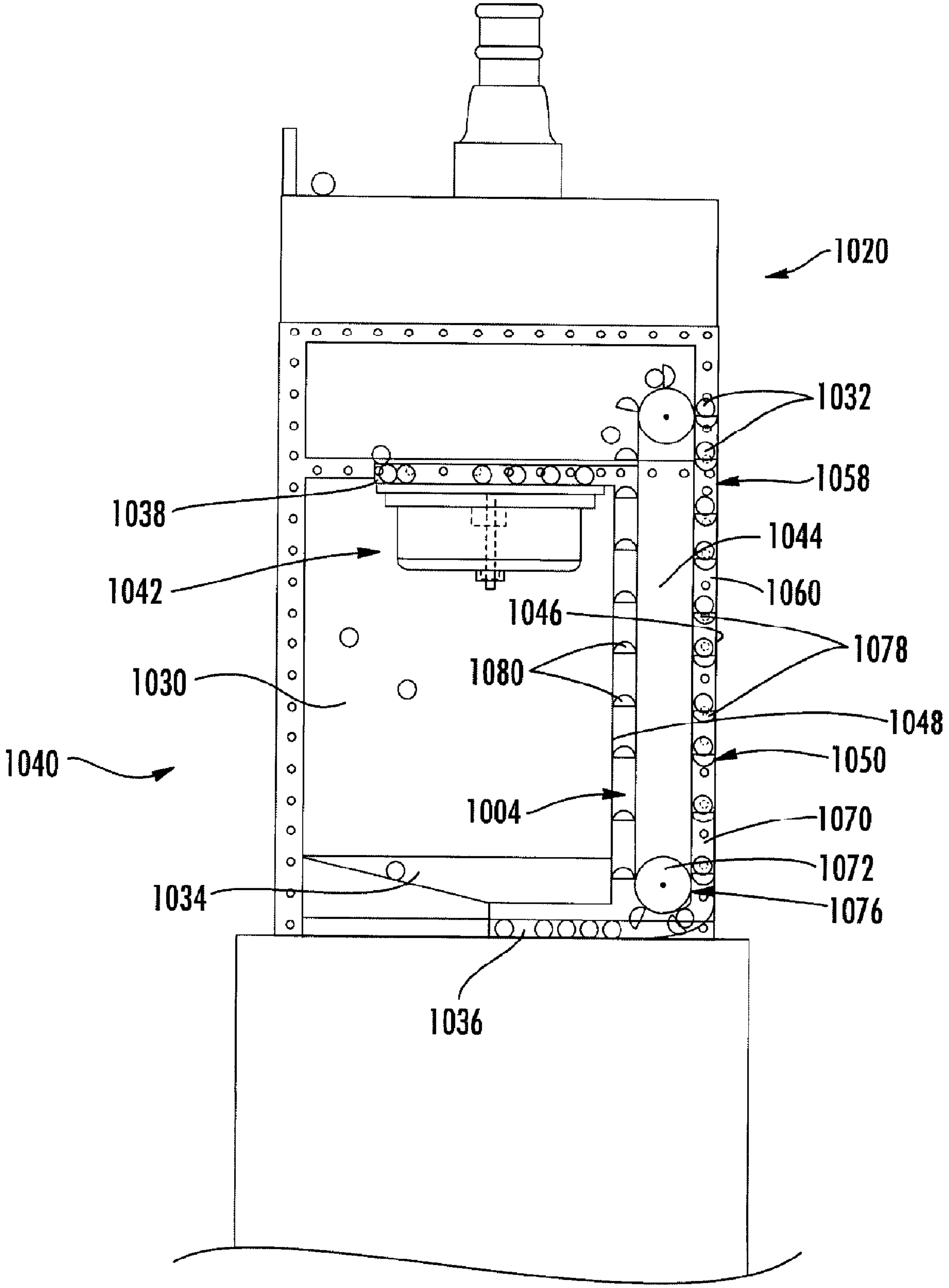
FIG. 37 is a cross-sectional view of FIG. 36 taken along lines C-C.

FIGS. 36 and 37 show yet another embodiment of the transport device 1004 of the present invention preferably extending substantially the length of the container 1030 and being provided with at least one transport component 1050 such as for example, cups, bowls, scoops, buckets, ledges, shovels or blades. Notably, the conveyor belt 1070 cooperates with rollers 1072 to rotate therearound when at least one of the rollers 1072 is activated by the motor 1074.

As further shown in FIGS. 36 and 37, the transport component 1050 cooperates with the transport device 1004 and is adapted to receive the at least one movable object 1032, for example, a ball, from the receptacle 1036. Here, the at least one transport component 1050 includes a plurality of cups 1078. If channels 1060 are present within the chute 1058 each cup 1078 is aligned with a designated channel 1060. Alternatively, it is understood that channels 1060 may be omitted with this type of transport device 1004.

Accordingly, each cup 1078 receives a movable object 1032 from the receptacle 1036 and transports the object 1032 to the platform 1038. The movable object 1032 eventually is received by the platform 1038 and an empty cup 1080 (FIG. 37) is allowed to return to the receptacle to retrieve another movable object 1032. It is understood that a plurality of conveyor belts 1070 having transport components 1050 may be placed in a side-by-side arrangement to transport movable objects 1032 to the platform 1038.

Figure 38A:
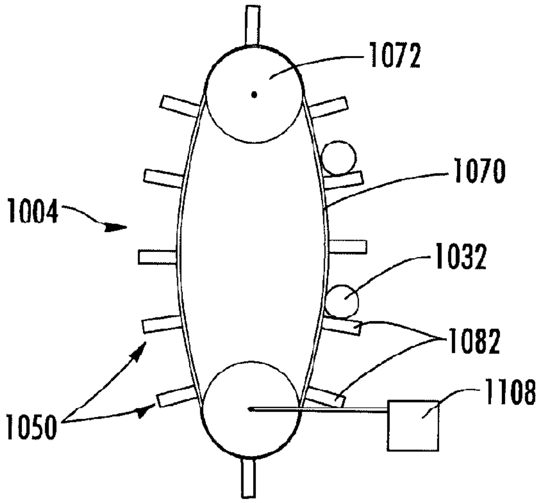
FIG. 38A is a cross-sectional view of another embodiment of the transport device of the present invention.
Figure 38B:
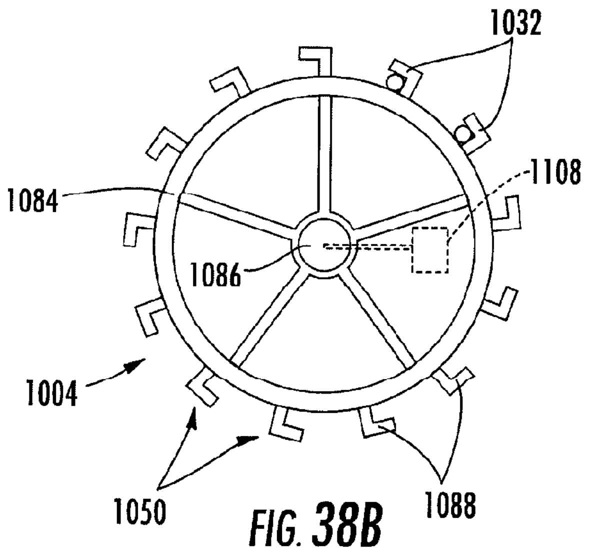
FIG. 38B is a cross-sectional view of another embodiment of the transport device of the present invention.
Figure 38C:
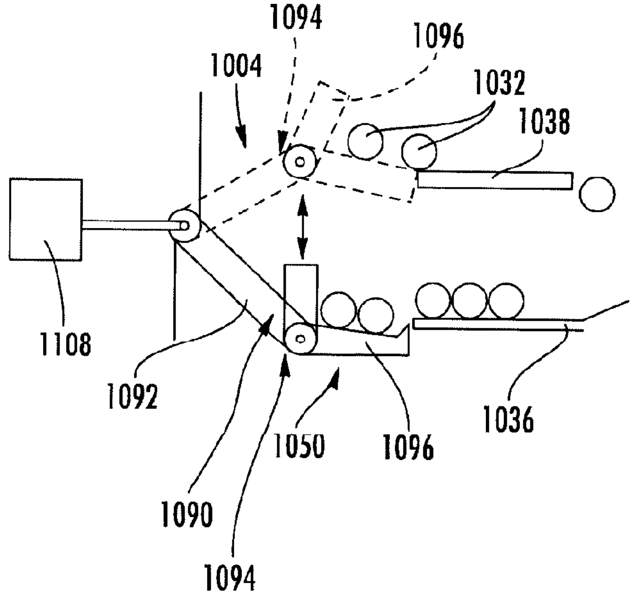
FIG. 38C is a cross-sectional view of another embodiment of the transport device of the present invention.
Figure 38D:
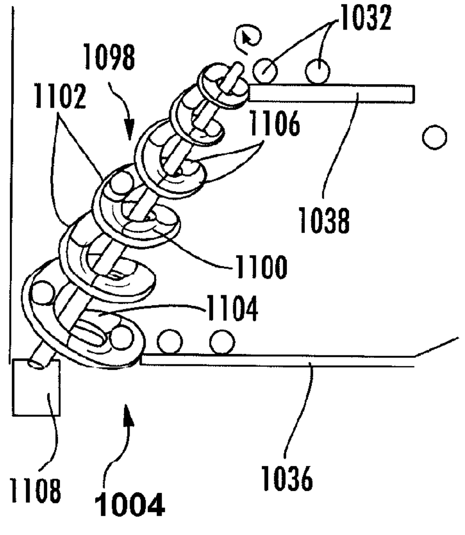
FIG. 38D is a perspective view of another embodiment of the transport device of the present invention.

FIGS. 38A-D depict yet other preferred embodiments of the transport device 1004 of the present invention. FIG. 38A shows the transport device 1004 including the conveyor belt 1070 cooperating with rollers 1072 and having ledges 1082 as the transport component 1050. FIG. 38B shows the transport device 1004 including a wheel 1084 disposed about a central axle 1086 and having buckets 1088 as the transport component 1050. FIG. 38C shows the transport device 1004 including a lift 1090 having a movable arm 1092. One end 1094 of the arm 1092 cooperates with the transport component 1050, a shovel 1096. FIG. 38D shows the transport device 1004 including an auger 1098 having a continuous blade 1100 as the transport component 1050. The continuous blade 1100 preferably has ledges 1102 extending from a top surface 1104 of the blade 1100 to provide compartments 1106 to contain the movable objects 1032 thereon. Accordingly, each transport device 1004 preferably is activated by a motor 1108 to transport the at least one movable object 1032 from the receptacle 1036 to the platform 1038. It is further understood that the transport device 1004 may be substantially vertically oriented or non-vertically oriented.

Returning to FIG. 31, the present gaming device 1000 further provides a bonus game cycle 1026 (see FIG. 40) associated with the selection of the one or more symbols 1018 from the plurality of symbols 1018 displayed by the display device 1020. The bonus game cycle 1026 (FIG. 40) preferably extends the length of play of a single game play and can be triggered by any number of bonus activating events 1110 (FIG. 40). This event may be many different types of events. For example, a bonus activating event 1110 (FIG. 40) simply may include the placing of a wager (not shown) by the player or the displaying of a particular symbol 1018 such as, for example, a number, letter, picture or a combination thereof, on one or more reels. The activating event 1110 (FIG. 40) also may be based on an external event.

The bonus activating event 1110 (FIG. 40) triggers the gaming device 1000 to allow a player to participate in the bonus game. The bonus activating event 1110 (FIG. 40) may include any one of the above mentioned activating events and further may include when a player accumulates a number of symbols 1018 or game outcomes over a number of separate game plays.

Figure 39:
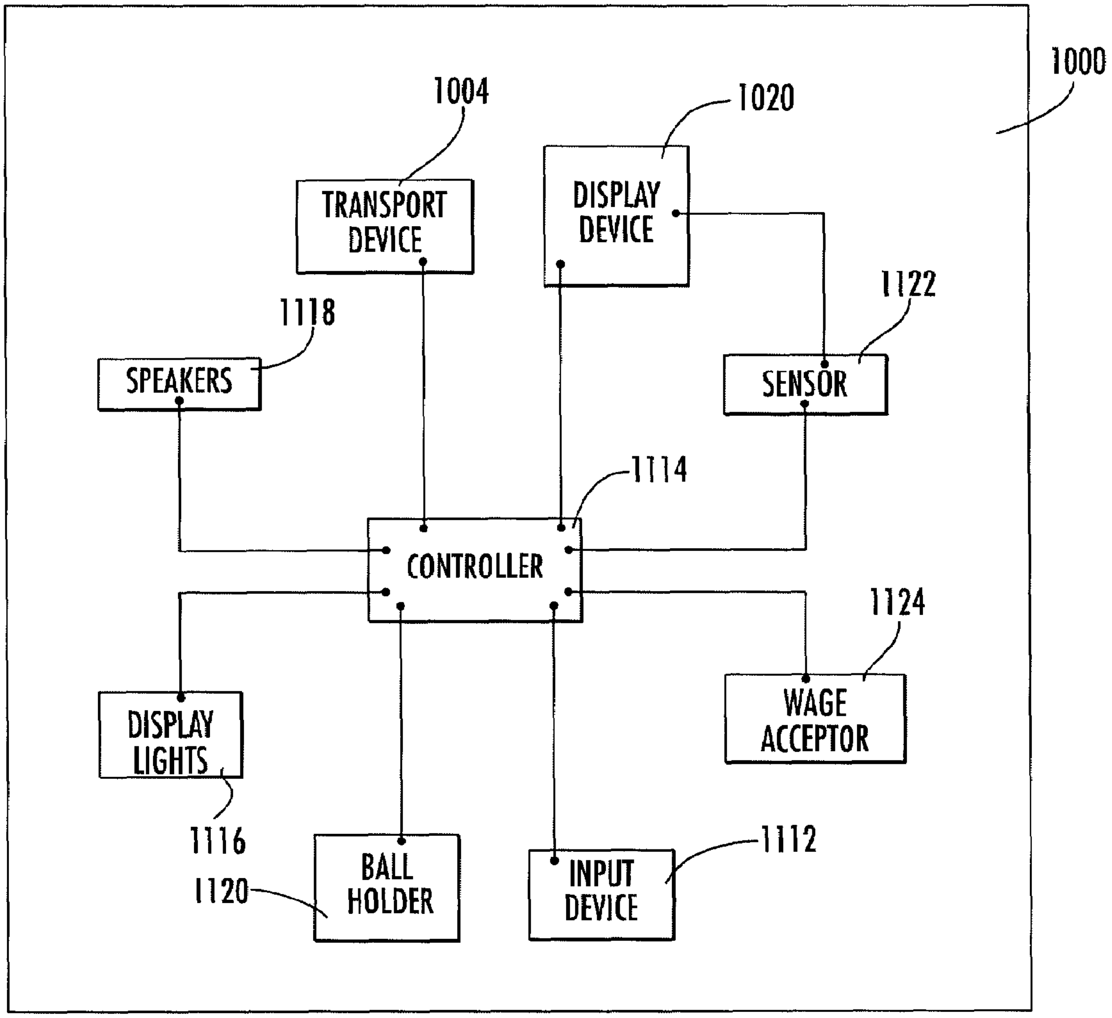
FIG. 39 is a schematic representation of components of the gaming device of the present invention.

As further shown in FIG. 39, the gaming device 1000 includes an input device 1112 such as, for example, a button(s) 1013 (FIG. 31) or a video touch screen(s) (not shown), which may be configured to allow a player to select one or more symbols 1018 (FIG. 31) from the plurality of symbols during a bonus game cycle 1026 (FIG. 40).

FIG. 39 further shows the gaming device 1000 including a controller 1114. The controller 1114 is configured to control the gaming device 1000 by utilizing a random number generator (not shown) to produce random or pseudo random numbers for each bonus game cycle 1026 (FIG. 40). The outcome of the bonus game may be determined by comparing the random number to a table of outcomes stored in a memory (not shown) and accessed by the controller 1114. A number of different tables of outcomes may be used and different tables may be used for different games. The tables can be designed so that different prizes have different probabilities of being awarded. Such design techniques are well known in the art. U.S. Pat. No. 4,448,419, issued to Telnaes, and U.S. Pat. No. 5,456,465, issued to Durham, may be consulted for specific details and further examples of such designs. It is understood that the gaming device 1000 may operate in many other ways and still achieve the objects of the present invention.

As further shown in FIG. 39, the controller 1114 is provided in communication with the display device 1020, the input device 1112, and the transport device 1004 of the jumbled ball display 1002 such that the controller 1114 is configured to activate and deactivate the transport device 1004, to detect any symbol(s) 1018 (FIG. 31) that optionally may be selected by the player, to display at least one randomly selected symbol 1018 (FIG. 31), to award a prize to the player, and to terminate the bonus game cycle 1026 (FIG. 40). The controller 1114 may be one or more computers (not shown) or processor boards (not shown). Also, the controller 1114 generally is configured to communicate with a display light(s) 1116 and a speaker(s) 1118 for visual and sound effects, and may be in communication with a ball holder 1120 for randomly selecting at least one or more balls.

The controller 1114 also is configured to generate and to detect when a bonus activating event 1110 (FIG. 40) occurs for activation of the bonus game cycle 1026 (FIG. 40), which includes activation of the transport device 1004 (see FIGS. 32-38E). The controller 1114 will determine which symbol(s) 1018 (FIG. 31) of the plurality of symbols 1018 (FIG. 31) to display to the player via the random number generator (not shown). Using a sensor(s) 1122, the controller 1114 then can detect and stop the reels 1022 (FIG. 31) on the display device 1020 (FIG. 31) when the symbol(s) 1018 (FIG. 31) are in the desired position. When reels 1022 (FIG. 31) are in an activating event position, the controller 1114 will sense this position and begin the bonus game cycle 1026 (FIG. 40). Sensors 1122 may also be provided external to the gaming device 1000 to detect external bonus activating events. The controller 1114 may also transmit and/or detect a variety of other information such as when coins (not shown) or currency (not shown) have been inserted into a wage acceptor 1124, when a game starts, when an error has occurred, and when a sensor detects tampering.

When the controller 1114 detects a bonus activating event 1110 (FIG. 40), it may begin the bonus game cycle 1026 (FIG. 40) by activating, for example, the transport device 1004, video screen(s) (not shown), display lights 1116 or light emitting diodes (not shown). These devices may indicate that a player has qualified for the bonus game cycle 1026 (FIG. 40) and may prompt the player to perform an action. During the bonus game cycle 1026 (FIG. 40), the transport device 1004 transports the movable objects 1032 (see FIGS. 32-37) from the receptacle 1036 (FIGS. 32-37) to the platform 1038 (FIGS. 32-37). The bonus game cycle ends 1140 (FIG. 40) when the controller 1114 deactivates the transporting device 1004 and transporting of the movable objects 1032 (FIG. 32-37) is stopped.

Method of Use

FIG. 40 illustrates one method of playing the gaming device 1000 of the present invention wherein the bonus game cycle 1026 is triggered by any number of bonus activating events in step 1110 during play of the primary game in step 1126. One such bonus activating event in step 1110 includes the displaying of a particular symbol(s) 1018, such as, for example, letters, words, numbers, pictures, images or combinations thereof, on one or more reels 1022 of slot machine 1006. Preferably, the bonus game cycle 1026 is activated when the "popcorn container with popcorn" symbol 1018 (see FIG. 31) appears on the third reel 1022 and on the payline 1027 with the maximum wager being played. If the display device 1020 is a video display device (not shown), the symbols 1018 further may be displayed by animation.

After the occurrence of the bonus activating event step 1110, as shown in FIG. 40, the transport device 1004 preferably is activated in step 1128 allowing the movable objects 1032 to be transported from the receptacle 1036 and to free fall from the platform 1038. Next, in step 1130, the display device 1020 or bonus display 1024, preferably a video display (not shown), provides a plurality of symbols 1018. Again, the symbols 1018 may include, for example, letters, words, numbers, pictures or images. In a preferred embodiment, three different size popcorn symbols, for example, small, medium and large, may be displayed.

As further shown in FIG. 40, the next step 1132 provides for an alternate game play wherein a player may optionally be allowed to select one or more symbols 1018 from the plurality of symbols 1018 using the input device 1112 (FIG. 39), for example, a touch screen (not shown) or button(s) 1013. Notably, the controller 1114 is configured to detect the symbol(s) 1018 selected since the controller 1114 is in communication, as shown in FIG. 39, with the input device 1112, as well as the display device 1020. It is understood that the controller 1114 may select the player symbol(s) 1018 if a designated amount of time elapses. It is also understood that the controller will randomly select a symbol 1018, in step 1134, if the optional player selection is not provided.

As further shown in FIG. 40, the controller 1114 (FIG. 39) in step 1134 randomly selects at least one symbol 1018 from the plurality of symbols 1018 with the assistance of the random number generator (not shown). The randomly selected symbol 1018, for example, different sized popcorn containers with popcorn, preferably is associated with a number of symbols 1018 that the controller 1114 may randomly select from in step 1134. It is noted that the symbol(s) 1018 from which the controller 1114 randomly selects may not be identical, but rather substantially equivalent, to the symbol(s) 1018 provided in step 1130. More specifically, the symbol(s) 1018 provided in step 1130 may include, for example, a picture or image, while the symbol(s) 1018 randomly selected by the controller 1114 may include, for example, a letter or word; or vice-versa. By way of specific example, an image of a large-sized popcorn box may be provided in step 1130 while the controller may randomly select the word "Large Popcorn" such that the symbols 1018 are substantially equivalent, yet not exactly the same.

Once the controller 1114 has randomly selected one or more symbols 1018 from the plurality of symbols 1018 in step 1134, the symbol 1018 is displayed to the player via one or more of the display devices 1020. In optional step 1138, the controller 1114 will determine if the randomly selected symbol 1018 is substantially equivalent to the at least one selected symbol 1018 from step 1132. If they are not substantially equivalent, the deactivation of the transport device 1004 occurs at step 1139 and the bonus game cycle 1026 ends at step 1140.

If the symbols 1018 are substantially equivalent in optional step 1138, or directly after step 1134 if optional step 1138 is not available, the controller 1114 selects at least one symbol 1018 from a second plurality of symbols 1018 in step 1136. The at least one symbol 1018 from the second plurality of symbols 1018 can include, for example, letters, words, numbers, pictures or images. In a preferred embodiment, the at least one symbol 1018 from a second plurality of symbols 1018 includes a prize symbol such as a prize ball (not shown) selected from the ball holder (not shown) wherein the prize balls represent different bonus award amounts and optionally multipliers, for example, 10, 15, 20, 25, 30, 35, 50, 75, 100, 250 and a 2x ball.

The controller 1114 then displays the at least one symbol 1018 from the second plurality of symbols 1018 to the player, such as via the bonus display 1024. As indicated above, an award is associated with the at least one symbol 1018 selected from the second plurality of symbols 1018 such that the controller 1114 awards a prize to the player and deactivates the transport device in step 1142. By way of specific example, when a 2x ball (not shown) is displayed from the ball holder (not shown), the player is awarded 2x the accumulated bonus. If the player was entitled to only one randomly selected symbol, for example, a prize ball, from the second plurality of symbols, the player will receive 2x the top award (2×250)=500. If the player was entitled to 2 bonus balls, the second ball value is multiplied by 2x. If the second ball is also a 2x ball, the player will receive 4x (2x×2x) the top award (4×250)=1000. If the player was entitled to 3 bonus balls, and all three are a 2x ball, the player will receive 8x (2x×2x×2x=8) the top award ball (8×250) =2000.

After step 1142, the bonus game cycle 1026 ends with step 1140 such that play of the primary game then may return to step 1126. Accordingly, all awards may be multiplied by the total wager.

If any actual prize is money, the amount of the prize may be added to the player's credit meter (not shown) or the prize may be dispensed from, for example, the coin dispenser 1015. Different kinds of prizes, besides monetary prizes, may be awarded. For example, the prizes may be goods, services or additional games. The goods and services may be awarded in the form of for example, physical objects, tickets, vouchers and coupons. Additional games may be presented in the form of tickets, such as scratch-off lottery tickets. In the embodiments in which tickets, vouchers or coupons are used, the objects are dispensed using an internally or externally mounted dispenser. Such dispensers are well known in the art.

There are other features and advantages of one or more the various embodiments. They should be apparent to those skilled in the art based on the disclosure above.

Although the description above contains many specifications, these should not be construed as limiting the scope of the invention but as merely providing illustrations of some of the presently preferred embodiments of this invention. This specification above, for instance, makes reference to bonus prizes. However, the present invention is not thereby intended to be limited to providing bonus prizes. Rather it is intended that the present invention can, in certain embodiments, be used independently as a stand-alone game without necessarily including bonusing. Thus, the scope of the invention should be determined by the claims as issued and their legal equivalents rather than by the preferred examples given.

CONCLUSION

Accordingly, the present invention provides a gaming device including a transport device configured to transport one or more movable objects from a plurality of movable objects contained within a container. The gaming device further is provided with a bonus activating event wherein the container preferably simulates a popcorn popper for activation during the bonus game cycle. Not only is the gaming device exciting and enjoyable to play, it also increases the length of play experienced by players.

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. A gaming device comprising:

(A) a container;

(B) at least one movable object situated within the container;

(C) a transport device associated with the container and configured to transport the at least one movable object, wherein the transport device is selected from the group consisting of conveyor belts, discs, wheels, lifts, claws and augers;

(D) a plurality of symbols located in a location separate from the movable object; and (E) a controller configured to:

(a) randomly select at least one symbol from the plurality of symbols; and (b) award a prize to the player if the at least one randomly selected symbol corresponds to a winning arrangement.

2. The gaming device of claim 1 wherein the container represents a popcorn popper.

3. The gaming device of claim 1 wherein the transport device comprises a conveyor belt and is configured to transport the at least one movable object in a substantially vertical direction.

4. The gaming device of claim 1 wherein the transport device comprises an auger and the at least one transport component is a helical blade.

5. The gaming device of claim 1 wherein the transport device further comprises at least one transport component configured to receive the at least one movable object and wherein the at least one transport component is selected from the group consisting of cups, bowls, scoops, buckets, ledges, shovels and blades.

6. The gaming device of claim 1 further comprising a platform configured to receive the at least one movable object from the transport device.

7. The gaming device of claim 6 wherein the at least one movable object free falls from the platform.

8. A gaming device comprising:

(A) a container comprising at least one movable object situated within the container;

(B) a conveyor belt associated with the container and configured to transport the at least one movable object;

(C) a plurality of symbols located in a location separate from the movable object; and (D) a controller configured to:

(a) randomly select at least one symbol from the plurality of symbols; and (b) award a prize to the player if the at least one randomly selected symbol corresponds to a winning arrangement.

9. The gaming device of claim 8 wherein the container further comprises a movable object receptacle configured to receive the at least one movable object, the conveyor belt being spaced apart from the movable object receptacle so that the at least one movable object is received therebetween, the conveyor belt further being configured to cooperate with the at least one movable object to transport the at least one movable object from the movable object receptacle.

10. The gaming device of claim 9 wherein the at least one movable object is wedged between the conveyor belt and the movable object receptacle such that the conveyor belt transports the at least one movable object from the movable object receptacle via friction.

11. A gaming device comprising:

(A) container means for containing at least one movable object means;

(B) transport means for transporting the at least one movable object means, wherein the transport means is selected from the group consisting of conveyor belts, discs, wheels, lifts, claws and augers, the transport means further comprising at least one transport component means for receiving the at least one movable object means;

(C) plurality of symbol said symbol means located in a location separate from the movable object means for conveying a game outcome to a player;

(D) display means for presenting the plurality of symbol means or randomly selected symbol means to the player; and (E) controller means for:

(a) randomly selecting at least one symbol means from the plurality of symbol means; and (b) awarding a prize to the player if the at least one randomly selected symbol means corresponds to a winning arrangement.

12. The gaming device of claim 11 wherein the container means represents a popcorn popper.

13. The gaming device of claim 11 wherein the transport means comprises a conveyor belt and is configured to transport the at least one movable object in a substantially vertical direction.

14. The gaming device of claim 11 wherein the transport means comprises an auger and the at least one transport component means is a helical blade.

15. The gaming device of claim 11 further comprising a platform means for receiving the at least one movable object from the transport means.

16. The gaming device of claim 15 wherein the at least one movable object free falls from the platform means.

17. The gaming device of claim 11 wherein the at least one transport component means is selected from the group consisting of cups, bowls, scoops, buckets, ledges, shovels and blades.

18. A method for moving at least one movable object in a gaming device comprising the following steps, but not all necessarily in the order shown:

(A) providing a gaming device comprising: (a) a container having at least one movable object and (b) a transport device configured to transport the at least one movable object, wherein the transport device is selected from the group consisting of conveyor belts, discs, wheels, lifts, claws and augers, the transport device further comprising at least one transport component configured to receive the at least one movable object;

(B) activating the transport device;

(C) receiving the at least one movable object in the at least one transport component;

(D) transporting the at least one movable object with the transport device;

(E) providing a plurality of symbols located in a location separate from the movable object;

(F) randomly selecting at least one symbol from the plurality of symbols; and (G) awarding a prize to a player and deactivating the transport device if the at least one randomly selected symbol means corresponds to a winning arrangement.

19. The method of claim 18 comprising providing the game device wherein the container represents a popcorn popper.

20. The method of claim 18 comprising providing the game device wherein the transport device comprises a conveyor belt and transporting the at least one movable object in a substantially vertical direction.

21. The method of claim 18 comprising providing the game device wherein the transport device comprises an auger and the at least one transport component is a helical blade.

22. The method of claim 18 comprising providing the game device wherein the transport component is selected from the group consisting of cups, bowls, scoops, buckets, ledges, shovels and blades.

23. The method of claim 18 comprising providing the game device wherein the container further comprises a platform, and wherein step (D) comprises transporting the at least one movable object onto the platform.

24. The method of claim 23 further comprising step (H) free falling of the at least one movable object from the platform.

25. The method of claim 24 further comprising (I) repeating steps (B) through (H).

26. The method of claim 18 further comprising providing a controller configured to randomly select the at least one symbol from the plurality of symbols and determine if the at least one randomly selected symbol corresponds to the winning arrangement.

27. A method for moving at least one movable object in a gaming device comprising the following steps, but not all necessarily in the order shown:

(A) providing a gaming device comprising (a) a container having at least one movable object and (b) a conveyor belt configured to transport the at least one movable object;

(B) activating the conveyor belt;

(C) transporting the at least one movable object with the conveyor belt;

(D) providing a plurality of symbols located in a location separate from the movable object;

(E) randomly selecting at least one symbol from the plurality of symbols; and (F) awarding a prize to a player and deactivating the conveyor belt if the at least one randomly selected symbol corresponds to a winning arrangement.

28. The method of claim 27 comprising providing a gaming device wherein the container further comprises a receptacle configured to receive the at least one movable object, the conveyor belt being spaced apart from the receptacle, and further comprising prior to step (C) receiving the at least one movable object between the conveyor belt and the receptacle.

29. The method of claim 28 wherein transporting of the at least one movable object with the conveyor belt is performed via friction.

30. The method of claim 27 further comprising providing a controller configured to randomly select the at least one symbol from the plurality of symbols and determine if the randomly selected symbol corresponds to the winning arrangement.

31. A gaming method comprising the following steps, but not all necessarily in order shown:

(A) allowing a player to play a gaming device wherein the gaming device provides a randomly determined game outcome and a container associated with the game outcome, the container being configured to simulate a popcorn popper;

(B) situating at least one movable object within the container and providing a transport device configured to transport the at least one movable object;

(C) providing at least one bonus qualifying event;

(D) if the at least one bonus qualifying event occurs, providing a plurality of symbols to the player and allowing the player to select at least one symbol from the plurality of symbols, the plurality of symbols located in a location separate from the movable object "symbols";

(E) randomly selecting at least one symbol from the plurality of symbols; and (F) awarding a prize to the player if the at least one randomly selected symbol is substantially equivalent to the at least one symbol selected by the player.

32. The gaming method of claim 31 further comprising providing the transport device with at least one transport component configured to receive the at least one movable object.

33. The method of claim 31 further comprising providing a controller configured to randomly select the at least one symbol from the plurality of symbols and determine if the randomly selected symbol is substantially equivalent to the at least one symbol selected by the player.

34. A gaming method comprising the following steps, but not all necessarily in the order shown:

(A) allowing a player to play a gaming device comprising (a) locating at least one movable object inside a container and (b) operating a transport device selected from the group consisting of conveyor belts, discs, wheels, lifts and augers to transport the at least one movable object within the container, wherein the transport device further comprises at least one transport component configured to receive the at least one movable object, the gaming device further providing at least one bonus qualifying event;

(B) if the at least one bonus qualifying event occurs, activating the transport device;

(C) providing a plurality of symbols located in a location separate from the movable object;

(D) randomly selecting at least one symbol from the plurality of symbols; and (E) awarding a prize to the player if the at least one randomly selected symbol corresponds to a winning arrangement.

35. The gaming method of claim 34 further comprising configuring the transport device as a conveyor belt to transport the at least one movable object in a substantially vertical direction.

36. The gaming method of claim 34 further comprising providing the transport device with an auger and at least one transport component as a helical blade.

37. The gaming method of claim 34 further comprising selecting the at least one transport component from the group consisting of cups, bowls, scoops, buckets, ledges, shovels and blades.

38. The gaming method of claim 34 further comprising providing the container with a platform configured to receive the at least one movable object from the transport device.

39. The gaming method of claim 38 further comprising allowing the at least one movable object to free fall from the platform.

40. The gaming method of claim 39 further comprising step (F) repeating steps (A) through (E).

41. The gaming method of claim 34 further comprising step (F) deactivating the transport device.

42. A gaming method comprising the following steps, but not all necessarily in the order shown:

(A) allowing a player to play a gaming device comprising (a) locating at least one movable object inside a container and (b) operating a transport device to transport the at least one movable object within the container, the gaming device further providing at least one bonus qualifying event;

(B) if the at least one bonus qualifying event occurs, activating the transport device;

(C) providing a first plurality of symbols located in a location separate from the movable object;

(D) allowing the player to select at least one symbol from the first plurality of symbols;

(E) randomly selecting at least one symbol from the first plurality of symbols; and (F) awarding a prize to the player if the at least one randomly selected symbol is substantially equivalent to the at least one symbol selected by the player.

43. The gaming method of claim 42 if the at least one randomly selected symbol is substantially equivalent to the at least one selected symbol selected by the player, further comprising step (G) randomly selecting at least one symbol from a second plurality of symbols, then awarding the prize to the player, the prize being associated with the at least one symbol from the second plurality of symbols.

44. The gaming method of claim 42 comprising allowing the player to play the gaming device wherein the transport device is selected from the group consisting of conveyor belts, discs, wheels, lifts, claws and augers.

45. The method of claim 42 further comprising providing a controller configured to randomly select the at least one symbol from the plurality of symbols and determine if the randomly selected symbol is substantially equivalent to the at least one symbol selected by the player.

46. A gaming method comprising the following steps, but not all necessarily in order shown:

(A) allowing a player to play a gaming device comprising:

(a) locating at least one movable object inside a container;

(b) operating a transport device to transport the at least one movable object within the container;

(c) configuring the transport device as a conveyor belt to transport the at least one movable object in a substantially vertical direction, wherein the transport device further comprises at least one transport component configured to receive the at least one movable object; and (d) providing at least one bonus qualifying event;

(B) if the at least one bonus qualifying event occurs, activating the transport device;

(C) providing a plurality of symbols located in a location separate from the movable object;

(D) randomly selecting at least one symbol from the plurality of symbols; and (E) awarding a prize to the player if the at least one randomly selected symbol corresponds to a winning arrangement.

47. The method of claim 46 further comprising providing a controller configured to randomly select the at least one symbol from the plurality of symbols and determine if the randomly selected symbol corresponds to the winning arrangement.

* * * * *